(12) United States Patent
Sameshima

(10) Patent No.: US 7,085,517 B2
(45) Date of Patent: Aug. 1, 2006

(54) IMAGE FORMING APPARATUS AND IMAGE FORMING UNIT DETACHABLY MOUNTABLE THERETO

(75) Inventor: Takao Sameshima, Shizuoka (JP)

(73) Assignee: Canon Kabushiki Kaisha, Tokyo (JP)

(*) Notice: Subject to any disclaimer, the term of this patent is extended or adjusted under 35 U.S.C. 154(b) by 216 days.

(21) Appl. No.: 10/392,749

(22) Filed: Mar. 20, 2003

(65) Prior Publication Data

US 2003/0202818 A1 Oct. 30, 2003

Related U.S. Application Data

(62) Division of application No. 09/957,239, filed on Sep. 21, 2001, now abandoned.

(30) Foreign Application Priority Data

| Sep. 22, 2000 | (JP) | ................................ 2000-288532 |
| Sep. 26, 2000 | (JP) | ................................ 2000-291833 |
| Sep. 28, 2000 | (JP) | ................................ 2000-295473 |
| Jan. 30, 2001 | (JP) | ................................ 2001-021125 |

(51) Int. Cl.
*G03G 21/16* (2006.01)
*G03G 15/16* (2006.01)

(52) U.S. Cl. .................. 399/111; 399/121; 399/302; 399/317

(58) Field of Classification Search ............... 399/110, 399/111, 121, 126, 154, 162, 297, 302, 303, 399/308, 312, 313, 317

See application file for complete search history.

(56) References Cited

U.S. PATENT DOCUMENTS

| 4,851,960 | A |   | 7/1989  | Nakamura et al. | ........ 361/225 |
| 5,291,252 | A | * | 3/1994  | Kawaishi        | ........ 399/301 |
| 5,442,428 | A | * | 8/1995  | Takahashi et al.| ........ 399/302 |
| 5,587,769 | A |   | 12/1996 | Sawada et al.   |                  |
| 5,802,427 | A |   | 9/1998  | Sawada et al.   | ........ 399/122 |
| 6,351,622 | B1|   | 2/2002  | Sadowara        | ........ 399/167 |
| 6,493,528 | B1|   | 12/2002 | Sameshima et al.| ........ 399/111 |
| 6,697,596 | B1| * | 2/2004  | Bessho et al.   | ........ 399/302 |

FOREIGN PATENT DOCUMENTS

| JP | 63-149669 | 6/1988 |
| JP | 8-137181  | 5/1996 |
| JP | 10-177329 | 6/1998 |
| JP | 11-30944  | 2/1999 |
| JP | 11-109836 | 4/1999 |

* cited by examiner

*Primary Examiner*—Hoang Ngo
(74) *Attorney, Agent, or Firm*—Fitzpatrick, Cella, Harper & Scinto

(57) ABSTRACT

An image forming unit is detachably mountable to an image forming apparatus and includes an image bearing member and an intermediate transfer member to which a toner image on the image bearing member is transferred. The image bearing member and the intermediate transfer member are movable relative to each other in the image forming unit.

8 Claims, 37 Drawing Sheets

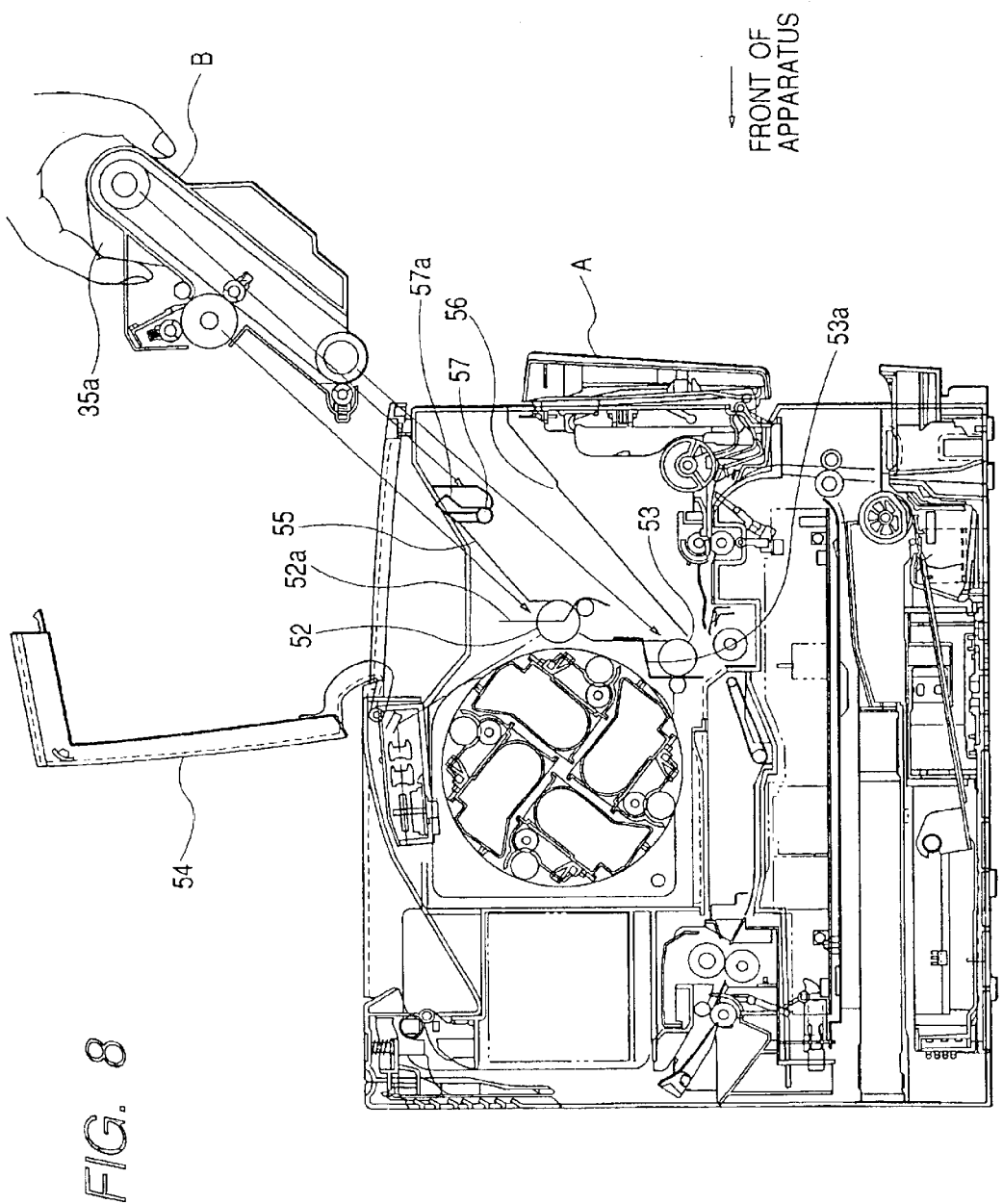

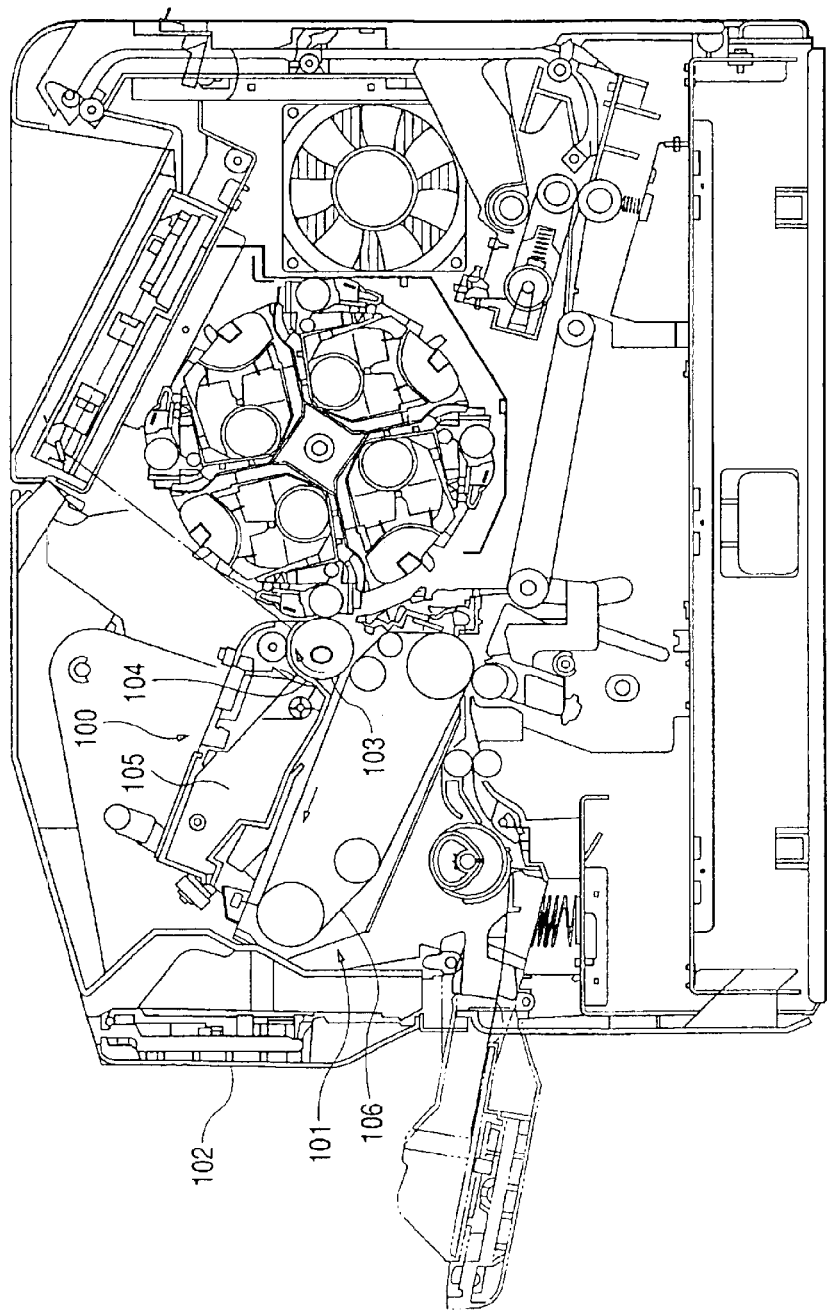

FIG. 34A
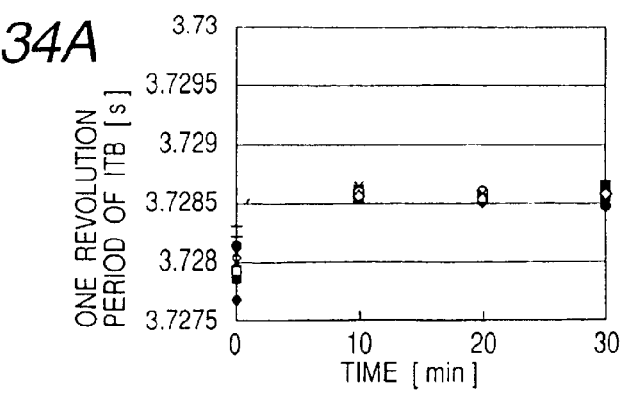
FIG. 34B
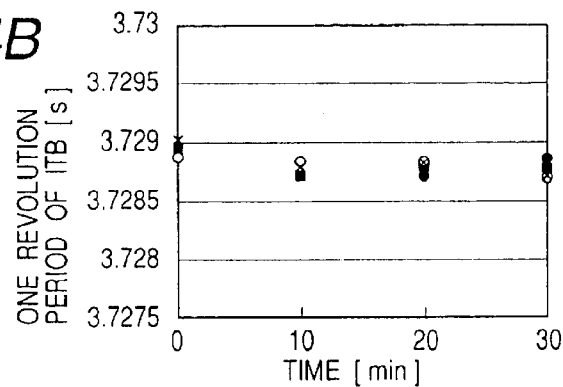
FIG. 34C
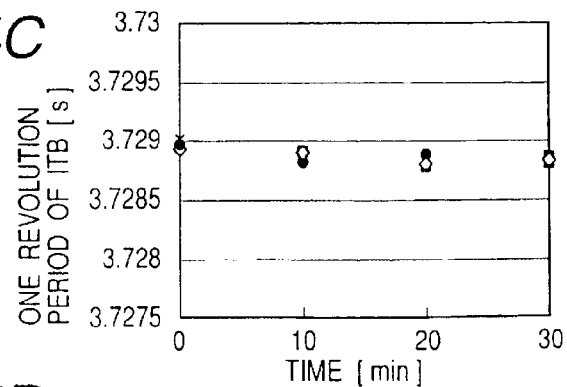
FIG. 34D
|  | SLACK PORTION BEFORE PHOTOSENSITIVE DRUM | SLACK PORTION AFTER PHOTOSENSITIVE DRUM | TAUT PORTION |
|---|---|---|---|
| PERIODIC ERROR [ms] | 0.154 | 0.185 | 0.124 |
| LENGTH CONVERTED FROM PERIODIC ERROR [μm] | 18.2 | 21.8 | 14.6 |

FIG. 36A
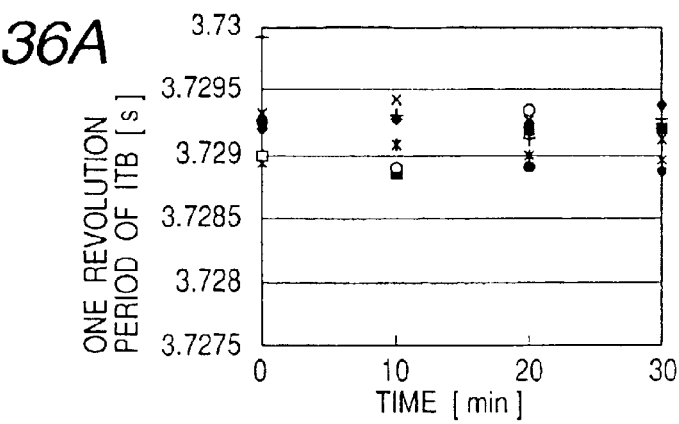
FIG. 36B
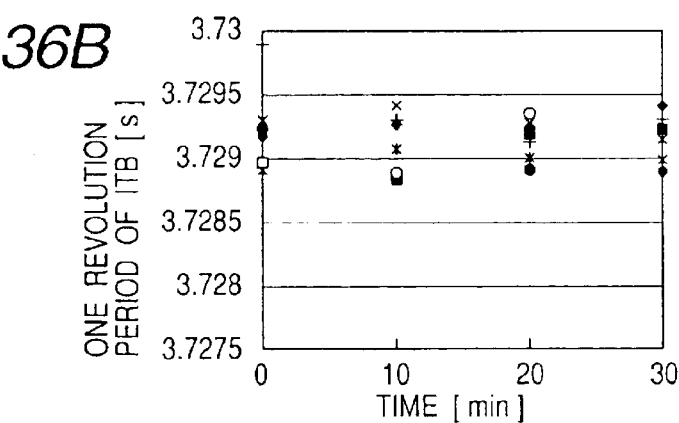
FIG. 36C
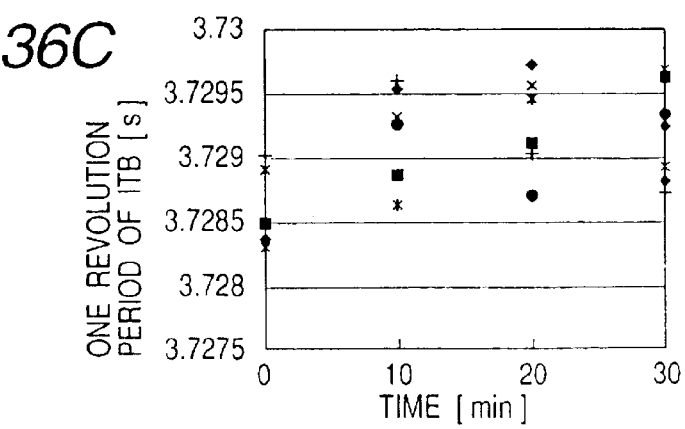
FIG. 36D
|  | TAUT PORTION | SLACK PORTION | CENTER PORTION |
|---|---|---|---|
| PERIODIC ERROR [ms] | 0.572 | 0.981 | 1.02 |
| LENGTH CONVERTED FROM PERIODIC ERROR [μm] | 67.496 | 115.758 | 120.36 |

IMAGE FORMING APPARATUS AND IMAGE FORMING UNIT DETACHABLY MOUNTABLE THERETO

CROSS-REFERENCE TO RELATED APPLICATION

This application is a divisional of application Ser. No. 09/957,239, filed Sep. 21, 2001, now abandoned.

BACKGROUND OF THE INVENTION

1. Field of the Invention

This invention relates to an image forming apparatus such as a copier or a printer using the electrophotographic process, and particularly to the construction of an image forming unit detachably mountable to the image forming apparatus.

2. Description of the Related Art

An image forming apparatus using the electrophotographic process visualizes a latent image with a toner which is a developer, transfers the toner image to a sheet which is a recording material and fixes it to thereby form an image. In such an electrophotographic image forming apparatus, there is generally known a construction in which in order to form a color image in particular, toner images of a plurality of colors are superimposedly primary-transferred to an intermediate transfer member, and thereafter are collectively secondary-transferred to a sheet.

In a color image forming apparatus using an intermediate transfer member according to the conventional art, as shown, for example, in FIG. 10 of the accompanying drawings, an image bearing member unit 100 and an intermediate transfer member unit 101 are of independent cartridge construction. A large movable side frame 102 is provided on the front (the left side as viewed in FIG. 10) of the apparatus, and this is designed to be pivotally moved and opened to thereby mount or dismount the image bearing member unit 100 and the intermediate transfer member unit 101.

The image bearing member unit 100 is provided above the intermediate transfer member unit 101, and integrally has a photosensitive drum 103 and a waste toner collecting box 105. Waste toner on the photosensitive drum 103 is scraped off by a cleaning blade 104 and is collected into the waste toner collecting box 105 on the back thereof.

Waste toner on the intermediate transfer belt 106 of the intermediate transfer member unit 101 is also scraped off by a cleaning blade, not shown, and is carried to the lower portion of a first carrying pipe by a carrying coil, and is further carried to a portion above the waste toner collecting box 105 by a screw in the first carrying pipe. Thereafter, the waste toner is carried through the interior of a second carrying pipe by the carrying coil, and is finally collected into the waste toner collecting box 105. The connecting portion between the second carrying pipe and the waste toner collecting box is designed to be detachably attached as a discrete unit, and thus is designed such that the waste toner does not spill during the mounting and dismounting.

In the above-described construction, the image bearing member unit 100 and the intermediate transfer member unit 101 are independently positioned in the main body of the image forming apparatus, and the photosensitive drum 103 and the drive transmitting coupling of an intermediate transfer member belt 106 are also designed to be independently connected to the coupling of the main body side of the image forming apparatus.

Also, an example of the image forming apparatus according to the conventional art will now be described with reference to FIG. 11 of the accompanying drawings. The image forming apparatus shown in FIG. 11 is of a construction in which a photosensitive member belt 110, an intermediate transfer member belt 111 and a waste toner collecting box 112 are integral with one another. In the present construction, the photosensitive member belt 110 and the waste toner collecting box 112 are disposed in the downward projection direction of the intermediate transfer belt 111. Also, like the above-described first example of the conventional art, the image forming apparatus is of a construction in which a large movable side frame 113 is pivotally moved and opened to the front (the right side as viewed in FIG. 11) of the apparatus, and a unit comprising the photosensitive member belt 110, the intermediate transfer member belt 111 and the waste toner collecting box 112 made integral with one another is inserted from above.

Also, waste toner on the photosensitive member belt 110 and the intermediate transfer member belt 111, as in the above-described first example of the conventional art, is scraped off by respective cleaning belts, not shown, and is collected into the waste toner collecting box 112. However, the waste toner from the intermediate transfer member belt 111 is designed to fall downwardly by a carrying pipe, and is not a mechanism as complicated as the first example of the conventional art.

When the unit comprising the intermediate transfer member belt 111 and the photosensitive member belt 110 made integral with each other is positioned in the main body of the image forming apparatus, some positional deviation occurs on the unit side and the main body side of the apparatus as to the positional relation between the drive transmitting couplings of the photosensitive member belt 110 and the intermediate transfer member belt 111. So, in order to absorb the positional deviation, there is adopted so-called Oldham's coupling in which the intermediate member of the couplings slides on a claw portion and absorbs a misalignment.

However, in the construction as shown in the above-described first example of the conventional art wherein the image bearing member unit 100 and the intermediate transfer member unit 101 are provided discretely from each other, the drive transmitting couplings are positioned independently of each other and therefore misalignment does not occur, but yet there is the problem that the entire apparatus becomes bulky. Also, the opening portion for the mounting and dismounting of the units becomes large and complicated, and this leads to an increase in cost. Further, the presence of two kinds of process cartridges may cause a predetermined mounting and dismounting procedure, and this may lower the operability to a user.

Also, in the second example of the conventional art, the photosensitive member belt 110 and the intermediate transfer member belt 111 are an integral unit, and the so-called Oldham's coupling is adopted to absorb the misalignment of the respective drive transmitting couplings. Further, the drive transmitting coupling of the main body side of the apparatus is designed to axially slide and retract in operative association with the operation of opening and closing a door to mount or dismount the units, and the construction of the coupling is very complicated. Also, to sufficiently bring out the performance as the Oldham's coupling, a coupling of good accuracy is necessary. By these reasons, the above-described drive transmitting couplings are very high in cost and require a very large space.

SUMMARY OF THE INVENTION

It is an object of the present invention to provide an image forming unit and an image forming apparatus having a drive transmitting portion improved in the operability of mounting and dismounting and simple and free of misalignment.

It is another object of the present invention to provide an image forming unit and an image forming apparatus in which a drive transmitting path from the main body of the apparatus is minimized and the downsizing of the apparatus and a reduction in production cost are achieved.

It is another object of the present invention to provide an image forming unit and an image forming apparatus in which the stability of the conveying speed of a belt is achieved and the number of parts is decreased, whereby downsizing and a reduction in cost are possible.

It is another object of the present invention to provide an image forming unit and an image forming apparatus comprising an image bearing member and an intermediate transfer member to which a toner image on the image bearing member is transferred, the image bearing member and the intermediate transfer member being movable relative to each other in the image forming unit.

It is another object of the present invention to provide an image forming unit and an image forming apparatus comprising an image bearing member, an intermediate transfer member to which a toner image on the image bearing member is transferred, transfer-contact-separation means for moving transfer means for transferring the toner image on the intermediate transfer member to a recording material into and out of contact with the intermediate transfer member.

It is another object of the present invention to provide an image forming unit and an image forming apparatus comprising an image bearing member, an intermediate transfer member to which a toner on the image bearing member is transferred, cleaning means for cleaning the intermediate transfer member, and cleaning-contact-separation means for moving the cleaning means into and out of contact with the intermediate transfer member.

It is another object of the present invention to provide an image forming unit and an image forming apparatus comprising an image bearing member, an intermediate transfer member to which a toner image on the image bearing member is transferred, toner collecting means for collecting the toner removed from the image bearing member, intermediate transfer member drive transmitting means for transmitting a driving force to the intermediate transfer member, and toner carrying means for carrying the toner removed from the image bearing member to the toner collecting means, the drive transmission to the toner carrying means being effected through the intermediate transfer member drive transmitting means.

It is another object of the present invention to provide an image forming unit and an image forming apparatus comprising an image bearing member, an endless belt to which a toner image on the image bearing member is transferred in a transferring portion, a driving rotary member for driving the belt, and a driven rotary member rotated by the movement of the belt, the belt being stretched around the driving rotary member and the driven rotary member, the transferring portion being located downstream of the driving rotary member and upstream of the driven rotary member in the direction of movement of the belt.

Further objects of the present invention will become apparent from the following description.

BRIEF DESCRIPTION FO THE DRAWINGS

FIG. 8 illustrates the mounting and dismounting of the image bearing member unit.

Figure 9D:
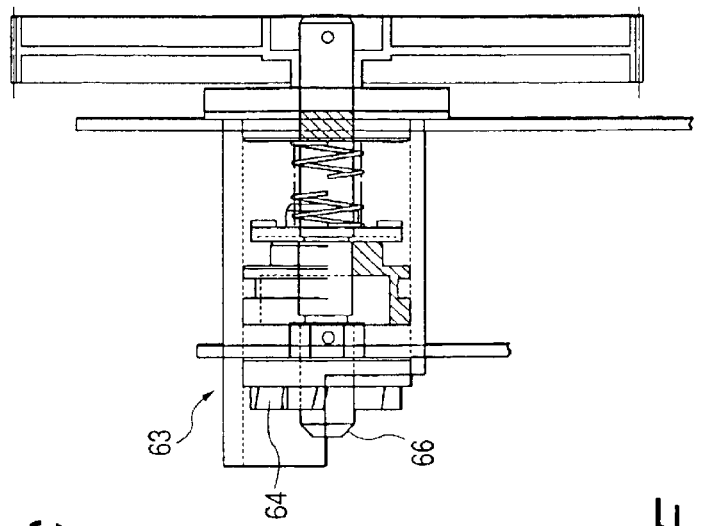
Figure 9C:
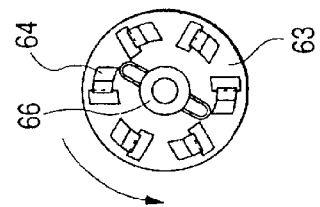
Figure 9F:
Figure 9B:
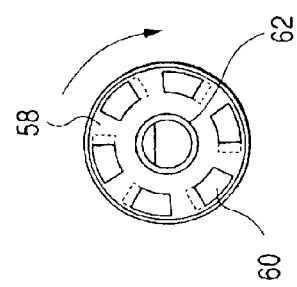
Figure 9E:
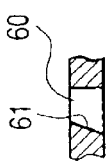
Figure 9A:
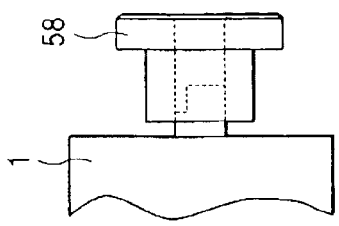

FIGS. 9A, 9B, 9C, 9D, 9E and 9F illustrate a driving coupling portion, FIG. 9A being a side view of the drive transmitting coupling of a process cartridge side, FIG. 9B being a front view of the drive transmitting coupling of the process cartridge side, FIG. 9C being a front view of the coupling of the image forming apparatus side, FIG. 9D being a side view of the coupling of the image forming apparatus side, FIG. 9E being a cross-sectional view of the groove of the drive transmitting coupling of FIG. 9B, and FIG. 9F being a cross-sectional view of the claw of the coupling of FIG. 9C.

FIG. 10 illustrates an image forming apparatus according to the conventional art.

Figure 11:
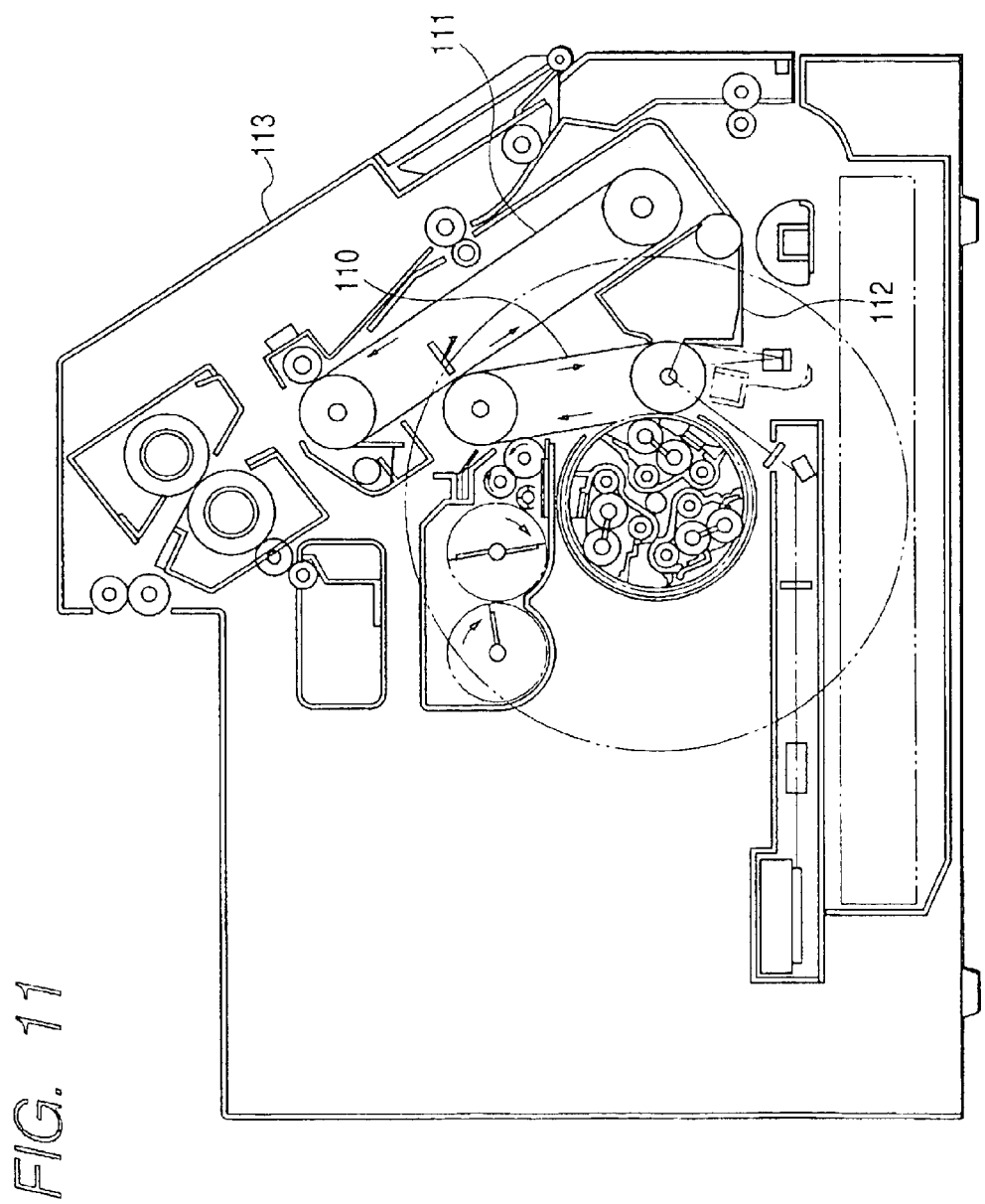

FIG. 11 illustrates another image forming apparatus according to the conventional art.

Figure 12:
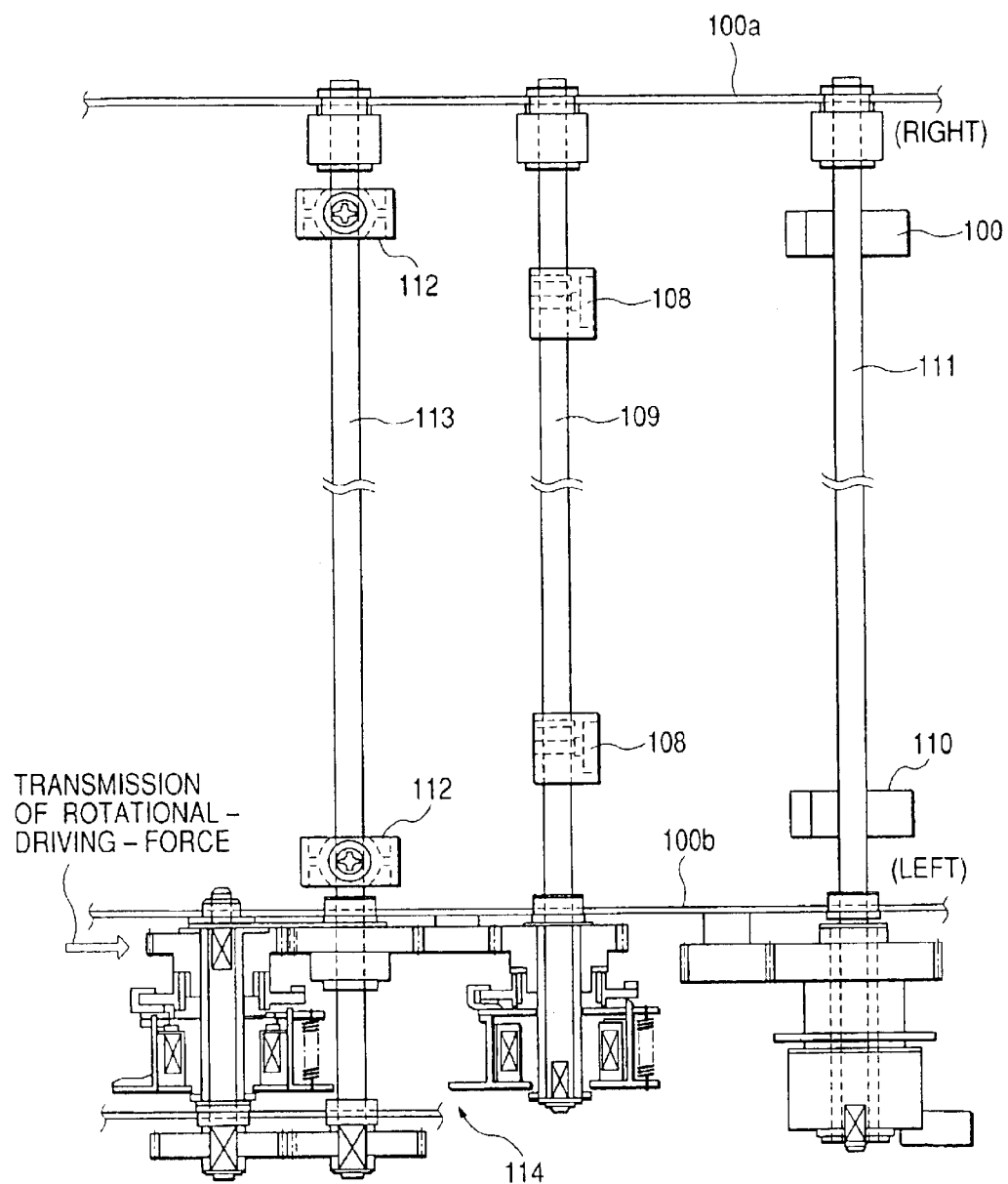

FIG. 12 illustrates cam drive transmitting means according to the conventional art.

Figure 13:
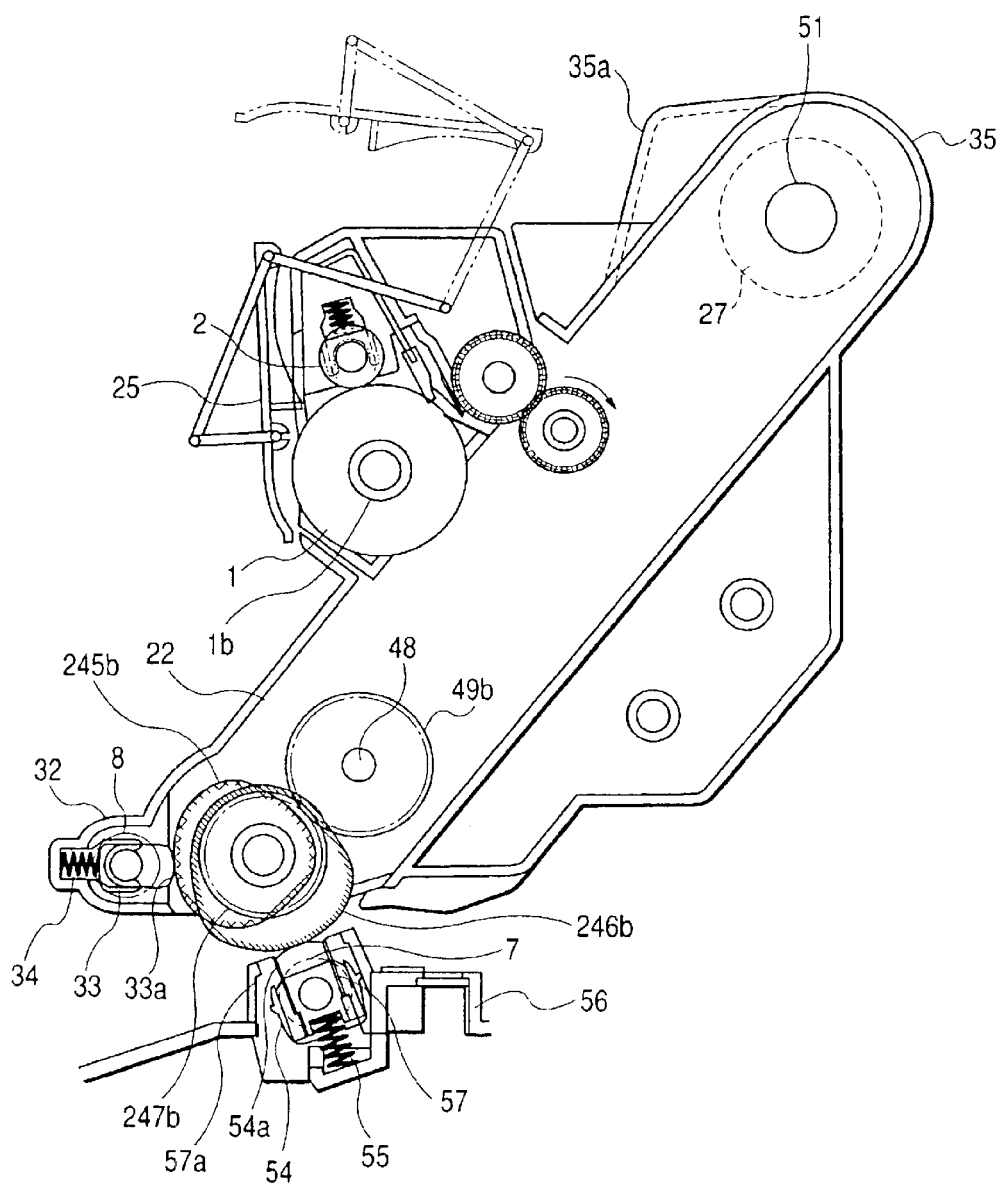

FIG. 13 is a side view of an intermediate transfer member unit as it is seen from the left side relative to the front thereof.

Figure 14:
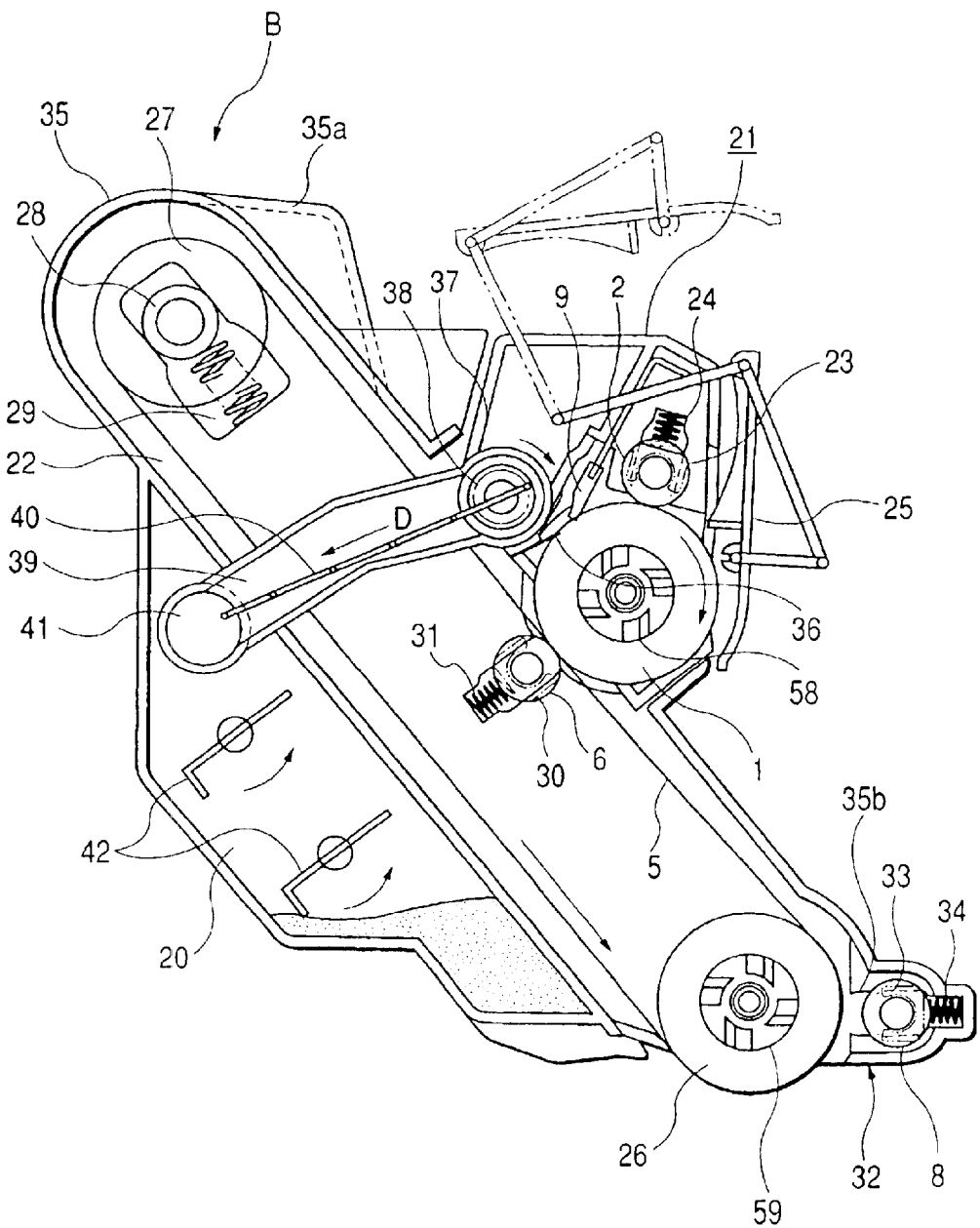

FIG. 14 is a side view of the intermediate transfer member unit as it is seen from the right side relative to the front thereof.

Figure 15:
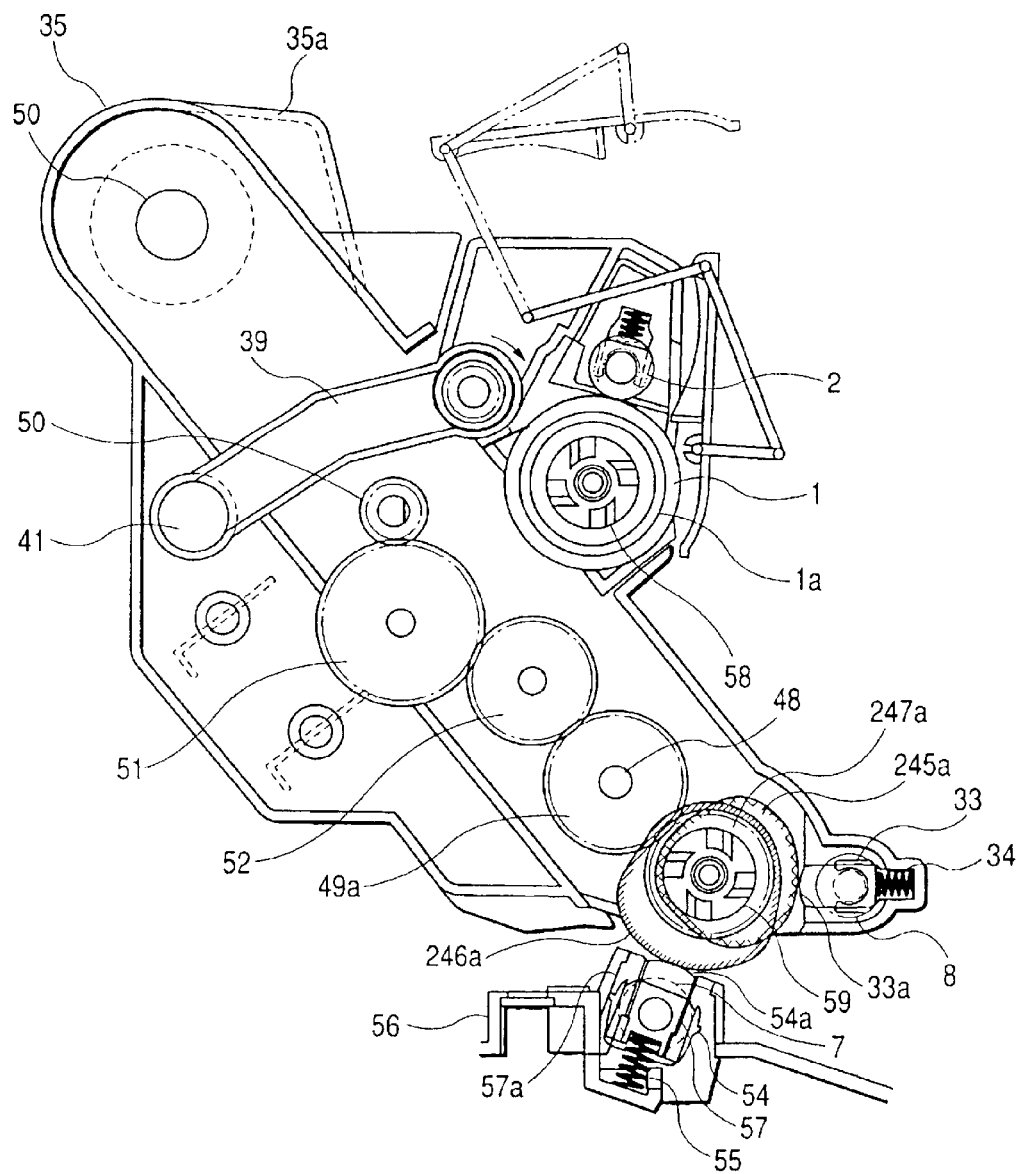

FIG. 15 is a side view of the intermediate transfer member unit as it is seen from the right side relative to the front thereof.

Figure 16:
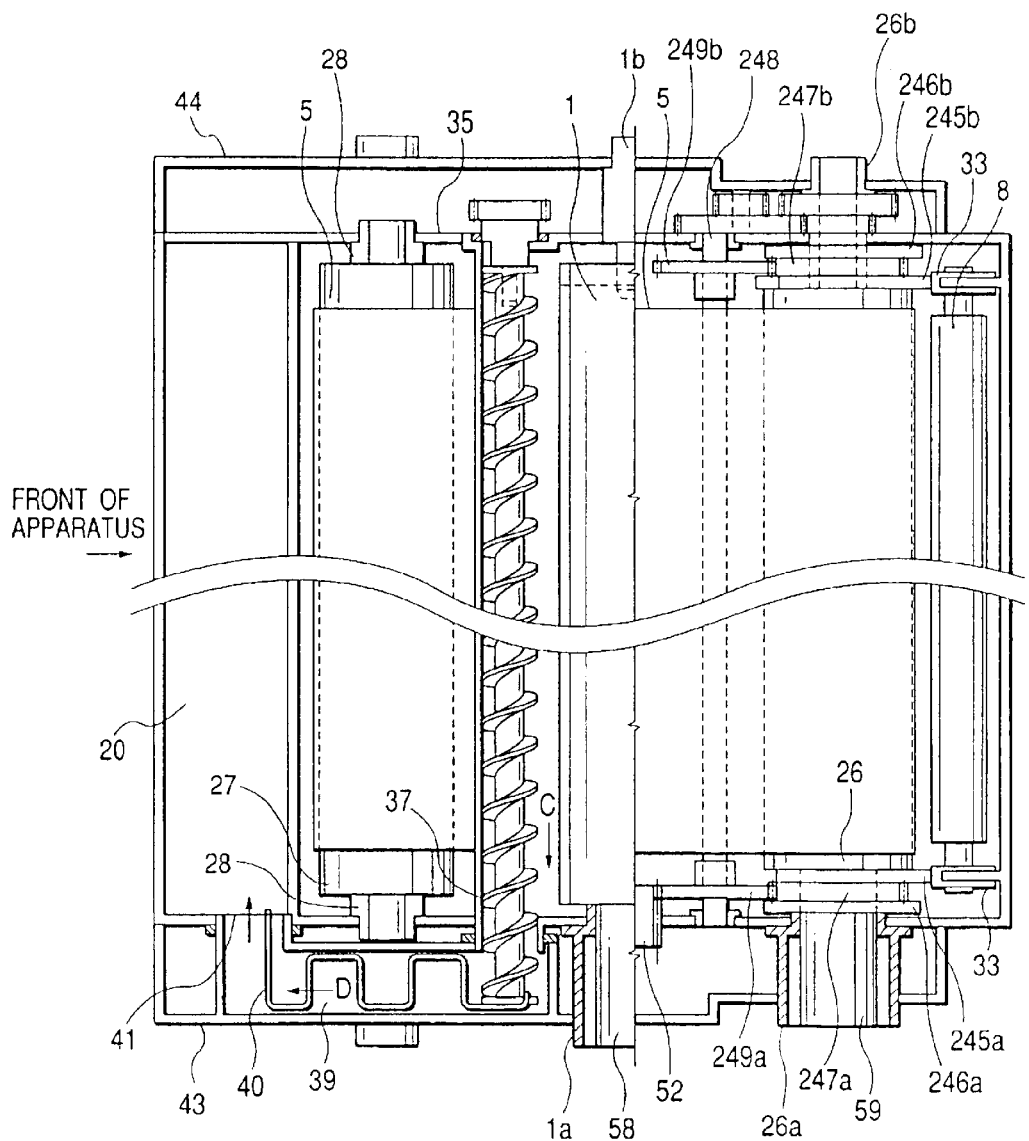

FIG. 16 is a top plan view of the intermediate transfer member unit.

Figure 17:
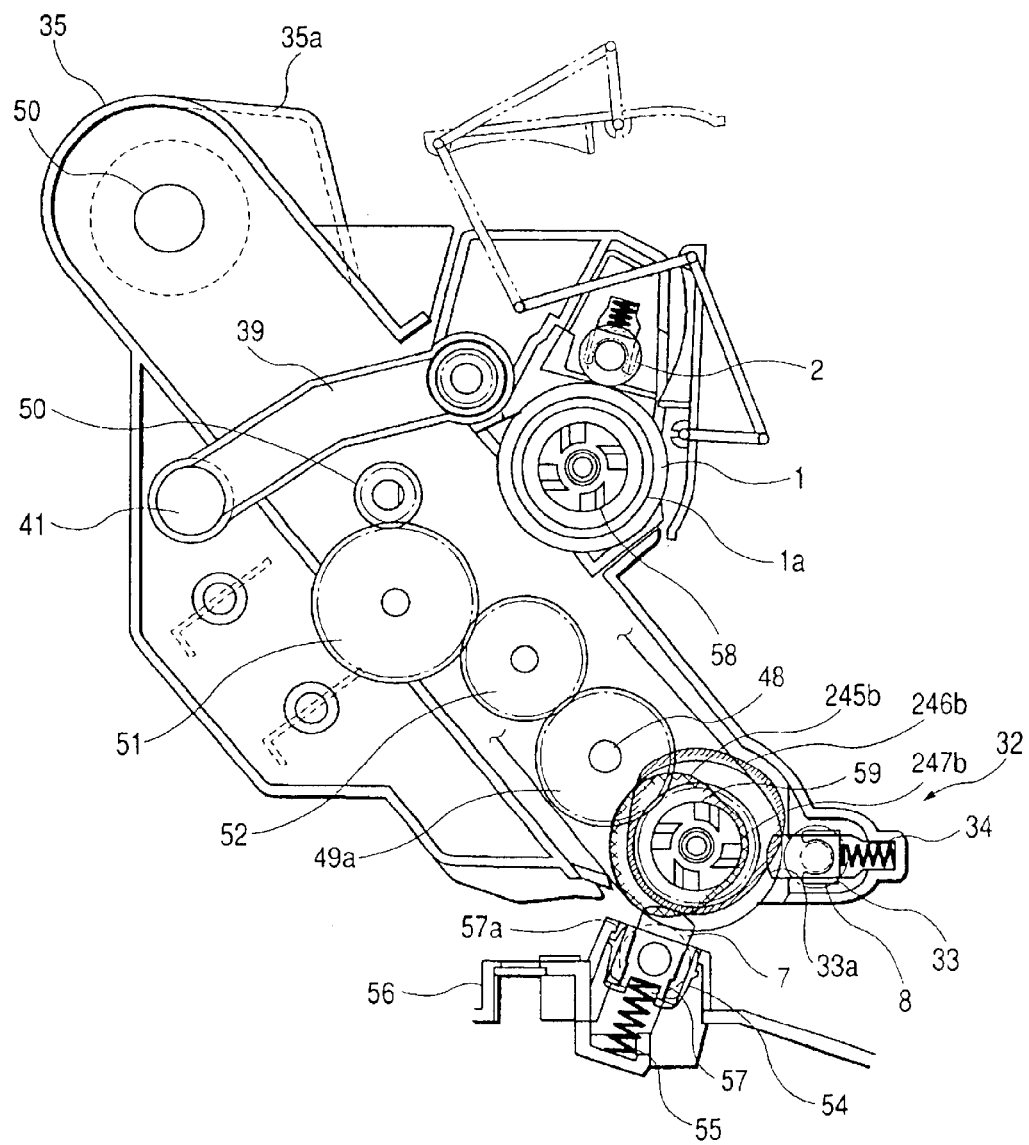

FIG. 17 shows secondary transfer means and cleaning means as they abut against the intermediate transfer member.

Figure 18A:
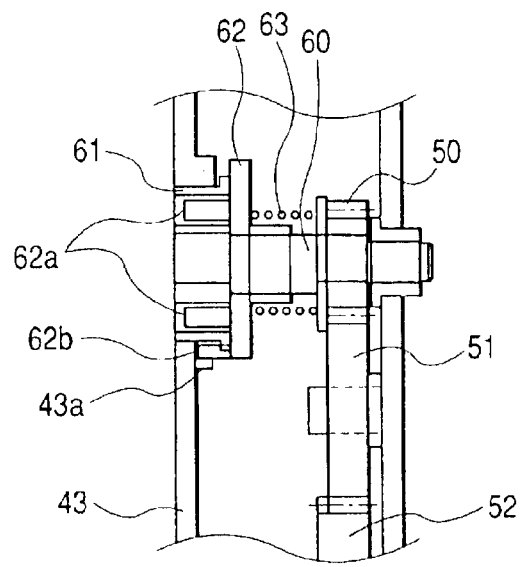
Figure 18C:
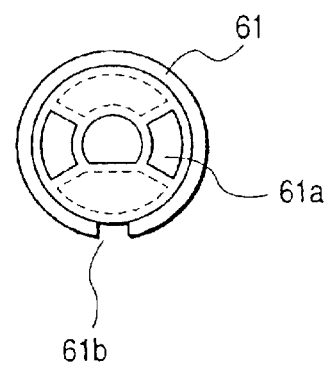
Figure 18B:
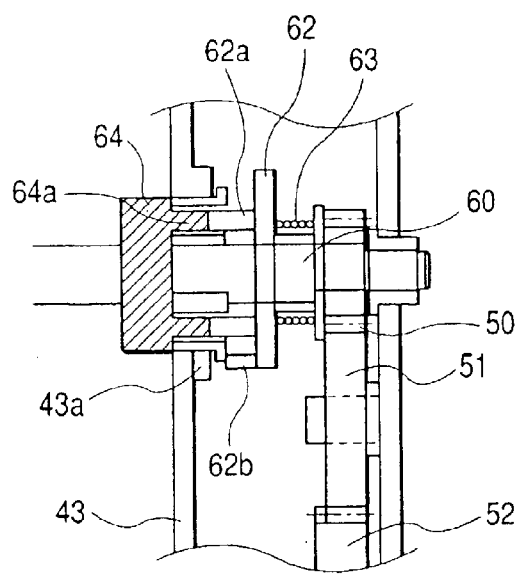

FIGS. 18A, 18B and 18C illustrate cam drive transmitting means, FIG. 18A being a side view of the cam drive transmitting means, FIG. 18B showing the drive coupling of the main body of the image forming apparatus and the cam drive transmitting means as they are connected together, and FIG. 18C being a front view of the coupling.

Figure 19:
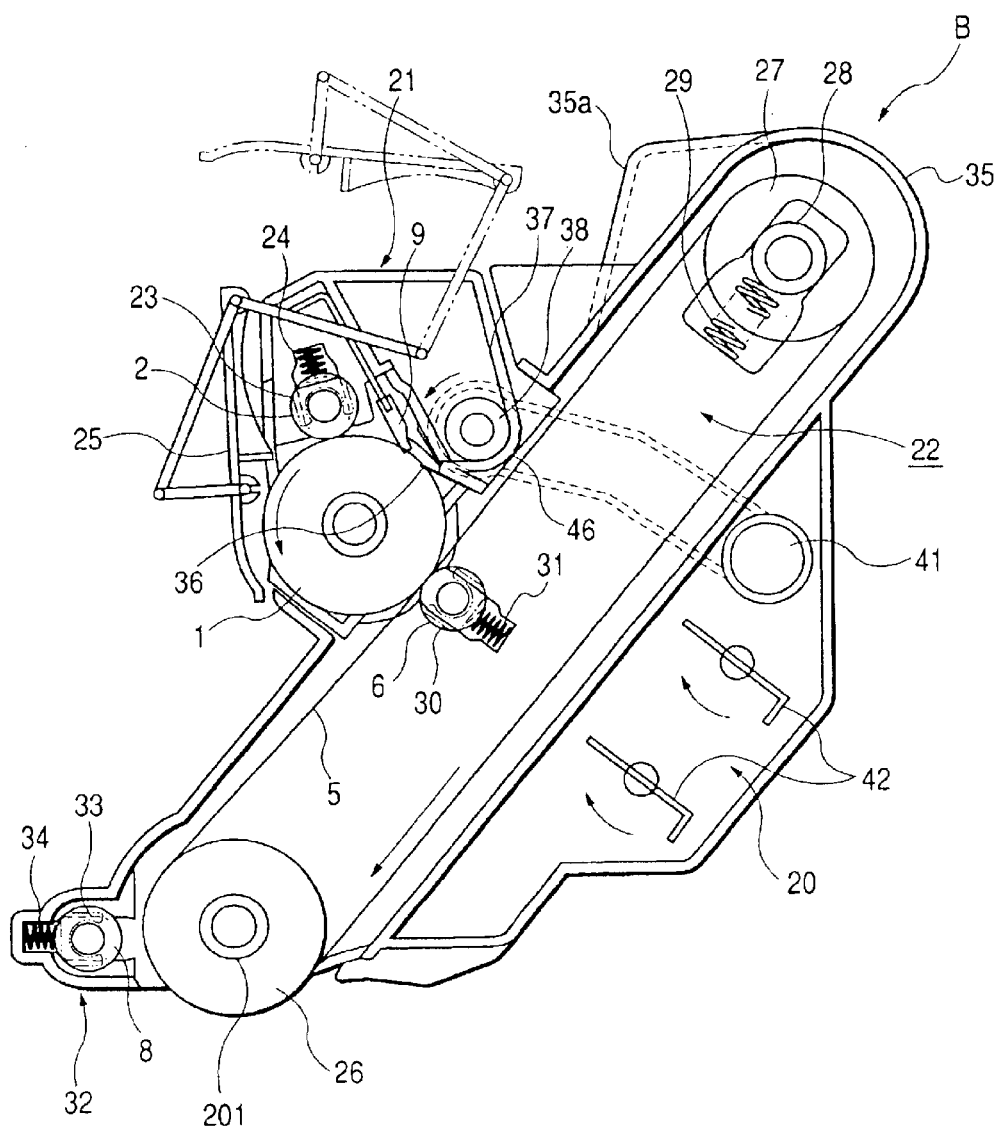

FIG. 19 is a longitudinal cross-sectional view schematically showing the construction of an image forming unit, and more particularly a longitudinal cross-sectional illustration thereof as it is seen from the left of the front of the apparatus.

Figure 20:
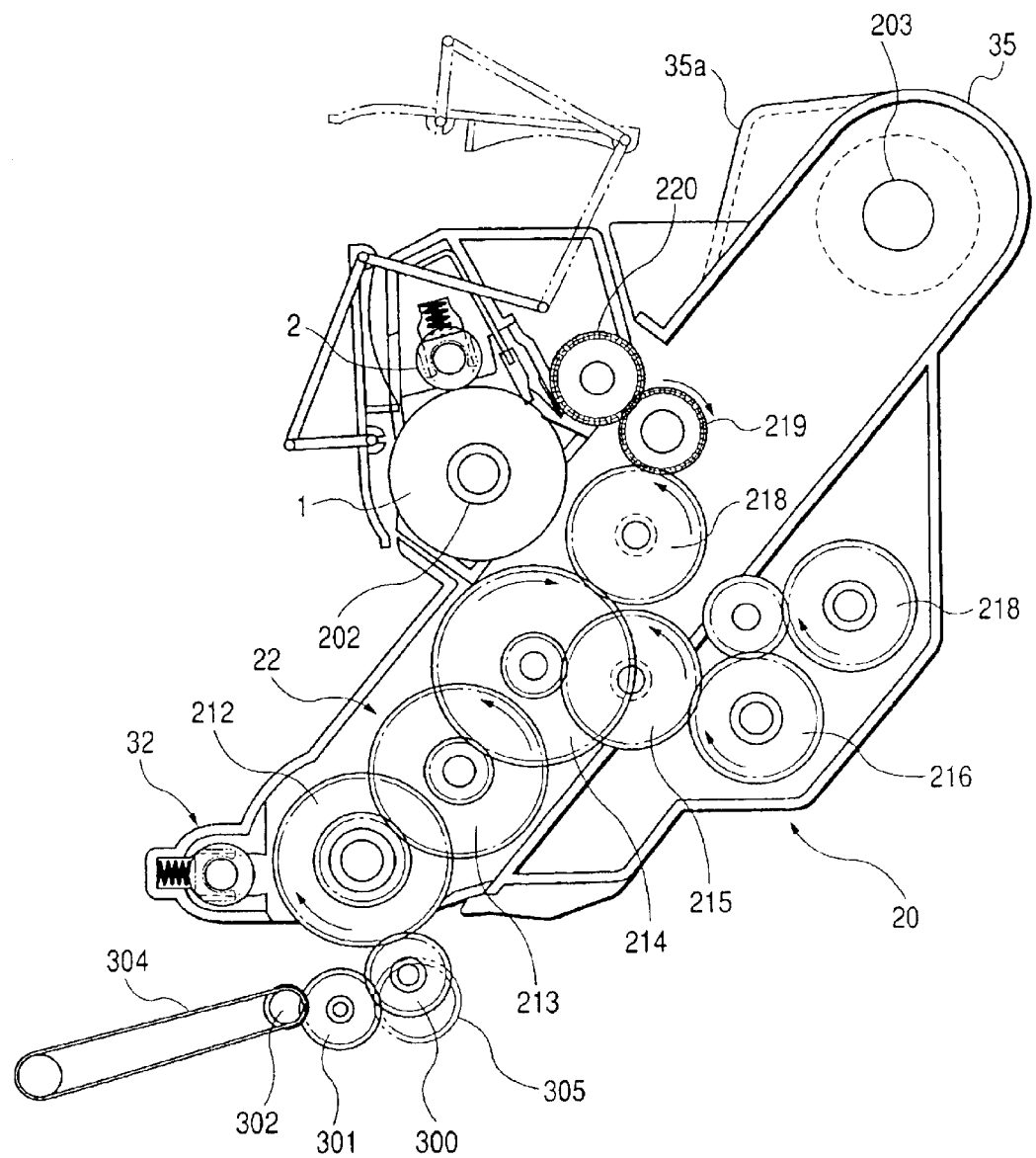

FIG. 20 is a longitudinal cross-sectional illustration showing the drive transmitting construction of the image forming unit.

Figure 21:
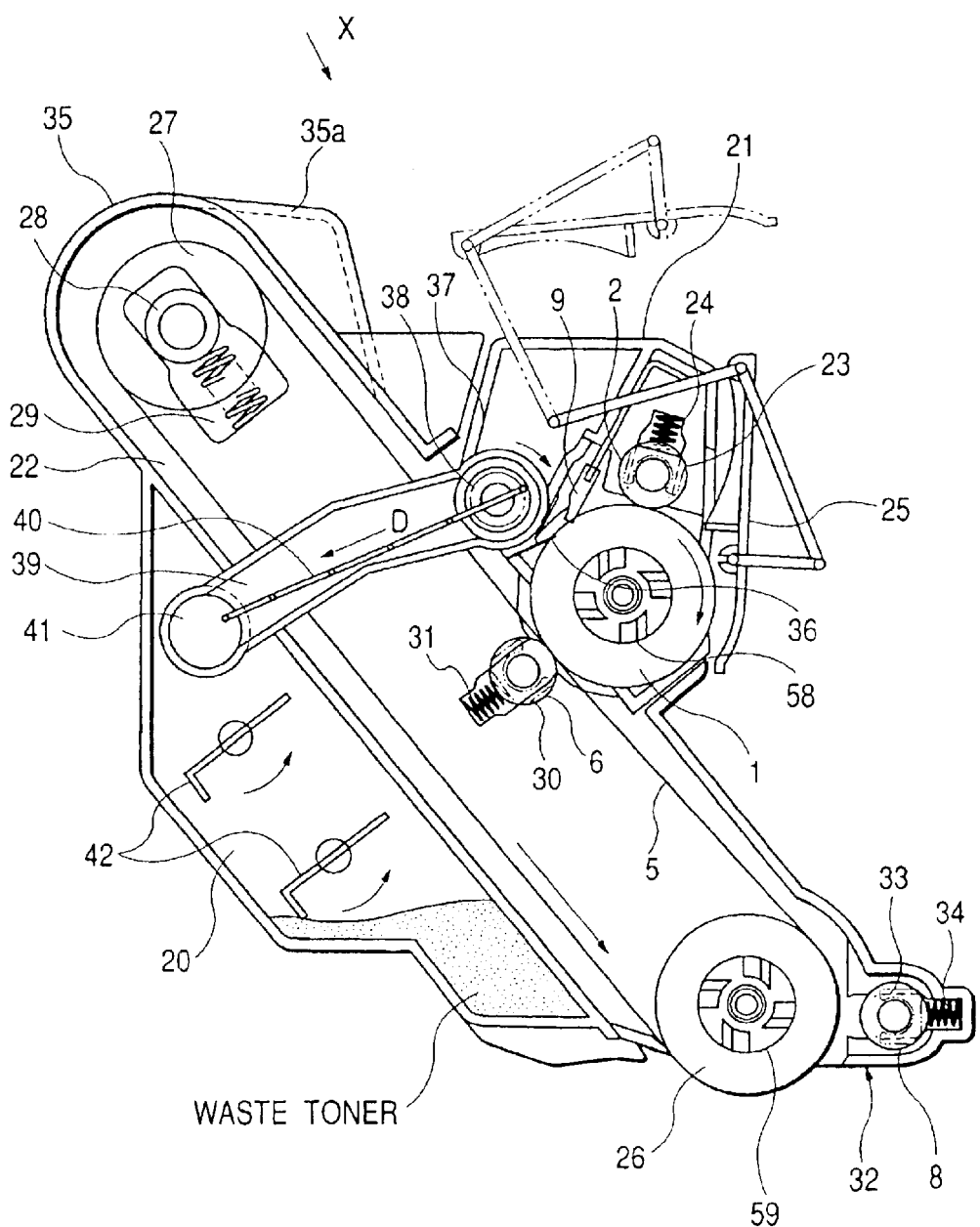

FIG. 21 is a longitudinal cross-sectional illustration of the image forming unit as it is seen from the right of the front of the apparatus.

Figure 22:
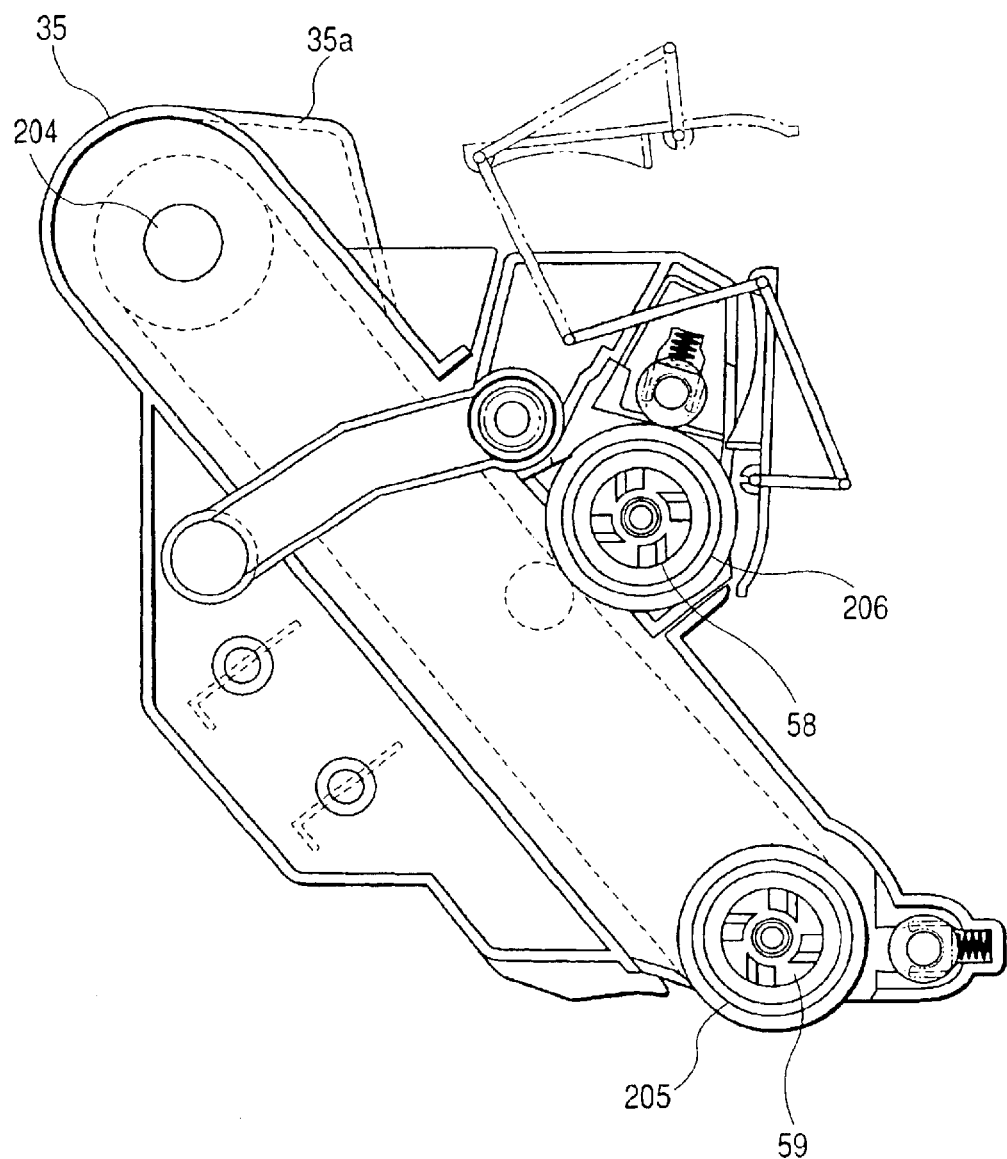

FIG. 22 is a longitudinal cross-sectional illustration of the image forming unit as it is seen from the right of the front of the apparatus.

Figure 23:
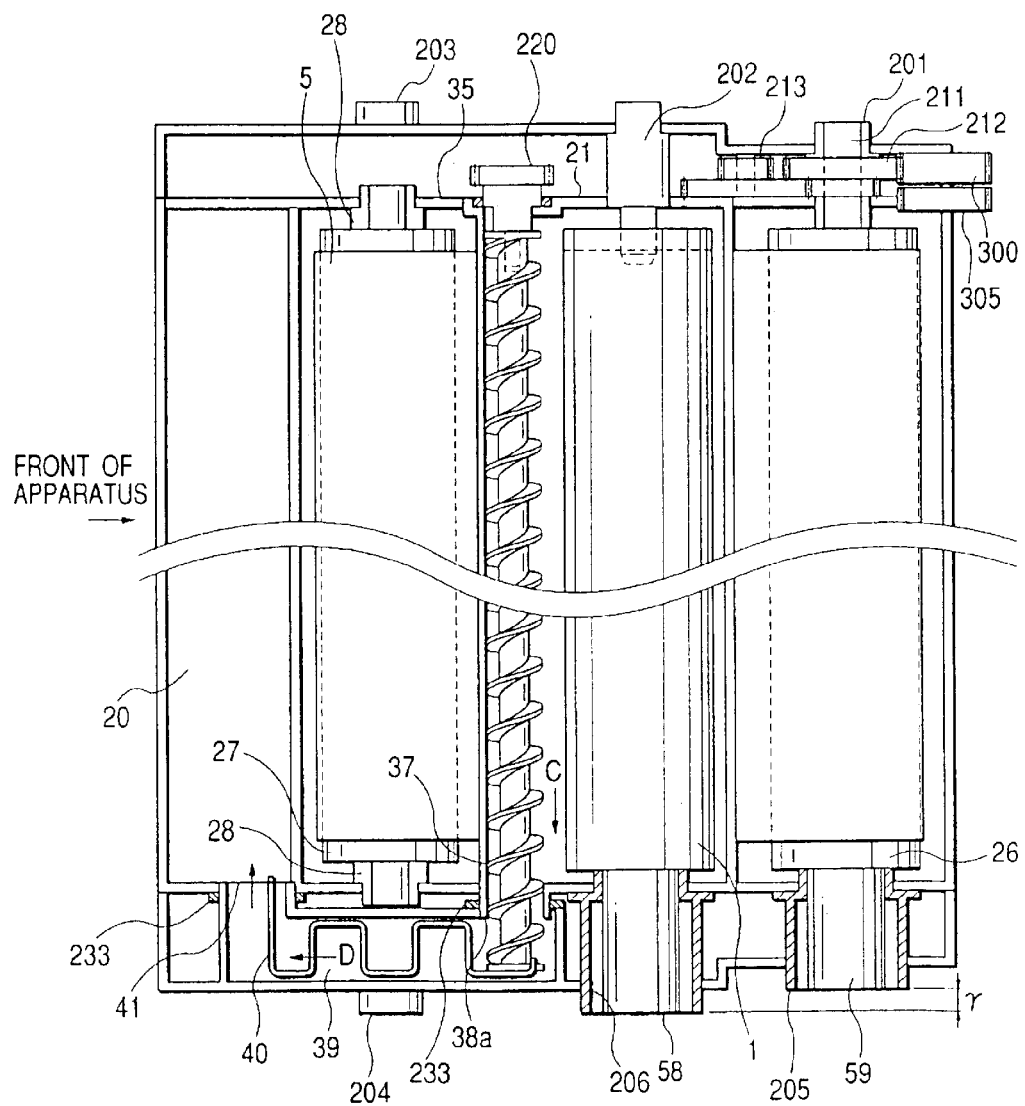

FIG. 23 is a transverse cross-sectional illustration of a waste toner carrying path portion as it is seen from the upper portion of FIG. 21.

Figure 24A:
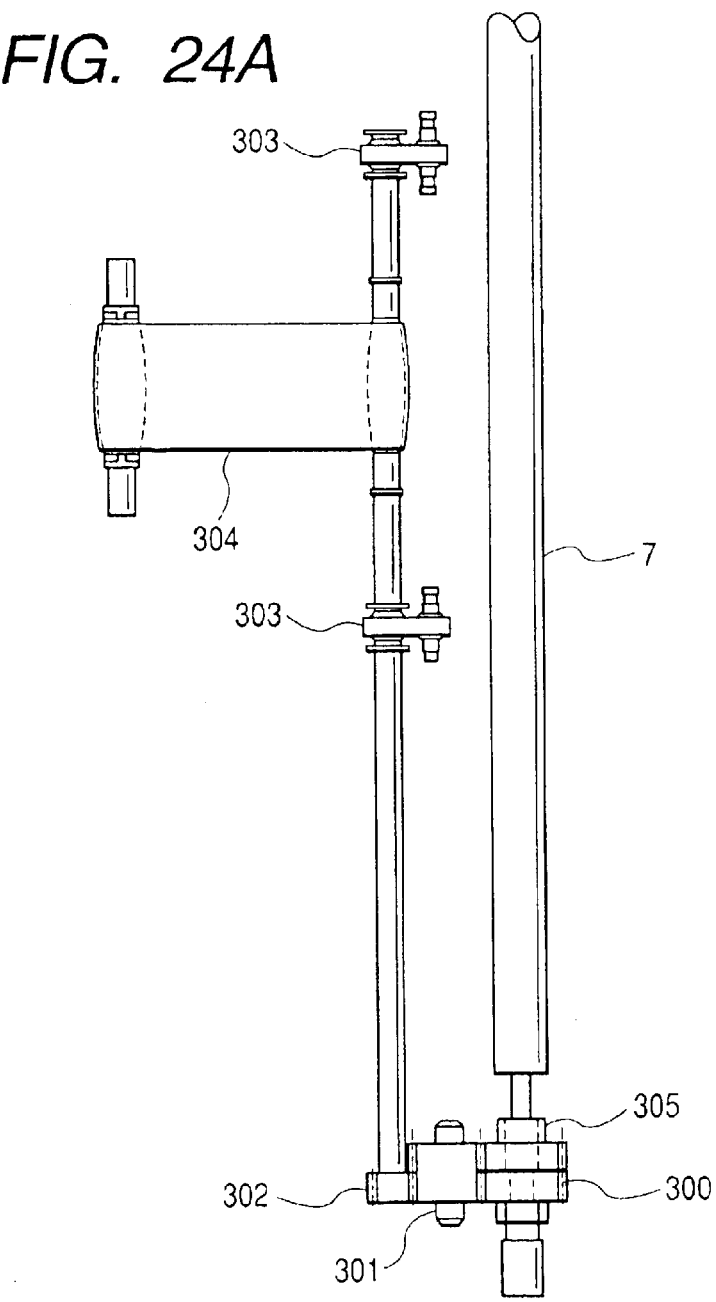

FIG. 24A is an illustration of the construction of a conveying belt unit.

Figure 24B:
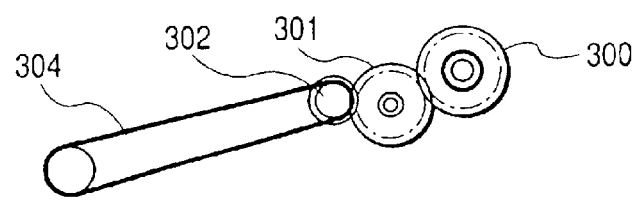

FIG. 24B is a side view of the conveying belt unit.

Figure 25:
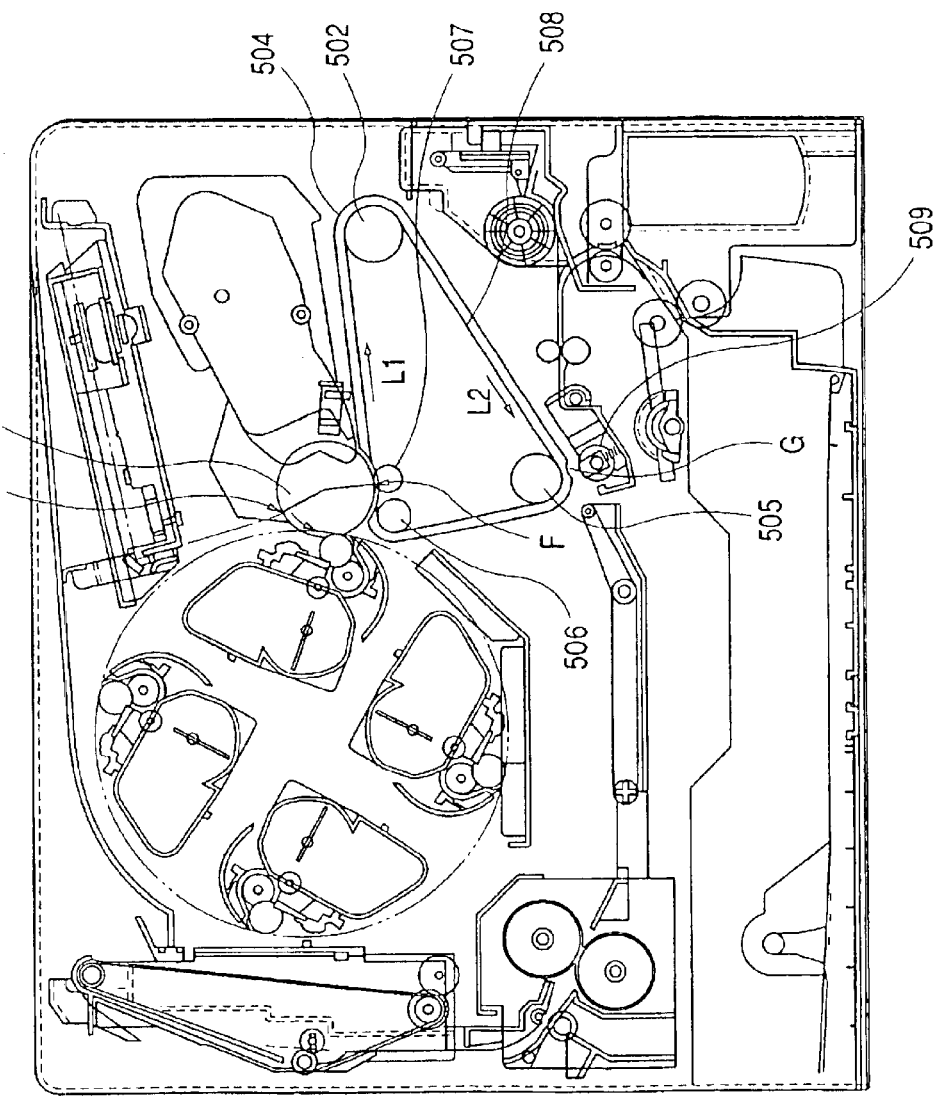

FIG. 25 is an illustration of an image forming apparatus according to the conventional art.

Figure 26:
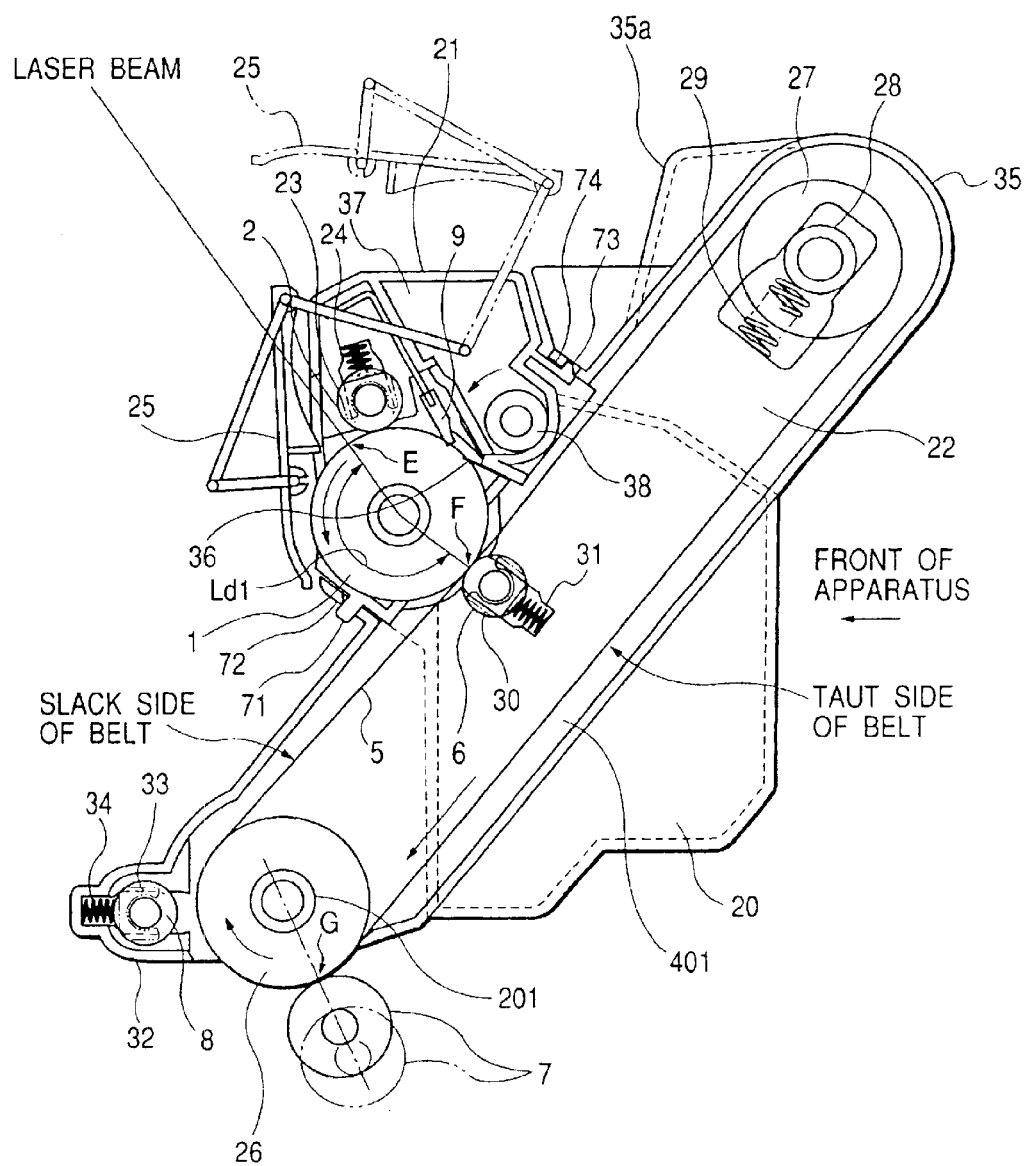

FIG. 26 is a main longitudinal cross-sectional illustration of the image forming unit as it is seen from the left side thereof.

Figure 27:
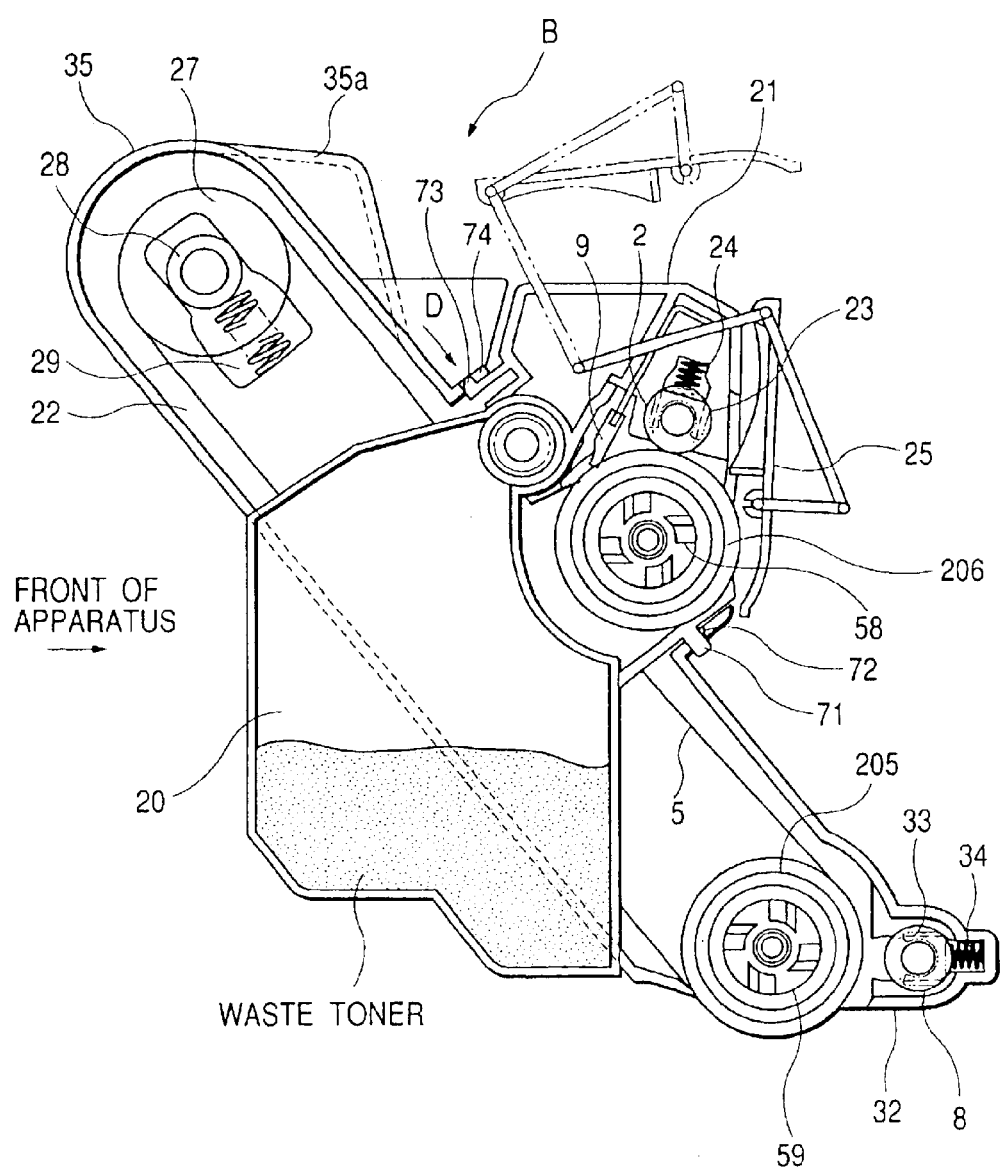

FIG. 27 is a main longitudinal cross-sectional illustration of the image forming unit as it is seen from the right side thereof.

Figure 28:
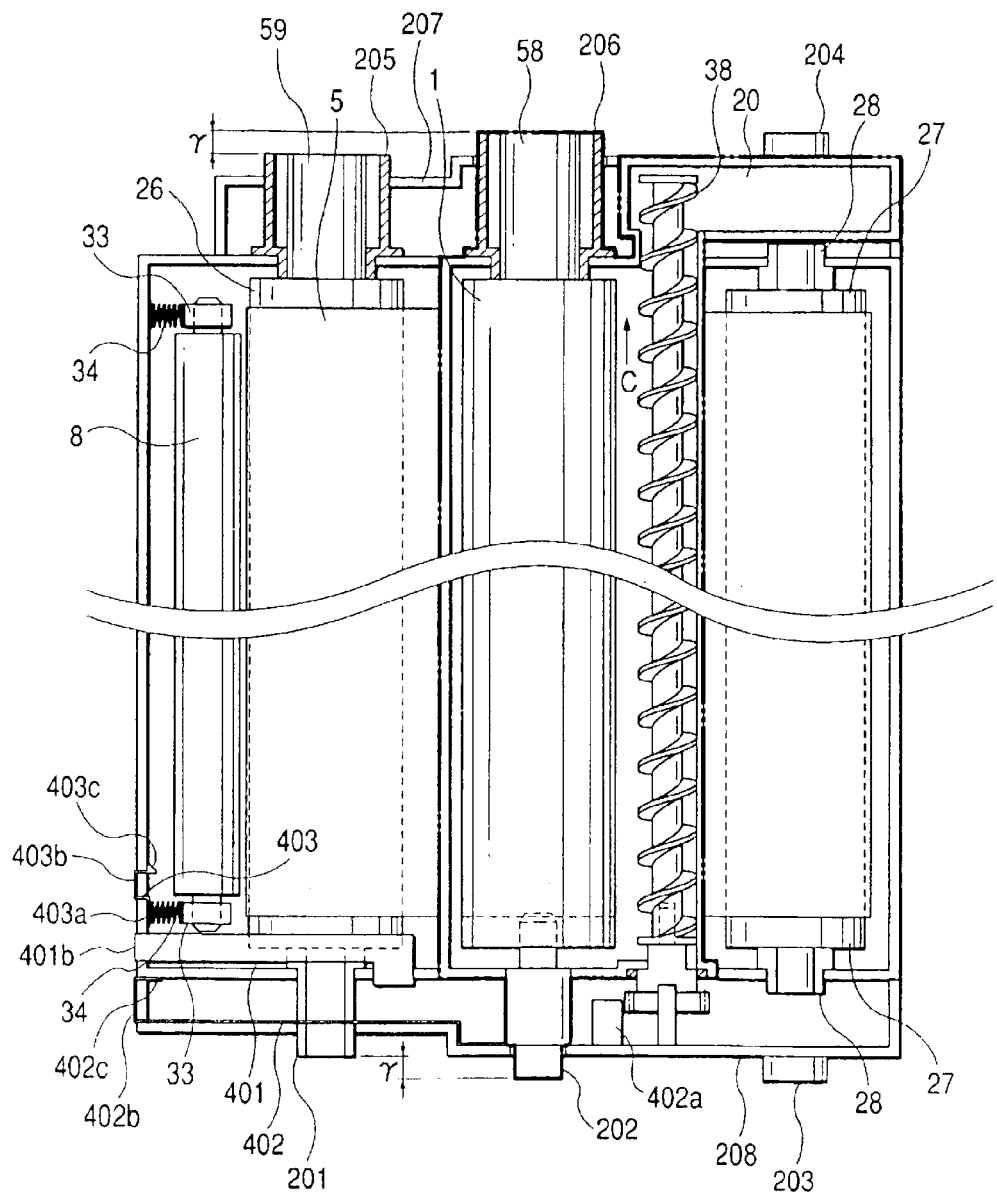

FIG. 28 is a cross-sectional illustration of the image forming unit as it is seen from above it.

Figure 29:
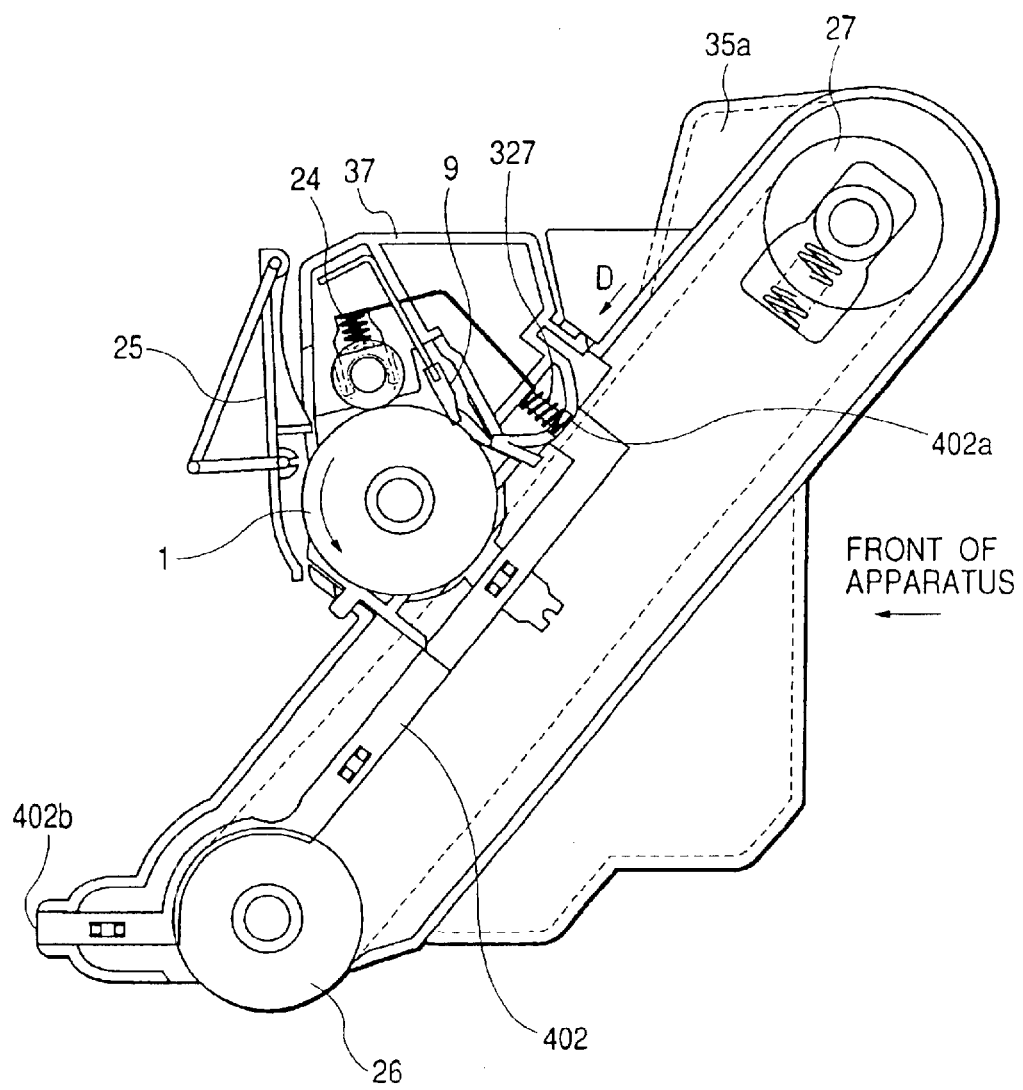

FIG. 29 is a cross-sectional illustration showing a bias voltage supplying path to a charging roller for charging a photosensitive drum.

Figure 30:
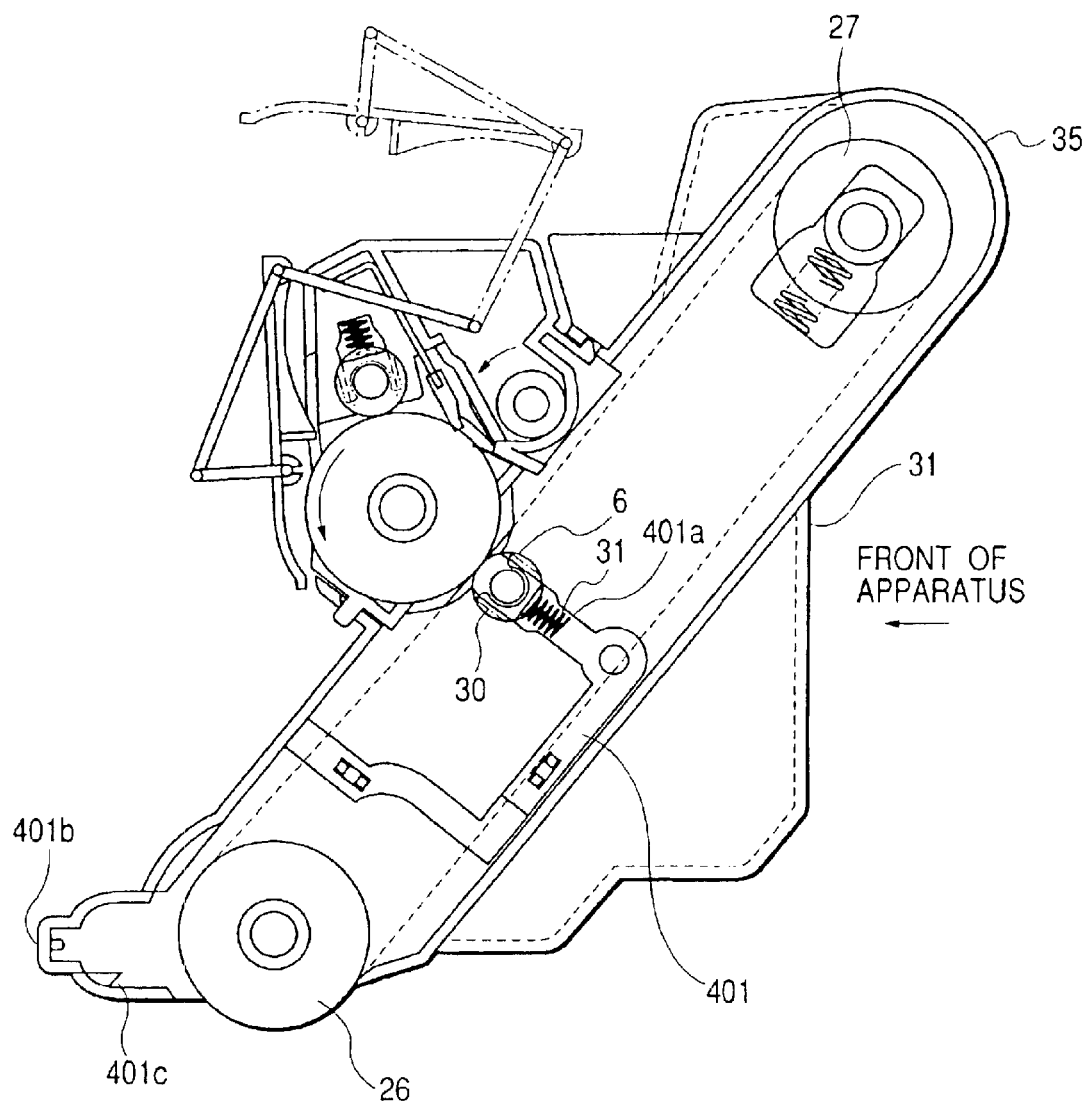

FIG. 30 is a cross-sectional illustration showing a bias voltage supplying path to a primary transfer roller.

Figure 31:
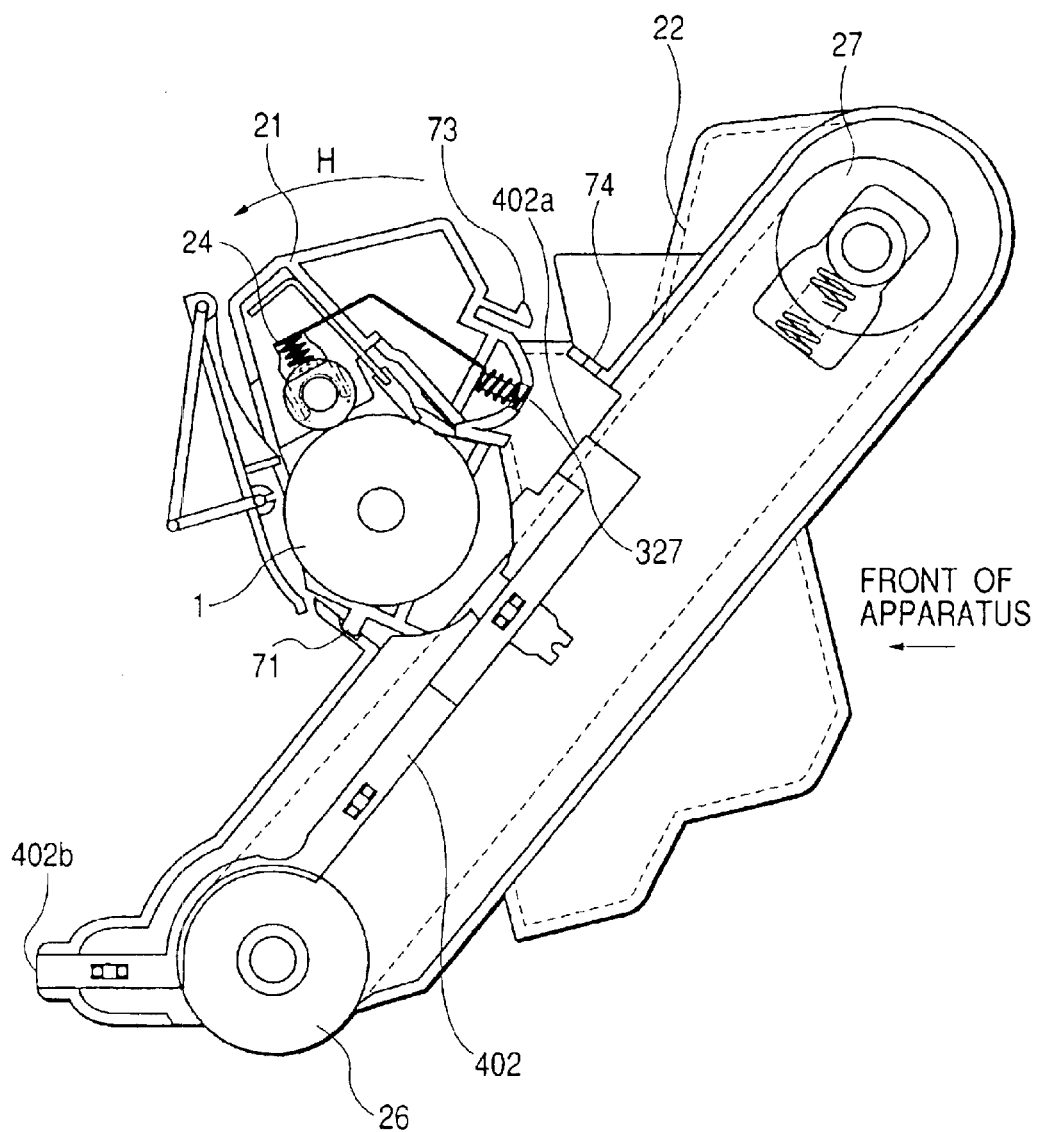

FIG. 31 is an illustration showing the situation of a high voltage contact portion when a photosensitive member unit and the intermediate transfer member unit are divided.

Figure 32:
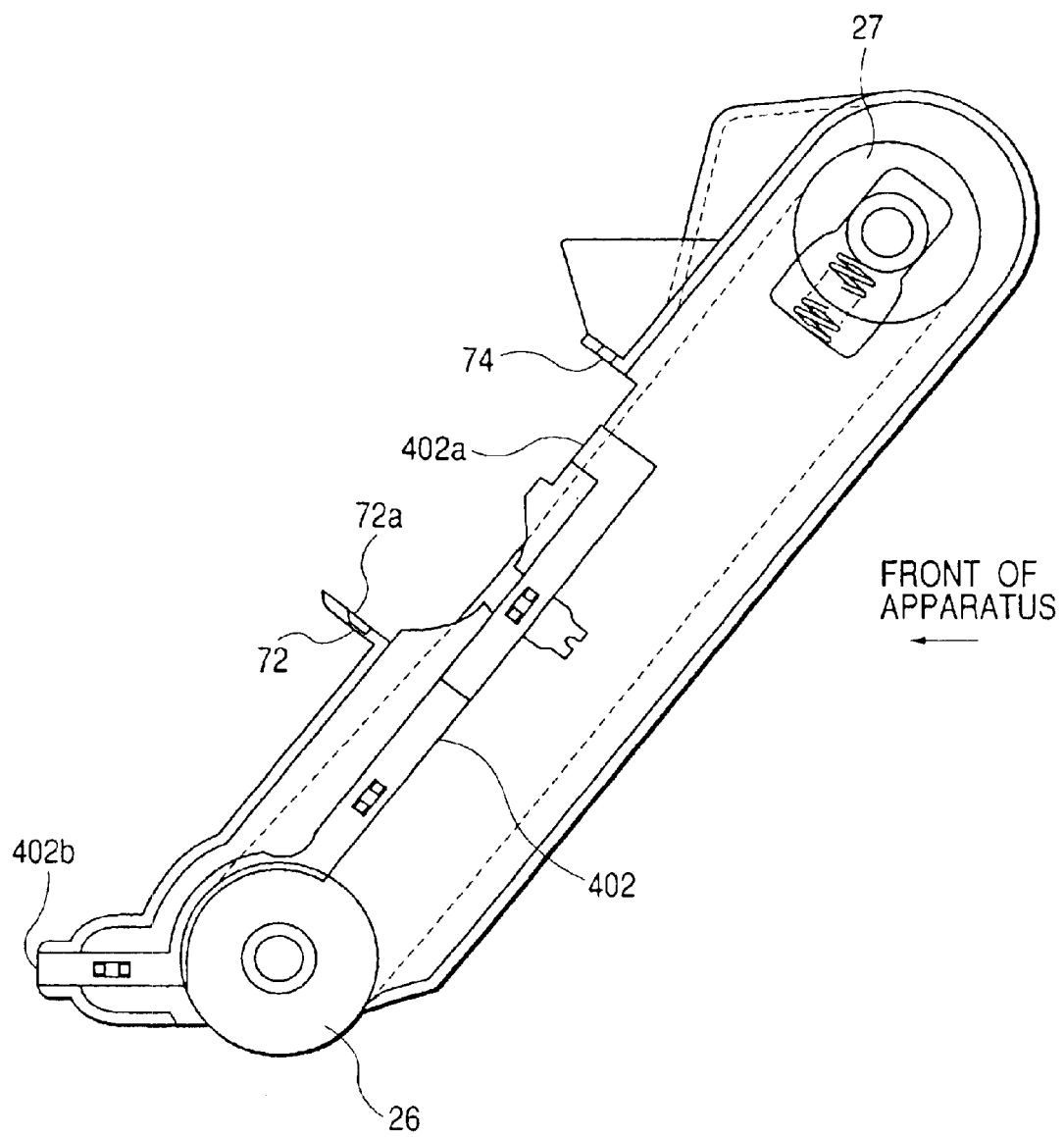

FIG. 32 is an illustration of the intermediate transfer member unit.

Figure 33:
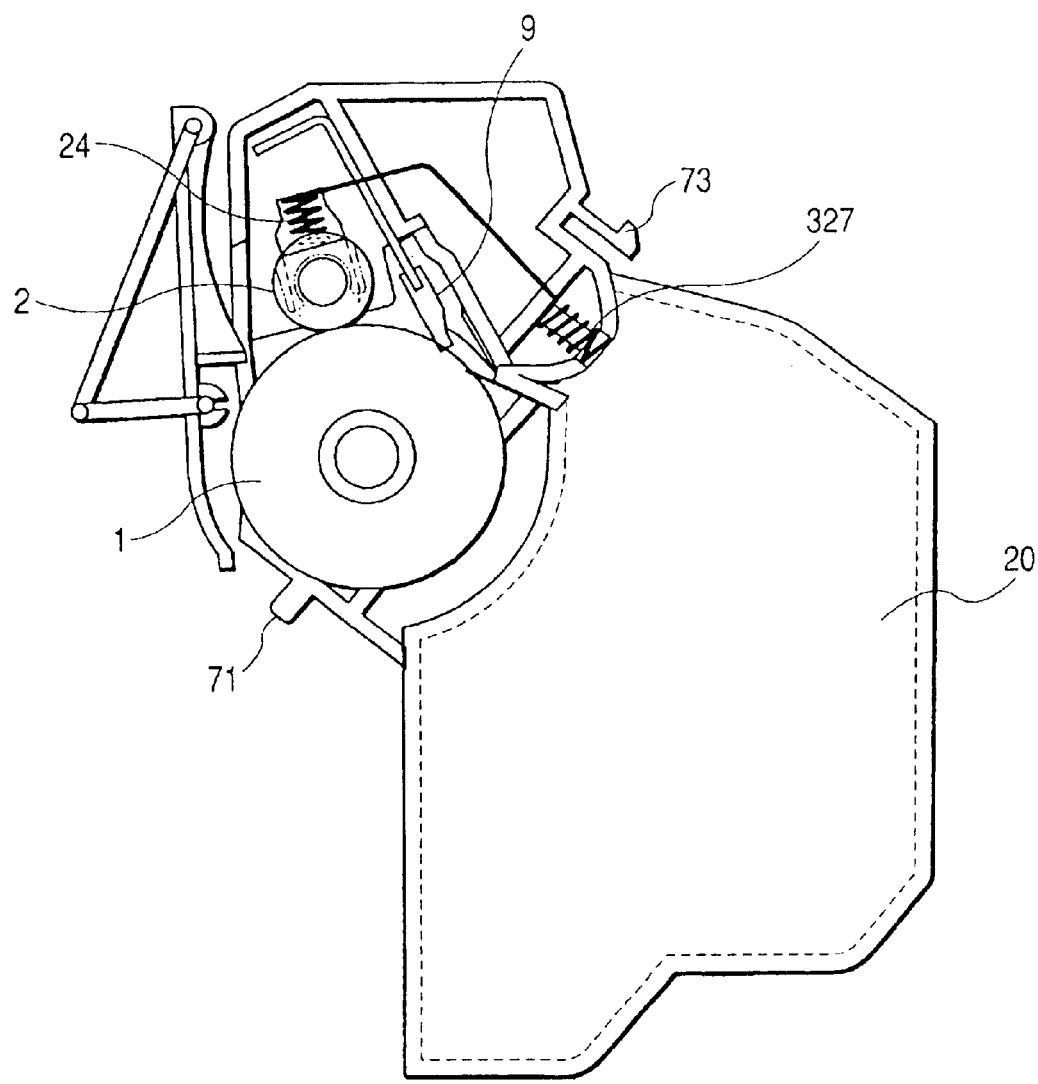

FIG. 33 is an illustration of the photosensitive member unit.

FIGS. 34A, 34B and 34C are graphs of the result of an experiment showing the revolution period of an intermediate transfer belt of two-axis construction, and FIG. 34D is a table showing the obtained result.

Figure 35:
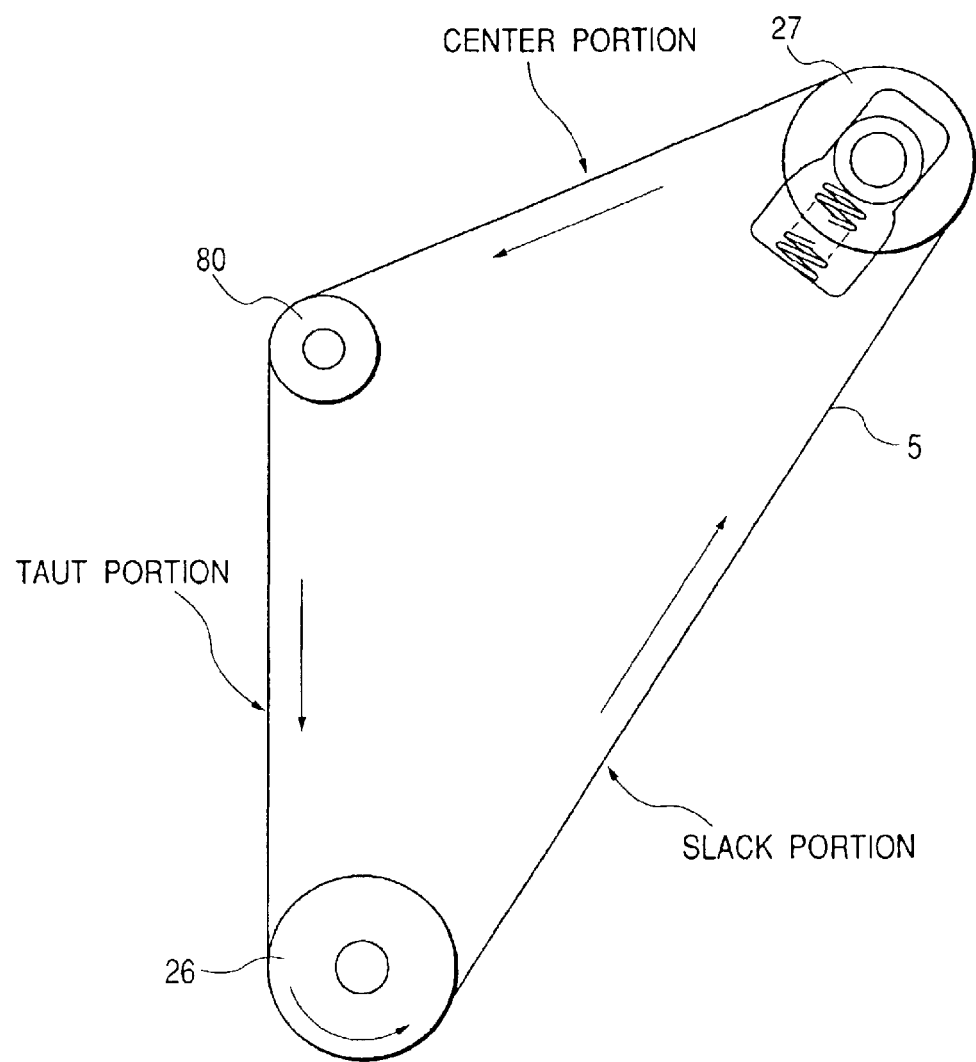

FIG. 35 is a schematic view of an intermediate transfer belt of three-axis construction.

FIGS. 36A, 36B and 36C are graphs of the result of an experiment showing the revolution period of the intermediate transfer belt of three-axis construction, and FIG. 36D is a table showing the obtained result.

Figure 37:
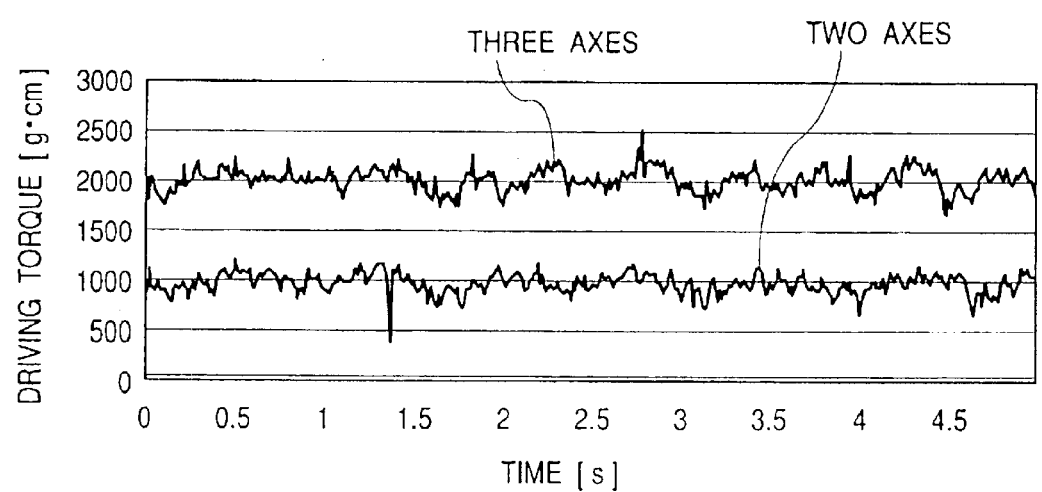

FIG. 37 is a graph showing the torque fluctuations of two-axis and three-axis driving rollers.

DESCRIPTION OF THE PREFERRED EMBODIMENTS

The preferred embodiments of an image forming unit and an image forming apparatus according to the present invention will hereinafter be described with reference to the drawings. In the present embodiment, the image forming apparatus is a four full color laser beam printer adopting the electrophotographic process.

(Image Forming Apparatus)

Figure 1:
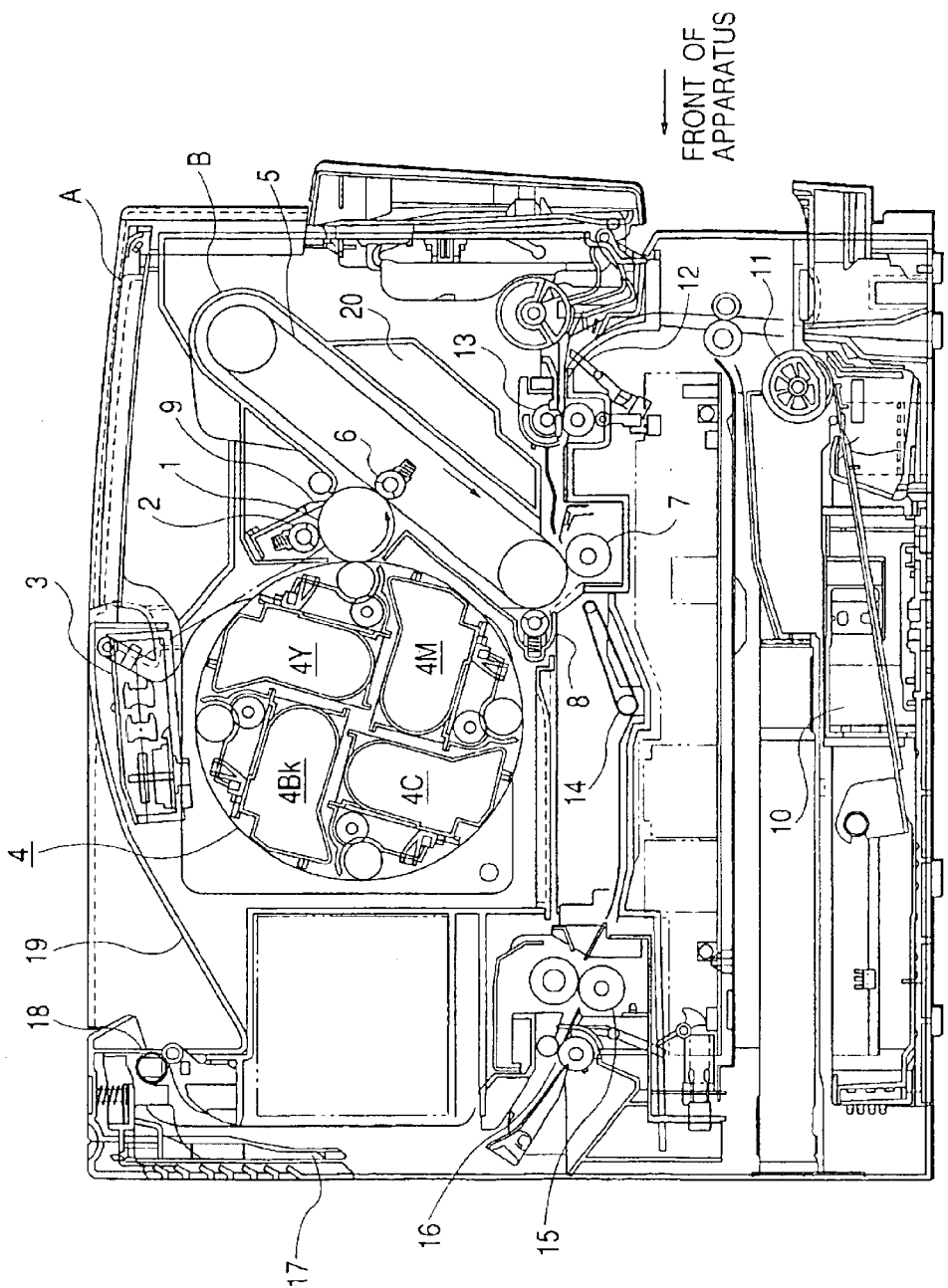
FIG. 1 is a longitudinal cross-sectional view schematically illustrating the construction of an image forming apparatus which is an embodiment of the present invention.

FIG. 1 is a longitudinal cross-sectional view schematically illustrating the construction of the image forming apparatus. The image forming apparatus A detachably and mountably has a process cartridge B which is an image forming unit having a photosensitive drum 1 which is an image bearing member, and an intermediate transfer belt 5 which is an intermediate transfer member. The process cartridge B will be described later.

In case of image formation, the photosensitive drum 1 which is an image bearing member has its surface uniformly charged by a charging roller 2 which is charging means while being rotated in the direction of an arrow (counter-clockwise direction) and the application of light thereto is effected by exposing means 3 to thereby form an electrostatic latent image thereon. Simultaneously with the formation of the electrostatic latent image, a developing apparatus 4 is driven to thereby first dispose a yellow developing device 4Y at a developing position, and the electrostatic latent image on the photosensitive drum 1 is developed by a yellow toner. A voltage of the same polarity and substantially the same potential as the charging polarity of the photosensitive drum 1 is applied to the toner to thereby cause the yellow toner to adhere to the electrostatic latent image.

A toner image thus formed on the photosensitive drum 1 is transferred to an intermediate transfer belt 5 which is an intermediate transfer member rotated in synchronism with the photosensitive drum 1, by a primary transfer roller 6 which is primary transfer means. A voltage opposite in polarity to the toner is applied to the primary transfer roller 6 to thereby attract the toner image on the photosensitive drum 1. When the yellow toner image is primary-transferred, the developing apparatus 4 is rotated, and likewise the formation, development and primary transfer of an electrostatic latent image are sequentially effected with respect to each of magenta, cyan and black, and toner images of the four colors are superimposed on the intermediate transfer belt 5.

At this time, a secondary transfer roller 7 which will be described later is in non-contact with the intermediate transfer belt 5. A charging roller 8 as cleaning means for the intermediate transfer belt 5 is also positioned in non-contact with the intermediate transfer belt 5.

On the other hand, a feed cassette 10 for stacking thereon and supplying sheets which are recording materials is disposed in the lower portion of the main body A of the apparatus, and the sheets are fed to a pair of registration rollers 13 by a feed roller 11. An ante-registration sensor 12 for detecting the sheet is provided upstream of the pair of registration rollers 13, and detects the leading end of the sheet to thereby cut off the rotational driving force of the pair of registration rollers 13, and makes the sheet wait at a predetermined position.

After the toner images of the four colors are formed on the intermediate transfer belt 5, the secondary transfer roller 7 is brought into pressure contact with the intermediate transfer belt 5 (the state of FIG. 1). Further, the conveyance of the sheet waiting at the predetermined position near the pair of registration rollers 13 which are sheet conveying means is started in synchronism with the rotation of the intermediate transfer belt 5, and the sheet is fed to the nip portion between the intermediate transfer belt 5 and the secondary transfer roller 7. A voltage opposite in polarity to the toners is applied to the secondary transfer roller 7, and the toner images on the intermediate transfer belt 5 are collectively secondary-transferred onto the surface of the sheet conveyed thereto.

The sheet to which the toner images have been secondary-transferred comes to fixing means 15 via a conveying belt unit 14, and heat and pressure are applied thereto, whereby the toner images are fixed. The sheet is then conveyed along a delivery guide 17 by a fixing delivery roller 16, and is delivered and onto stacked on a delivery tray 19 provided on the upper surface of the apparatus by a pair of delivery rollers 18 and thus, image formation is completed.

On the other hand, a charging roller 8 as cleaning means is brought into pressure contact with the intermediate transfer belt 5 from which the secondary transfer has been terminated, and induces charges opposite to those during the transfer in the residual toners remaining on the intermediate transfer belt 5, whereby the residual toners on the intermediate transfer belt 5 electrostatically adhere to the photosensitive drum 1. A cleaning blade 9 as cleaning means abuts against the photosensitive drum 1, and the residual toners scraped off from the surface of the drum 1 are collected and stored in a waste toner collecting box 20 through waste toner carrying means which will be described later.

(Image Forming Unit)

Figure 2:
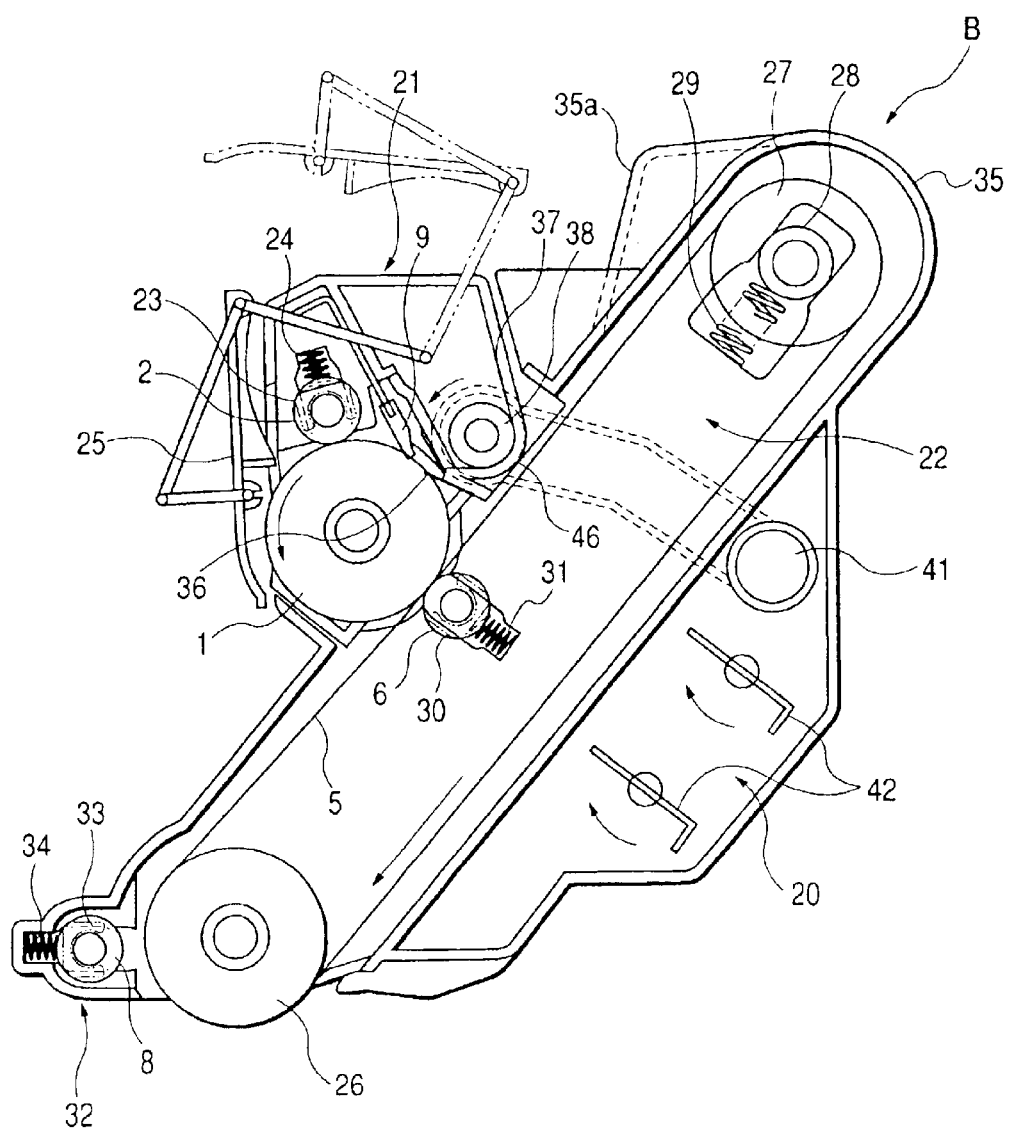
FIG. 2 is a side view of an image forming unit as it is seen from the left side relative to the front thereof.
Figure 3:
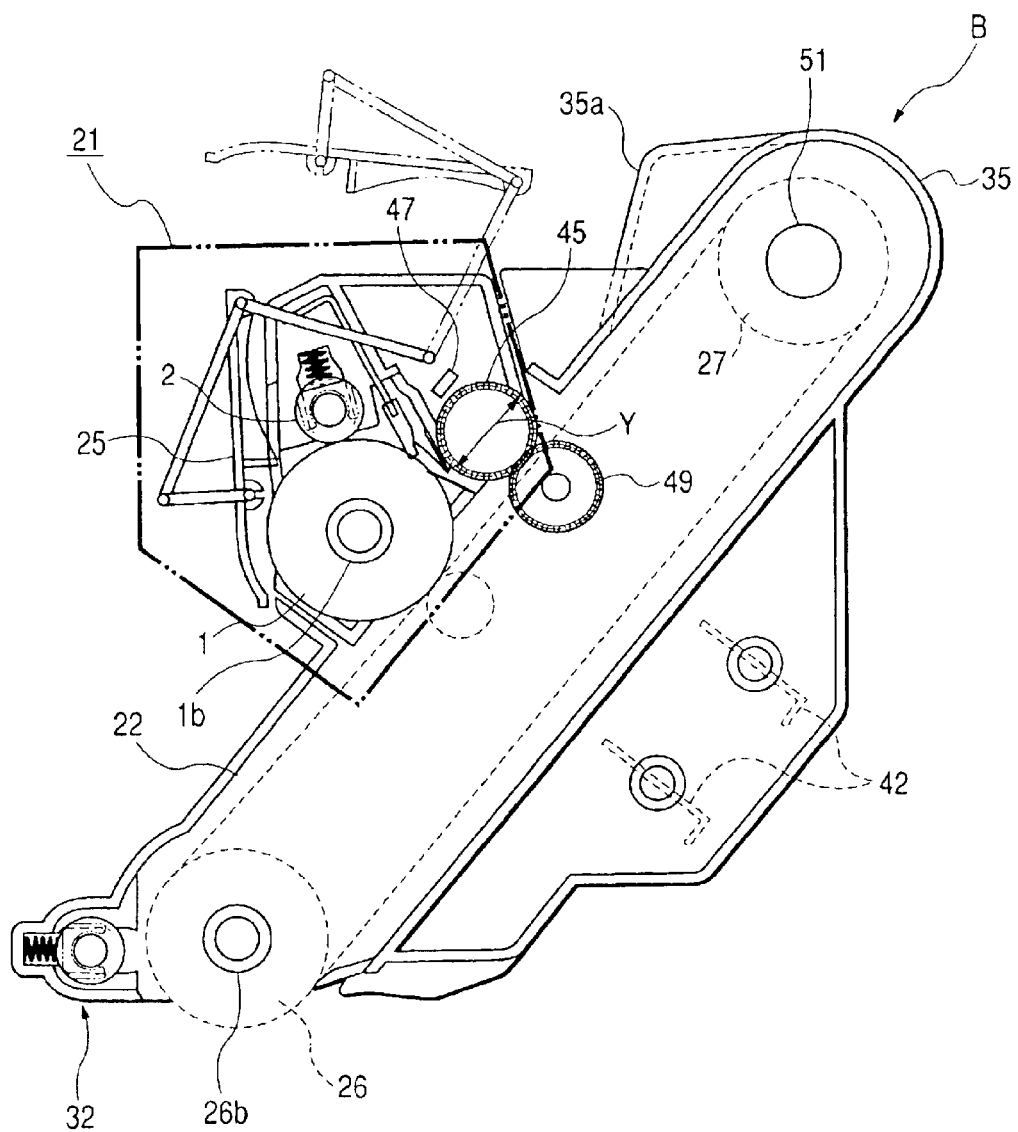
FIG. 3 is a side view of an image bearing member unit as it is seen from the left side relative to the front thereof.
Figure 4:
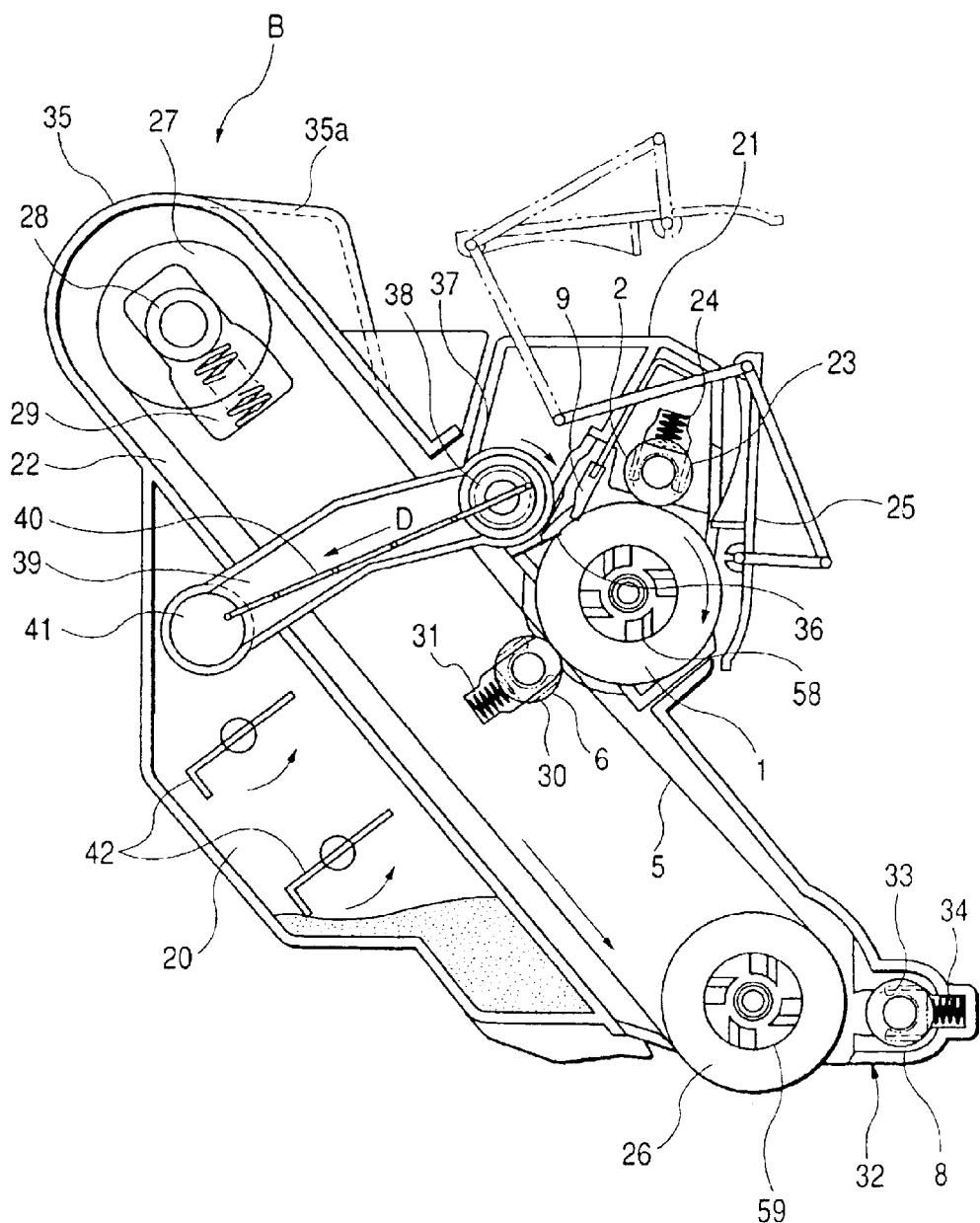
FIG. 4 is a side view of the image bearing member unit as it is seen from the right side relative to the front thereof.
Figure 5A:
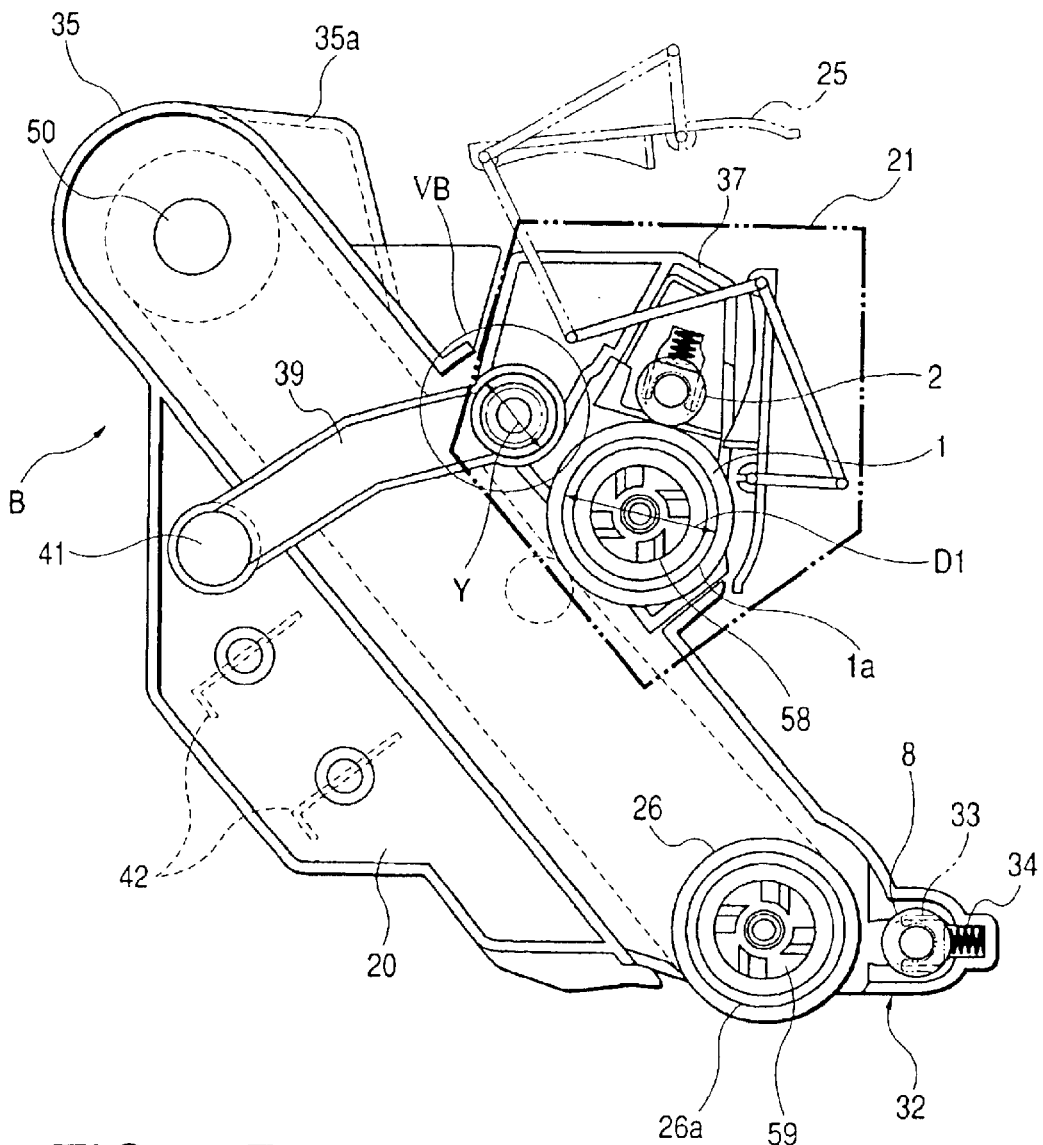
FIG. 5A is a side view of the image bearing member unit as it is seen from the right side relative to the front thereof.

Description will now be made of the process cartridge B which is an image forming unit. FIGS. 2 and 3 are side views of the image forming unit as it is seen from the left side relative to the front thereof, FIGS. 4 and 5A are side views of the image forming unit as it is seen from the right side relative to the front thereof, FIG. 6 is a top plan view of the image forming unit, FIGS. 7A to 7D illustrate the operation of the waste toner carrying means, FIG. 8 illustrates the mounting and dismounting of the image forming unit, and FIGS. 9A to 9F illustrate a driving coupling portion.

As shown in FIG. 2, the process cartridge B is such that an image bearing member portion 21 having the photosensitive drum 1 is disposed above the projection of an intermediate transfer member portion 22 including the intermediate transfer belt 5, and the waste toner collecting box 20 is disposed below the projection of the intermediate transfer member portion 22.

Figure 6:
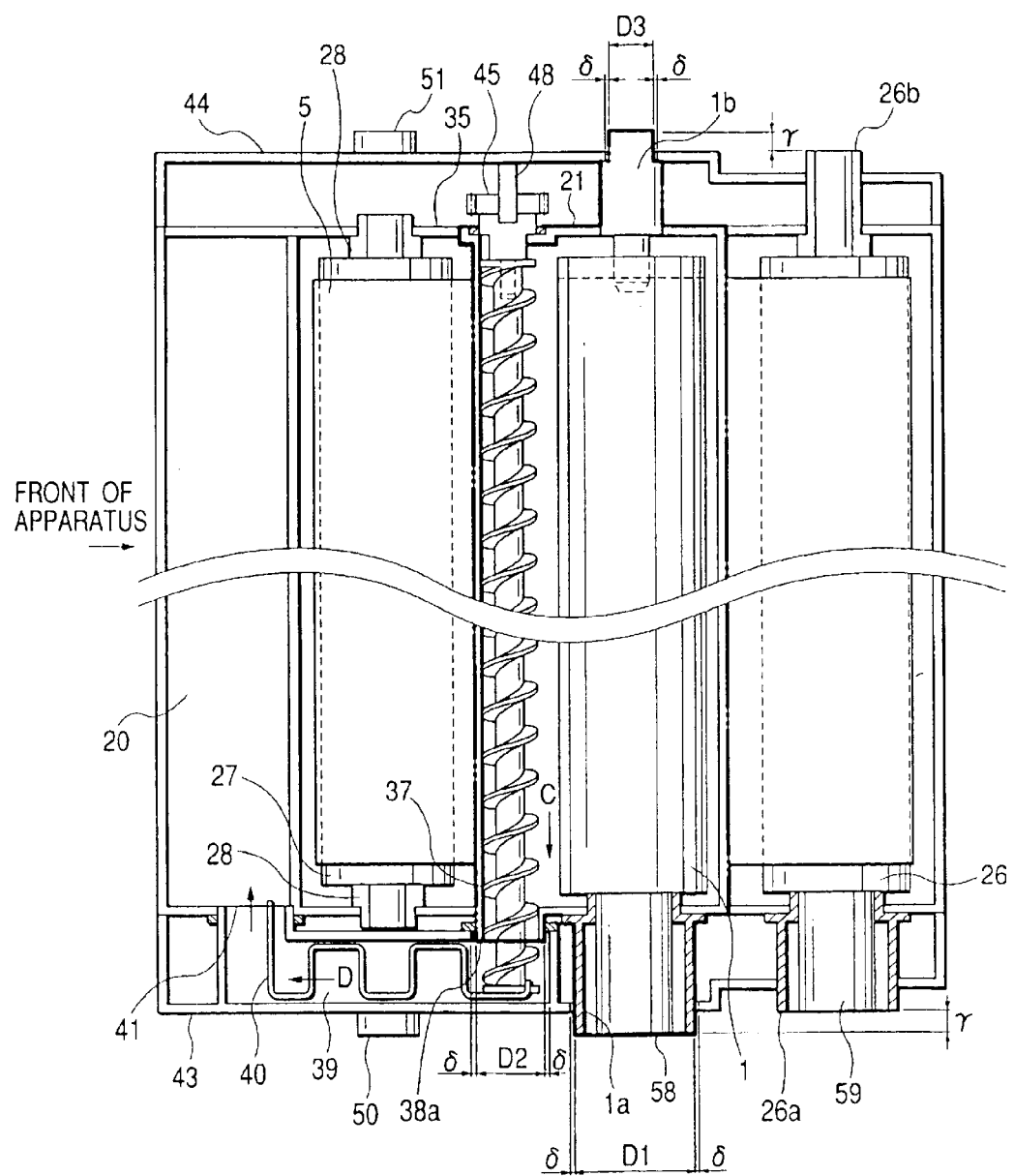
FIG. 6 is a top plan view of the image bearing member unit.
Figure 7A:
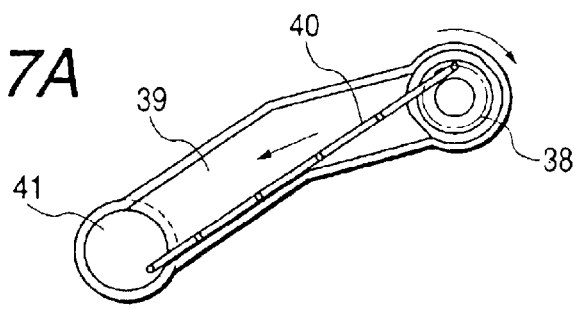
FIGS. 7A, 7B, 7C and 7D illustrate the operation of waste toner carrying means.
Figure 7B:
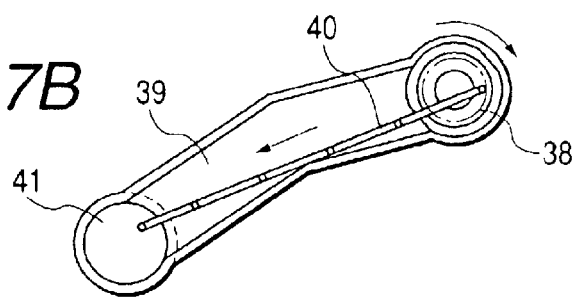
Figure 7C:
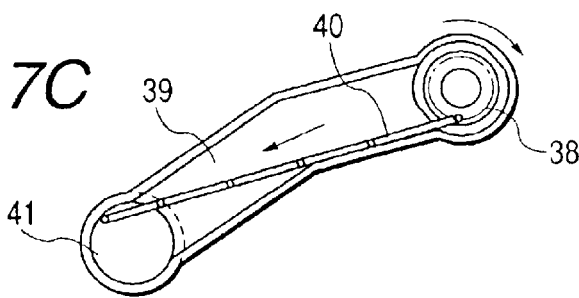
Figure 7D:
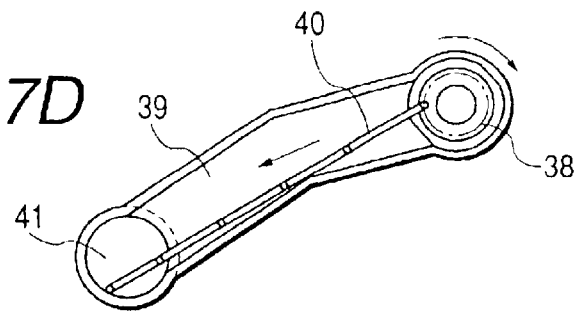

In the image bearing member portion 21, the photosensitive drum 1 has its opposite ends rotatably supported by a right side bearing 1a and a left side rotary shaft 1b, and is adapted to have a predetermined rotational driving force transmitted thereto from the main body of the apparatus through a drive transmitting coupling 58 which is a drive bearing portion at the right end portion (see FIG. 6). The image bearing member portion 21 is also provided with a drum shutter 25 openable and closable in operative association with the operation of mounting and dismounting the process cartridge to the main body of the image forming apparatus.

The charging roller 2 is brought into pressure contact with the photosensitive drum 1 with a predetermined force through bearings 23 at the opposite ends by a compression spring 24, and is designed to be driven to rotate by the photosensitive drum 1. At least one of the bearings 23 is constituted by an electrically conductive member, and a predetermined charging bias voltage is applied to the charging roller 2 to thereby uniformly charge the surface of the photosensitive drum 1. The charging device of such a contact charging type is shown in Japanese Patent Application Laid-Open No. 63-149669.

In the intermediate transfer member portion 22, the intermediate transfer belt 5 is an endless belt and is stretched around a driving roller 26 and a driven roller 27 in an intermediate transfer member frame 35 including a grip portion 35a. The driven roller 27 has predetermined tension applied thereto by compression springs 29 provided on bearings 28 at the opposite ends thereof. The driving roller 26 has its opposite ends rotatably supported by a right bearing 26a and a left bearing 26b, and is adapted to have a predetermined rotational driving force transmitted thereto from the main body of the apparatus through a drive transmitting coupling 59 which is the drive bearing portion of the right end portion.

The primary transfer roller 6 is provided at a location opposed to the photosensitive drum 1 with the intermediate transfer belt 5 interposed therebetween, is brought into pressure contact with the drum 1 with a predetermined force by a compression spring 31 through bearings 30 at the opposite ends thereof, and is designed to be driven to rotate by the intermediate transfer belt 5. At least one of the bearings 30 is constituted by an electrically conductive member, and a predetermined charging bias voltage is applied to the primary transfer roller 6 to thereby primary-transfer the toner images on the surface of the photosensitive drum 1 onto the intermediate transfer belt 5.

Also, a cleaning charging roller portion 32 which is cleaning means is provided on the driving roller 26 of the intermediate transfer member portion 22, and they are of an integral construction. The charging roller 8 disposed in the cleaning charging roller portion 32 is designed to be brought into pressure contact with the intermediate transfer belt 5 with a predetermined force by a compression spring 34 through bearings 33 at the opposite ends thereof, and be driven to rotate by the intermediate transfer belt. At least one of the bearings 33 is constituted by an electrically conductive member, and a voltage opposite to that during the transfer is applied to the charging roller 8 to thereby induce charges opposite to those during the transfer in the residual toners on the intermediate transfer belt 5. Thereby, the waste toners on the intermediate transfer belt 5 are electrostatically attracted to and collected by the surface of the photosensitive drum 1.

The cleaning blade 9 which is cleaning means is provided at a predetermined position on the photosensitive drum 1, and is designed to scrape off the residual toners on the photosensitive drum 1 and the aforedescribed residual toners on the intermediate transfer belt 5 attracted and collected onto the photosensitive drum 1. The thus scraped-off waste toners have their fall onto the intermediate transfer belt 5 blocked by a dip sheet 36, and fall into an image bearing member frame 37. The waste toners collected on the bottom of the image bearing member frame 37 are carried rightwardly (in the direction indicated by the arrow C in FIG. 6) as viewed from the front of the apparatus by the rotation of a screw 38.

As shown in FIG. 4, the waste toners are carried to the right side of the process cartridge B as viewed from the front of the apparatus by the screw 38, and slide down through a waste toner path 39 (the direction indicated by the arrow D in FIG. 4). Further, as shown in FIG. 6, a continuously U-shaped wire 40 is provided in the waste toner path 39, and as shown, one end thereof is rotatably inserted into a location eccentric from the center of rotation of the screw 38, and the other end thereof as a free end is inserted into an aperture 41 connecting the waste toner path 39 and the waste toner collecting box 20 together.

Thus, when the screw 38 is rotated in the direction indicated by the arrow C, the wire 40 traces the inner wall surface of the waste toner path 39 while oscillating as shown in FIGS. 7A, 7B, 7C and 7D. At this time, the U-shape of the wire 40 moves forward and backward in the waste toner carrying direction and therefore prevents the clogging of the waste toners, and there is obtained the effect of carrying. Further, in the aperture 41 connecting the waster toner path 39 and the waste toner collecting box 20 together, the end portion of the wire 40 rotates around the aperture 41 as shown in FIGS. 7A to 7D and therefore, the clogging of the waste toners in the aperture 41 can also be prevented.

The waste toners having fallen from the aperture 41 into the waste toner collecting box 20 are loosened us by an agitating plate 42 and stored. The agitating plate 42 is rotated like the screw 38 with a rotational driving force transmitted thereto from the main body of the image forming apparatus.

(Frame Construction of the Unit)

The frame construction of the process cartridge B will be described in detail here. The frame construction is broadly divided into an image bearing member frame 37 and an intermediate transfer member frame 35, as shown in FIGS.

5A and 6. In FIG. 5A, the image bearing member frame 37 is a portion encircled by thick dots-and-dash line, and is comprised of the photosensitive drum 1, the right bearing 1a, the left rotary shaft 1b, the charging roller 2, the cleaning blade 9, the screw 38 and the drum shutter 25 as main parts. The intermediate transfer member frame 35 is integrally comprised of the intermediate transfer member portion 22 having the intermediate transfer belt 5, the driving roller 26, the driven roller 27, the primary transfer roller 6 and the charging roller 8, and the waste toner collecting box 20 disposed below the projection of the intermediate transfer member portion 22.

The process cartridge B is of a construction in which the image bearing member frame 37 and the intermediate transfer member frame 35 are made integral with each other by being sandwiched between a right side cover 43 and a left side cover 44.

Figure 5B:
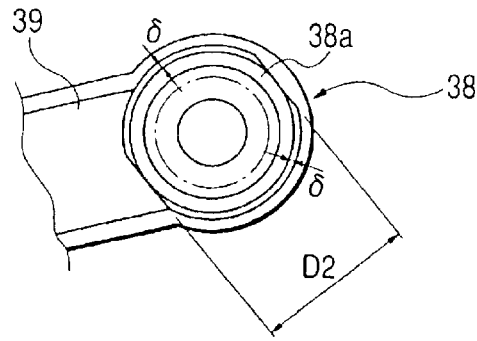
FIG. 5B is an enlarged view of the encircled portion VB in FIG. 5A.

The right side cover 43, as shown in FIG. 6, is positioned and fixed by the outer diameter of the right bearing 26a of the driving roller 26 and the outer diameter of another boss, not shown, fitting to each other. Here, the diameter of the aperture of the right side cover corresponding to the outer diameter D1 of the right bearing 1a of the photosensitive drum 1 is D1+2δ, and has play in all directions. Also, in contrast with the outer diameter D2 of the right supporting portion 38a of the screw 38, the diameter of an aperture formed in the waste toner path of the right side cover 43, as shown in FIG. 5B, is D2+2δ for only a predetermined direction (the direction indicated by the arrow Y).

The left side cover 44 is also positioned and fixed by the outer diameter of the left bearing 26b of the driving roller 26 and the outer diameter of another boss, not shown, fitting to each other. The diameter of the aperture of the left side cover 44 corresponding to the outer diameter D3 of the left rotary shaft 1b of the photosensitive drum 1 is D3+2δ, and has play in all directions.

Also, the outer peripheral surface of the bearing of a screw gear 45 (constituted by the image bearing member frame 37) for transmitting a rotational force to the screw 38 is rammed against the ramming portion 46 (see FIG. 2) of the intermediate transfer member frame 35 and further, the upper portion of a rib 47 (see FIG. 3) provided on the image bearing member frame 37 is regulated by a rib 48 (see FIG. 6) provided on the left side cover 44. Accordingly, the distance between a center of a drive transmitting gear 49 provided on the intermediate transfer member frame 35 side and a center of the screw gear 45 is maintained within a predetermined range, and is slidable only in a predetermined direction (the direction indicated by the arrow Y). Accordingly, even if the positional relation between the image bearing member portion 21 and the intermediate transfer member portion 22 moves, the rotational driving force from the main body, not shown, can be transmitted from the drive transmitting gear 49 to the screw 38 through the screw gear 45.

By adopting the above-described construction, the image bearing member 1 and the intermediate transfer member 5 are movable relative to each other in the image forming unit, that is, the image bearing member portion 21 is movable relative to the intermediate transfer member portion 22. Particularly, the play at the opposite ends of the photosensitive drum 1 is δ in the entire circumferential direction and the play in the supporting portion of the screw 38 is δ only in a predetermined direction (the direction indicated by the arrow Y), whereby the intermediate transfer member portion 22 is fixed and one location only of each of the right bearing 1a and left rotary shaft 1b of the photosensitive drum 1 is fixed, whereby the image bearing member frame 37 can be fixed. Also, places at which the intermediate transfer member portion 22 is fixed are two locations, i.e., the right bearing 26a and left bearing 26b of the driving roller 26 for the intermediate transfer belt 5, and fixed projected portions 50 and 51 provided on the right and left side covers, respectively.

It should be noted that δ is δ=0.3–0.5 mm in conformity with the unevenness accuracy of the positional relation between a supporting portion 52 supporting the right bearing 1a and left rotary shaft 1b of the image forming apparatus A side in FIG. 8 and a supporting portion 53 supporting the right bearing 26a and left bearing 26b of the driving roller 26.

(Mounting and Dismounting Operation)

Reference is now had to FIG. 8 to describe the mounting and dismounting of the process cartridge B to and from the image forming apparatus A, and a method of fixing the process cartridge B to a predetermined position.

When the upper lid 54 of the image forming apparatus A is opened, the drive transmitting coupling 58 to the photosensitive drum 1 provided on the supporting portion 52 and the drive transmitting coupling 59 to the driving roller 26 provided on the supporting portion 53 slide axially and become retracted (disconnected). A mechanism for retracting and connecting the couplings is already known as shown in Japanese Patent Application Laid-Open No. 11-109836, and will be omitted in the present embodiment.

A guide 55 for the image bearing member and a guide 56 for the intermediate transfer member are provided on the inner side walls of the main body of the apparatus with a level difference γ (see FIG. 6). The process cartridge B is inserted by sliding the right bearing 1a and the left rotary shaft 1b to the guide 55 for the image bearing member and also, sliding the fixed projected portions 50 and 51 provided on the right and left side covers to the guide 56 for the intermediate transfer member.

Finally, the right bearing 1a and the left rotary shaft 1b fall onto the supporting portion 52, and the right bearing 26a and the left bearing 26b fall onto the supporting portion 53, and the fixed projected portions 50 and 51 fall into a positioning groove 57. They are biased toward the main body of the apparatus by torsion coil springs 52a, 53a and 57a, respectively, and fixed.

(Driving Coupling Portion)

A driving coupling portion will now be described with reference to FIGS. 9A to 9F. The drive transmitting coupling 58 of the photosensitive drum 1 and the drive transmitting coupling 59 of the driving roller 26 are similar in construction to each other and therefore, only the drive transmitting coupling 58 will be described below.

The drive transmitting coupling 58 of the process cartridge B side is formed with a plurality of grooves 60, and is formed with a slope 61 in the direction of rotation. On the other hand, the coupling 63 of the image forming apparatus A side is provided with the same number of claws 64, and is formed with a similar slope 65, and during the rotation, the coupling 58 of the process cartridge B side is adapted to be pulled toward the image forming apparatus A side.

Also, the tip end 66 of the rotary shaft of the coupling 63 of the image forming apparatus side A is designed to be inserted into the rotation center hole 62 of the coupling 58 of the process cartridge B side to thereby effect alignment.

As described above, in the image forming apparatus according to the present invention and the image forming unit detachably mountable thereto, the image bearing member and the intermediate transfer member are constructed as a unit, and the positions of these are made movable relative to each other, whereby the image bearing member and the intermediate transfer member are a unit and yet, the respective drive transmitting couplings thereof can be positioned independently of each other. Accordingly, the drive transmitting couplings can be simply constructed without using the so-called Oldham's coupling absorbing misalignment, and the operability including the interchange of the unit and a jam clearance can be improved.

Also, the image forming unit is positioned with respect to the main body of the apparatus by the driving bearing portion of the image bearing member, the driving bearing portion of the intermediate transfer member and the fixed projected portion, whereby the misalignment in the drive transmitting portion does not occur.

Also, since the image bearing member and the intermediate transfer member are a unit, there can be provided an image forming unit of an integral image bearing member and intermediate transfer member type as compact and low-cost as the conventional process cartridge of the integral black-and-white developing means and image bearing member type.

Also, since the image forming unit is small and the drive transmitting couplings can be simply constructed, the entire image forming apparatus can also be made compact and the opening portion for mounting and dismounting the unit can be made small and simply and therefore, the lower cost of the apparatus can also be achieved.

Further, the positional relation between the image bearing member and the intermediate transfer member is determined by the main body of the apparatus and therefore, there is not the change of the position by the interchange of the unit, and a stable quality of images can be obtained.

Now, in the example of the conventional art shown in FIG. 10, the cleaning blade itself for scraping off the waste toners on the intermediate transfer belt 106 is provided in the intermediate transfer member unit 101, but the driving means for moving the cleaning blade into and out of contact with the intermediate transfer belt 106 is provided in the main body of the apparatus. The driving means for moving the secondary transfer means 107 for collectively transferring the toner images on the intermediate transfer belt to the sheet into and out of contact with the surface of the intermediate transfer belt 106 is also provided on the main body side of the apparatus.

FIG. 12 shows can drive transmitting means according to the conventional art. As shown there, an ICL (intermediate transfer cleaning) contact-separation cam 108 for moving the cleaning blade into and out of contact with the intermediate transfer belt is mounted on an ICL contact-separation cam shaft 109, which is supported between the right side plate 100a and left side plate 100b of the main body of the apparatus. Design is made such that the ICL contact-separation cam shaft 109 is rotated by a predetermined angle, whereby the ICL contact-separation cam 108 biases the cleaning blade to thereby move the cleaning blade into and out of contact with the intermediate transfer belt 106.

Also, in the main body of the apparatus, a secondary transfer device contact-separation cam 110 for moving the secondary transfer means 107 into and out of contact with the intermediate transfer belt 106 and a secondary transfer device contact-separation cam shaft 111 for rotating the same, a DB (drum-belt) contact-separation cam 112 for moving the photosensitive drum 103 and the intermediate transfer belt 106 into and out of contact with each other and a DB contact-separation cam shaft 113 are provided from the right side plate 100a to the left side plate 100b.

In the construction according to the above-described example of the conventional art, however, the cleaning blade for scraping off the waste toners on the intermediate transfer belt 106 and the cam drive transmitting means for moving the secondary transfer means 107 into and out of contact with the surface of the intermediate transfer belt are provided on the main body side of the apparatus, and the rotational driving force is also transmitted from a drive source in the main body of the apparatus through a gear train 114 and therefore, the drive transmitting path in the main body of the apparatus is complicated.

Also, the mechanisms for moving the cleaning blade and the secondary transfer means 107 into and out of contact with the intermediate transfer belt 106 use levers and the cams 108, 110, 112, respectively, and the through shafts 109, 111, 113 extending over the width of the main body of the apparatus become necessary, and this leads to the problem that a large space is required in the main body of the apparatus and moreover, the construction becomes complicated. This in turn has led to the problem that the bulkiness of the unit, the complication and bulkiness of the main body of the apparatus and the rise of production cost are caused.

Description will now be made of an embodiment of the present invention which solves the above-noted problems.

This embodiment is basically similar in construction to the image forming apparatus of FIG. 1, and the different portions thereof will be described below.

(Contact-Separation Means)

Description will be made here of contact-separation means for the secondary transfer means and the intermediate transfer cleaning means (ICL) which is the feature of the present invention as shown in FIG. 16, ICL contact-separation cams 245a, 245b and secondary transfer roller contact-separation cams 246a, 246b are provided on the opposite ends of the driving roller 26 of the intermediate transfer belt 5. Further, cam driving gears 247a, 247b are disposed between the ICL contact-separation cams 245 and the secondary transfer roller contact-separation cams 246, and the ICL contact-separation cams 245a, 245b and the secondary transfer roller contact-separation cams 246a, 246b are fixed to cam driving gears 247a, 247b with predetermined phases.

The ICL contact-separation cams 245a, 245b, the secondary transfer roller contact-separation cams 246a, 246b and the cam driving gears 247a, 247b are integrally provided for rotation relative to the driving roller 26. Also, the cam phases of the right and left ends are adjusted to the objects, and drive transmitting gears 249a, 249b which are cam drive transmitting means provided on the opposite ends of a through-shaft 248 are in meshing engagement with the right and left cam driving gears 247a and 247b, and cams at the right and left ends are designed to rotate in synchronism with each other. As shown in FIG. 15, the rotational driving force transmitted from the main body of the apparatus is transmitted from a gear 50 to the right drive transmitting gear 249a through idler gears 51, 52. Thereby, driving forces are transmitted from the drive transmitting gears 249a and 249b provided at the right and left ends to the cam driving gears 247a and 247b, respectively, and the ICL contact-separation cams 245a, 245b and the secondary transfer roller contact-separation cams 246a, 246b are rotated.

The charging roller 8 for cleaning, as previously described, is rotatably held on the right and left bearings 33, and is biased toward the driving roller 26 of the intermediate transfer belt 5, along the bearing slide portion 35b (see FIG. 14) of the intermediate transfer member frame 35 by right and left compression springs 34. In the state shown in FIGS.

13 and 14, the tip ends 33a of the right and left bearings 33 abut against the ICL contact-separation cams 245a, 245b, and the charging roller 8 for cleaning is spaced apart from the surface of the intermediate transfer belt 5.

Also, the secondary transfer roller 7 provided on the main body side of the apparatus is rotatably held on the right and left bearings 54, and is biased toward the driving roller 26 of the intermediate transfer belt 5 along the bearing slide guide portion 57 of the frame 56 of the main body of the apparatus by a compression spring 55. In the state shown in FIGS. 13 and 14, the tip ends of the right and left bearings 54 abut against the secondary transfer roller contact-separation cams 246a, 246b, and are spaced apart from the surface of the intermediate transfer belt 5. A projected portion 57a for preventing the slipping-out of the bearings 54 is provided on the tip end of the bearing slide guide portion 57 of the frame 56 side of the main body of the apparatus so that even if the process cartridge B is pulled out of the main body of the apparatus, the secondary transfer roller 7 may not slip off.

In the above-described construction, the cleaning-contact-separation means is comprised of the ICL contact-separation cams 245a, 245b, the drive transmitting gear 249, the compression spring 34 and the bearing 33. Likewise, the secondary transfer means contact-separation means is comprised of the secondary transfer roller contact-separation cams 246a, 246b, the drive transmitting gear 249, the compression spring 55 and the bearings 54.

The state in which the charging roller 8 and the secondary transfer roller 7 are spaced apart from the intermediate transfer belt 5 is a state in which toner images are being formed on the intermediate transfer belt 5, or a state in which the main body itself of the image forming apparatus is out of operation. Also, the ICL contact-separation cams 245a, 245b and the secondary transfer roller contact-separation cams 246a, 246b are positioned at a phase for holding the process cartridge B in a state detached from the main body of the apparatus, and holding the charging roller 8 and the secondary transfer roller 7 in a spaced-apart state even when the process cartridge B has been mounted to the main body of the apparatus.

When toner images are to be formed on the intermediate transfer belt 5 and secondary-transferred onto a sheet, a driving force is transmitted to the gear 50, whereby the drive transmitting gear 249 is rotatively driven and as shown in FIG. 17, the ICL contact-separation cams 245a, 245b and the secondary transfer roller contact-separation cams 246a, 246b are rotated as a unit by 180°. Thereby, the ICL contact-separation cams 245a, 245b assume a phase having a small diameter relative to the tip end 33a of the bearing of the charging roller 8, and the charging roller 8 is biased toward the intermediate transfer belt 5 by the biasing force of the compression spring 34. Entirely in the same manner, the secondary transfer roller contact-separation cams 246a, 246b assume a phase having a small diameter relative to the tip end 54a of the bearing of the secondary transfer roller 7, whereby the secondary transfer roller 7 is biased toward the intermediate transfer belt 5 by the biasing force of the compression spring 55.

As described above, design is made such that the bearing of the secondary transfer roller 7 or the charging roller 8 is biased and made to abut against the cam provided coaxially with the driving roller to rotate the cam to thereby move the secondary transfer roller 7 or the charging roller 8 into and out of contact with the intermediate transfer belt, whereby the contact-separation means can be provided in the image forming unit with a very simple construction, and the drive transmitting path can be minimized.

(Cam Drive Transmitting Means)

Description will now be made of the construction for transmitting the drive from the main body of the image forming apparatus to the cam drive transmitting means. In FIG. 15, the gear ratio between the gear 50 directly connected to the coupling and the cam driving gears 247a, 247b is 1:2, and design is made such that the cam moves through a half revolution by one revolution of the coupling.

As shown in FIG. 18A, one of the D-shaped cut portions of the opposite ends of the cam driving shaft 60 is inserted in the gear 50, and the D-shaped cut portion of the other end thereof is inserted in the coupling 61. The coupling 61 is formed with two apertures 61a, and is formed with a groove portion 61b in the outer peripheral portion thereof (FIG. 18C). A slide ring 62 into which the cam driving shaft 60 is inserted is provided between the coupling 61 and the gear 50, and is biased toward the coupling 61 side by a compression spring 63. At this time, the two claw portions 62a of the slide ring 62 are inserted in the apertures 61a of the coupling 61. Further, a projected portion 62b which is lock means provided on the outer peripheral portion of the slide ring 62 extends through the groove portion 61b formed in the outer peripheral portion of the coupling 61 and fits in a groove portion 43a formed in the right side cover 43.

When the drive is to be connected, as shown in FIG. 18B, the driving coupling 64 slides and protrudes from the main body of the image forming apparatus. Thereupon, the claw portion 64a of the driving coupling 64 is inserted into the aperture 61a of the coupling 61 which is adjacent to the process cartridge B, and thus, the claw portion 62a of the slide ring 62 pushes the entire slide ring 62 against the compression spring 63.

At this time, the projected portion 62b provided on the outer peripheral portion of the slide ring 62 is disengaged from the groove portion 43a of the right side cover 43, and the lock becomes released. When in this state, the driving coupling 64 of the main body side of the image forming apparatus is rotated, a rotational driving force is transmitted through the claw portion 64a of the driving coupling 64 and the aperture 61a of the coupling 61, and the rotational driving force is further transmitted to the ICL contact-separation cams 245a, 245b and the secondary transfer roller contact-separation cams 246a, 246b through the gear 50 and idler gears 51, 52.

The driving coupling 64 of the main body side of the image forming apparatus is one-revolution-controlled and is designed to stop at the same phase. Since the gear ratio between the gear 50 and the cam driving gears 247a, 247b is 1:2, the ICL contact-separation cams 245a, 245b and the secondary transfer roller contact-separation cams 246a, 246b are rotated by 180° for each one revolution of the driving coupling 64. The states of these cams can be discriminated by seeing the current values of the intermediate transfer belt 5, the secondary transfer roller 7 and the charging roller 8.

As described above, the present embodiment is constructed as an image forming unit having an intermediate transfer member and secondary transfer-contact-separation means or cleaning-contact-separation means, whereby the drive transmitting path in the main body of the image forming apparatus can be minimized.

Also, the contact-separation means are comprised of cams supported coaxially with the rollers around which the intermediate transfer member is stretched, cam drive transmitting means for transmitting the drive to the cams, biasing means for biasing the secondary transfer means or the cleaning means toward the rollers, and bearings supporting the secondary transfer means or the cleaning means and abutting against the cams, whereby the contact-separation means can be provided in the intermediate transfer member unit with a very simple construction, and again in the image forming unit, the drive transmitting path can be minimized.

As described above, the image forming unit is small and can be constructed with a small number of drive transmitting paths and therefore, the downsizing of the entire image forming apparatus can be achieved and the lower cost of the apparatus can be achieved.

In order to carry the waste toners to the waste toner box, and agitate the waste toners in the waste toner box as well, a drive transmitting path exclusively for use from the main body of the image forming apparatus is required. Therefore, not only extra transmitting paths are increased on the main body side of the apparatus, but also an extra drive transmitting path becomes necessary on the image forming unit side.

Further, for the mounting and dismounting of the image forming unit, a retracting mechanism must also be provided as in the drive transmitting couplings of the photosensitive member unit and the intermediate transfer member unit.

The rotational driving force of the secondary transfer roller and the rotational driving force of the transfer material conveying means to the fixing device after secondary transfer are also transmitted from the drive source in the main body of the apparatus through the gear train. This leads to problems such as the bulkiness of the image forming unit, and the complication, bulkiness and higher cost of the main body of the apparatus.

As in the example of the conventional art shown in FIG. 10, the driving of the waste toner carrying system in the example of the conventional art shown in FIG. 11 is designed to be transmitted from the main body side of the apparatus by the couplings or gears independently provided on the photosensitive member unit side and the intermediate transfer member unit side, respectively, meshing with the couplings or gears of the main body side of the apparatus. Accordingly, for the mounting and dismounting of the image forming unit, like the drive transmitting couplings of the photosensitive member and the intermediate transfer member, a retracting mechanism must also be provided (in this case, the rotation is not highly accurate rotation like the rotational driving of the photosensitive member and the intermediate transfer member and therefore, any complicated coupling like an Oldham's coupling is not necessary).

The rotational driving force of the secondary transfer roller is also transmitted from the drive source in the main body of the apparatus through the gear train.

Accordingly, the example of the conventional art shown in FIG. 11 also leads to the bulkiness of the image forming unit and the complication, bulkiness and higher cost of the main body of the apparatus.

Description will now be made of an embodiment of the present invention which solves the above-noted problems.

The embodiment is basically similar in construction to the above-described image forming apparatus of FIG. 1 and the different portions thereof will be described below.

In the present embodiment, when images are to be continuously formed on a plurality of transferring material (recording materials), the residual toner charged by the cleaning charging roller is electrostatically transferred from the intermediate transfer belt 5 to the photosensitive drum 1 and at the same time, a toner image to the next transferring material formed on the photosensitive drum 1 is primary-transferred to the intermediate transfer belt 5. Thereby, the throughput of image formation can be improved.
(Image Forming Unit)

The construction of an image forming unit of an integral photosensitive drum and intermediate transfer belt type detachably mounted to the image forming apparatus will now be described in detail.

FIG. 19 is a longitudinal cross-sectional view schematically showing the construction of the image forming unit of FIG. 1, and more particularly a longitudinal cross-sectional illustration of the unit as it is seen from the left of the front of the apparatus, FIG. 20 is a longitudinal cross-sectional illustration showing the drive transmitting construction of the image forming unit, and FIGS. 21 and 22 are longitudinal cross-sectional illustrations of the image forming unit as it is seen from the right of the front of the apparatus. FIG. 23 is a transverse cross-sectional illustration of a waste toner carrying path portion as it is seen from the direction indicated by the arrow X of FIG. 21 (above), FIG. 24A is an illustration of the construction of a conveying belt unit, and FIG. 24B is a side view thereof.

In FIGS. 19 to 24B, the image forming unit B has a photosensitive drum unit 21 disposed on the upper plane of the projection of an intermediate transfer belt unit 22, and a waste toner box 20 disposed on the lower plane of the projection of the intermediate transfer belt unit 22. Also, the belt driving roller 26 of the intermediate transfer belt unit 22 is provided with a cleaning charging roller portion 32 for inducing charges opposite to those during transfer in the residual toners on an intermediate transfer belt 5 constituted by an endless belt, and they are of an integral construction.
(Photosensitive Drum Unit)

The photosensitive drum unit 21 has a photosensitive drum 1 having its opposite ends rotatably held by a right bearing 206 (see FIG. 22) and a left rotary support shaft 202 (see FIG. 20), and the photosensitive drum 1 is designed such that a predetermined rotational driving force is transmitted thereto from the main body of the apparatus through the coupling 58 of the right end portion of a motor provided in the main body of the apparatus from which a rotational driving force is transmitted (various gears or the like are disposed between the drum and the motor and a driving force may be transmitted through the gears or the like).

Also, as shown in FIG. 19, a charging roller 2 is adapted to be brought into pressure contact with the photosensitive drum 1 through bearings 23 at the opposite ends thereof with a predetermined force by a compression spring 24 and be driven to rotate. At least one of the bearings 23 is constituted by an electrically conductive member, and design is made such that by a predetermined charging bias voltage being applied to the charging roller 2, the surface of the photosensitive drum 1 is uniformly charged.

Further, a cleaning blade 9 is provided on the photosensitive drum 1 at a predetermined location so as to collect the residual toners on the intermediate transfer belt in which the aforementioned opposite charges have been induced onto the photosensitive drum 1, and scrape off them with the residual toners on the photosensitive drum 1. The waste toners thus scraped off are prevented from falling onto the intermediate transfer belt 5 by a dip sheet 36 (see FIGS. 19 and 21), and the waste toners collected on the bottom of a photosensitive drum frame 37 are carried rightwardly as viewed from the front of the apparatus, by the rotation of a screw 38 as waste toner carrying means (the direction indicated by the arrow C in FIG. 23).

Thereafter, the waste toners are carried to the right side of the photosensitive drum unit 21 (as viewed from the front side of the apparatus) by the screw 38, and slide down through a waste toner path 39, as indicated by the arrow D in FIG. 21. Further, a continuously U-shaped wire 40 is provided in the waste toner path 39, as shown in FIG. 23, and one end thereof is inserted in a position eccentric from the center of rotation of the screw 38 as shown. The other end of the wire 40 is free, and is inserted in a hole 41 connecting the waste toner path and a waste toner box 20 together, as shown in FIG. 21. Thereby, when as shown in FIGS. 7A to 7D, the screw 38 is rotated in the direction indicated by the arrow, the end portion of the wire 40 rotates on the inner periphery of the hole 41 and therefore, the clogging of the waste toners in the hole 41 is prevented.

Thereafter, the waste toners fall from the hole 41 into the waste toner box 20, and are made even and accumulated therein by the rotation of a waste toner agitating plate 42 as waste toner agitating means. As shown in FIG. 23, the opposite ends of the waste toner path are sealed by seal members 233 so that the waste toners may not leak to the outside. Also, a waste toner container is installed in the image forming unit and therefore, when desired detecting means informs that the waste toner container is full of the waste toners, a signal to this effect is sent to control means to thereby call upon the user to interchange the image forming unit by the display on the front surface of the apparatus.

Also, the photosensitive drum unit 21 is provided with a drum shutter 25 openable and closable in operative association with the operation of mounting or dismounting the photosensitive drum unit to the main body of the image forming apparatus.

(Intermediate Transfer Belt Unit)

The construction of the intermediate transfer belt unit 22 will now be described. The intermediate transfer belt 5 is stretched around a driving roller 26 and a driven roller 27 in an intermediate transfer member frame 35 including a grip portion 35a.

The driving roller 26 has its opposite ends rotatably held by a right bearing 205 (see FIG. 22) and a left bearing 201 (see FIG. 19), and is adapted to have a predetermined rotational driving force transmitted thereto from the main body of the apparatus through the coupling 58 (see FIG. 21) of the right end portion to which the rotational driving force of a motor provided in the main body of the apparatus is transmitted (various gears or the like are disposed between the coupling and the motor and design in made such that a driving force is transmitted through the gears or the like, and this motor is common to a motor for imparting a rotational driving force to a coupling 24). As described above, the photosensitive drum and the intermediate transfer belt are designed to be rotatively driven by a common drive source (motor) and therefore, the color misregistration by the uneven rotation (eccentricity) of the drive source can be prevented and also, the apparatus can be downsized and reduced in cost. Also, compression springs 29 are provided on the bearings 28 at the opposite ends of the driven roller 27 so as to give predetermined tension to the intermediate transfer belt 5.

A primary transfer roller 6 is provided at a location opposed to the photosensitive drum 1 with the intermediate transfer belt 5 interposed therebetween, as shown in FIGS. 19 and 21, and is adapted to be brought into pressure contact with the photosensitive drum with a predetermined force by a compression spring 31 through bearings 30 at the opposite ends thereof, and be driven to rotate thereby.

At least one of the bearings 30 is constituted by an electrically conductive member, and a predetermined charging bias voltage is applied to the primary transfer roller 6, whereby the toner on the surface of the photosensitive drum 1 is primary-transferred onto the intermediate transfer belt 5.

Also, as shown in FIG. 19, a cleaning charging roller portion 32 for inducing charges opposite to those during transfer in the residual toners on the intermediate transfer belt is provided at a location opposed to an intermediate transfer belt driving roller 26.

A cleaning charging roller 8 is adapted to be brought into pressure contact with the intermediate transfer belt with a predetermined force by a compression spring 34 through bearings 33 at the opposite ends thereof, and be driven to rotate thereby. At least one of the bearings 33 is constituted by an electrically conductive member, and a voltage opposite to that during transfer is applied to the cleaning charging roller 8 to thereby induce charges opposite to those during transfer in the residual toners on the intermediate transfer belt 5, and the residual toners are electrostatically attracted to and collected by the surface of the photosensitive drum 1, and are accumulated in the waste toner box 20 as previously described.

(Drive Transmitting Construction in the Image Forming Unit)

The construction of rotational driving force transmitting means in the image forming unit B will be described here.

As previously described, the photosensitive drum drive transmitting means for transmitting the drive to the photosensitive drum 1 is designed such that a predetermined rotational driving force is singly transmitted from the main body of the apparatus through the coupling 58 at the right end portion. This is because as previously described, an electrostatic latent image is formed on the photosensitive drum 1 by the exposing means 3 and the toner is caused to adhere to the latent image to thereby effect development and therefore a construction in which highly accurate rotation at a predetermined speed is maintained by single drive is desirable to the photosensitive drum 1.

On the other hand, intermediate transfer member drive transmitting means for transmitting the drive to the intermediate transfer member belt driving roller 26 is by a discrete path from the photosensitive drum drive transmitting means, and as shown in FIG. 23, a rotational driving force is transmitted at a predetermined number of revolutions from the main body of the apparatus through the coupling 59 at the right end portion to thereby rotatively move the intermediate transfer belt 5, and the rotational driving force is also transmitted to a two-stage gear 212 fixed to the left rotary shaft portion 211 of the driving roller 26.

As shown in FIG. 20, deceleration is effected from the small gear of the two-stage gear 212 through two-stage idler gears 213 and 214 and further, the rotational driving force is transmitted through an idler gear 215 and a gear 216, and the waste toner agitating plate 42 in the waste toner box shown in FIG. 19 is rotated in the direction indicated by the arrow.

Also, the rotational driving force is transmitted from the large gear of the two-stage gear 214 through idler gears 218, 219 and a gear 220, and the screw 38 in the photosensitive drum unit 21 shown in FIG. 19 is rotated in the direction indicated by the arrow.

Description will now be made of the rotational driving force transmitting path to the secondary transfer roller 7 of the main body side of the color image forming apparatus and the conveying means to the fixing device 15 after secondary transfer.

The rotational driving force transmitted from the large gear of the two-stage gear 212 to an idler gear 300 provided in the main body of the image forming apparatus rotatively moves a conveying belt 303 (see FIG. 24) and a conveying belt 304 in the transferring material conveying direction through an idler gear 301 and a conveying belt driving gear 302. On the other hand, the idler gear 301 is also connected to the driving gear 305 of the secondary transfer roller 7, and the rotational driving force is also transmitted to the secondary transfer roller 7 in the direction indicated by the arrow through the driving gear 305. The secondary transfer roller 7, as previously described, can be moved into and out of contact with the intermediate transfer belt 5.

(Mounting Means for the Image Forming Unit to the Main Body of the Apparatus)

Reference is now had to FIG. 8 to describe the construction of mounting means for mounting and dismounting the image forming unit B with respect to the main body A of the image forming apparatus and positioning and fixing it at a predetermined position.

When the upper lid 54 of the main body A of the color image forming apparatus is opened, a coupling fitted to the coupling 58 (see FIG. 21) provided on the supporting portion 52 supporting the bearings of the photosensitive drum, and transmitting the rotational driving force to the photosensitive drum 1, and a coupling fitted to the coupling 59 (see FIG. 21) provided on the supporting portion supporting the bearing portion of the intermediate transfer belt driving shaft, and transmitting the rotational driving force to the intermediate transfer belt driving roller 26 slide axially and become retracted (disconnected). As the construction for the retraction of the couplings operatively associated with the upper lid 54, use can be made of a conventional construction.

A guide rail 55 for the photosensitive drum and a guide rail 56 for the intermediate transfer member are provided on the opposite inner sides of the main body of the apparatus with a level difference y. The level difference y is the level difference y between the bearing 206 and the rotary support shaft 202 for the drum of the image forming unit and the bearings 201, 205 of the intermediate transfer belt driving roller 26 which is shown in FIG. 23.

The right bearing 206 and left rotary support shaft 202 of the photosensitive drum of the image forming unit B, and the right bearing 205 and left bearing 201 of the intermediate transfer belt driving roller and projected portions 203 and 204 (see FIG. 23) provided on the right and left side covers are inserted while being slidden on the guide rail 55 for the photosensitive drum and the guide rail 56 for the intermediate transfer member, respectively.

Finally, the right bearing 206 and left rotary support shaft 202 of the photosensitive drum fall onto the supporting portion 52 supporting the bearings of the photosensitive drum, and the right bearing 205 and left bearing 201 of the intermediate transfer belt driving roller fall onto the supporting portion 53 supporting the bearing portion of the intermediate transfer belt driving shaft, and further the projected portions 203 and 204 provided on the right and left side covers of the image forming unit fall into the positioning groove 57, and as shown in FIG. 8, they are urged against the positioning portions of the main body of the apparatus by torsion coil springs 52a, 53a and 57a, respectively and are fixed.

Next, when the image forming unit B is to be detached, it can be easily pulled out simply by opening the upper lid 54 and pulling out the image forming unit B. After the image forming unit B has been taken out, the transferring material conveying path is exposed from above, as is apparent from FIG. 8. Therefore, even when the transferring material is jammed, the jam can be easily cleared.

As previously described, the drive transmission to the screw 38 for carrying the waste toners and the waste toner agitating plate 42 for agitating the waste toners in the waste toner box 20 is effected not through the photosensitive drum drive transmitting means, but through the drive transmitting means for driving the intermediate transfer belt 5, whereby the accuracy of the rotation of the photosensitive drum can be maintained high and also, the drive transmitting path can be minimized and as the result, the formation of images of a high quality and the downsizing and lower cost of the image forming unit can be achieved.

The drive transmission to the secondary transfer roller 7 can also be effected through the drive transmitting means for driving the intermediate transfer belt 5 to thereby likewise achieve the downsizing of the image forming apparatus.

Also, by adopting a construction in which the toner residual on the intermediate transfer belt 5 is charged to the polarity opposite to the regular charging polarity (in the present embodiment, the negative polarity) of the toners, and this is electrostatically reversely transferred to the photosensitive drum 1 simultaneously with the primary transfer of the next image, the throughput of image formation can be improved when image formation is effected on a plurality of transferring materials, and it becomes possible to dispose the waste toner container near the photosensitive drum.

This is because when a cleaning blade is used as cleaning means for removing the toners on the photosensitive drum by rubbing against the toners, the toners scraped off by the cleaning blade fall and therefore it is preferable to dispose the waste toner container just beneath the cleaning blade (just upstream of the abutting position of the cleaning blade against the photosensitive drum in the rotating direction of the photosensitive drum).

While in the aforedescribed embodiment, the photosensitive drum 1 is used as the image bearing member, this may be replaced by a photosensitive belt comprised of an endless belt. The intermediate transfer member may also be constituted not by the intermediate transfer belt 5 comprised of an endless belt, but by an intermediate transfer drum.

However, by constituting the image bearing member by a photosensitive drum, and constituting the intermediate transfer member by an endless belt, as described above, it becomes possible to obliquely dispose the intermediate transfer belt as shown, and dispose the photosensitive drum above the vertical projection plane thereof, and compactly dispose the waste toner container below the vertical projection plane.

Since the present embodiment is an image forming apparatus of a construction in which toner images of plural colors are successively superimposed on and transferred to the intermediate transfer member, the color registration error due to the eccentricity of the photosensitive drum can be-prevented from occurring by making the circumferential length of the intermediate transfer member substantially integer times as great as the circumferential length of the photosensitive member. Accordingly, when the intermediate transfer member is made into a drum shape, the diameter thereof will become large and the apparatus will become bulky, but when the intermediate transfer member is made into a belt shape, the degree of freedom of disposition, i.e., the degree of freedom of design, is improved and therefore, this construction is preferable. The reason why the circumferential length of the intermediate transfer member is made greater than that of the photosensitive member is that for the image formation on a transferring material of a maximum length usable in the apparatus (the length of the transferring material along the rotating direction of the intermediate transfer member), a circumferential length greater than the length becomes necessary. Also, the reason why the photosensitive member is made into a drum shape is that when it is made into a belt, a special construction for preventing the meandering of the belt becomes necessary.

Since the present embodiment is constructed as previously described, it becomes possible to maintain the accuracy of the rotation of the image bearing member high and also minimize the drive transmitting path to the toner carrying means and therefore, the downsizing and lower costs of the image forming unit and the image forming apparatus to which it is mounted become possible.

On the other hand, in the conventional art, the photosensitive drum as the image bearing member and the primary transfer means opposed to the photosensitive drum with the intermediate transfer belt interposed therebetween are located at the upstream side as viewed from the driving roller in the conveying direction of the intermediate transfer belt (the so-called taut side of the belt).

Further, the diameters of the rollers as members around which the intermediate transfer belt are stretched are a large one and a small one.

FIG. 25 is an illustration of a color image forming apparatus according to the conventional art using an intermediate transfer belt. In FIG. 25, an intermediate transfer belt unit 504 comprises an intermediate transfer belt 508 stretched around three rollers, i.e., a driving roller 502, a secondary transfer opposed roller 505 and a tension roller 506 for imparting predetermined tension to the intermediate transfer belt 508 by a spring, not shown, and a primary transfer roller 507 provided at a location opposed to a photosensitive drum 501.

The driving roller 502 is rotated in a rightward direction (clockwise direction), as shown in FIG. 25, and the intermediate transfer belt 508 is also rightwardly moved round as indicated by the arrow. The secondary transfer opposed roller 505 and the tension roller 506 are designed to be driven to rotate by the intermediate transfer belt 508.

The photosensitive drum 501 of a photosensitive drum cartridge 503, as shown in FIG. 25, is disposed at L1 between the intermediate transfer belt driving roller 502 and the tension roller 506, and the primary transfer roller 507 is disposed in opposed relationship therewith with the intermediate transfer belt 508 interposed therebetween.

L1 at which a primary transfer region is present is the upstream side of the intermediate transfer belt conveying direction as viewed with respect to the direction of rotation of the intermediate transfer belt driving roller 502, i.e., the so-called taut side of the belt.

This is an arrangement taking it into account that the unevenness of the rotative moving speed of the intermediate transfer belt is more stable at the taut side L1 of the belt than at the slack side L2 of the intermediate transfer belt 508.

This is because the conveying speed of the intermediate transfer belt 508 must be stable in order to reduce the color registration error of each color toner when forming superimposed color toner images on the intermediate transfer belt 508 by repeating for each of different colors the steps of developing an electrostatic latent image formed on the photosensitive drum 501 by a color toner, and primary-transferring the obtained toner image to a rotating intermediate transfer belt 508.

Further, design is made such that the circumferential length Lb of the intermediate transfer belt 508 is substantially integer times as great as the circumferential length Ld of the photosensitive drum 501 and is also substantially integer times as great as the circumferential length Lr of the intermediate transfer belt driving roller 502, and with the change in the peripheral speed of one revolution period by the vibration of the photosensitive drum 501 and the change in the conveying speed by the vibration of the driving roller 502 for the intermediate transfer belt 508 as a constant period, each color toner starts to be primary-transferred from a predetermined position of the intermediate transfer belt 508, whereby the phase of the color registration errors of respective color toners overlap one another on the intermediate transfer belt 508, and the color toners are collectively transferred to a transferring material by the secondary transfer roller 509 so that a color image having little color registration error may be obtained.

In FIG. 25, if the diameter D1 of the photosensitive drum 501 is 47 mm, let it be assumed that the circumferential length Ld of the photosensitive drum is Ld=47 $\pi$mm, and the circumferential length Ld1 from the exposed position E of the photosensitive drum 501 to a primary transfer position F is about 63 mm.

The circumferential length Lb of the intermediate transfer belt 508 is 47$\pi$×2≅295.3 mm or 47$\pi$×3≅442.96 mm, but assuming that the transferring material is a sheet of A4 size, at least a belt length of 360 mm, i.e., the paper length 297 mm plus the distance 63 mm by which the exposed position E of the photosensitive drum 501 comes round to the primary transfer position F, becomes necessary.

Further, the belt length from the primary transfer position F of the intermediate transfer belt 508 to a secondary transfer position G in the belt conveying direction need be at least 297 mm which is the length of A4 size paper.

When the moderate inter-sheet spacing at which sheets are conveyed is estimated with the changeover of the respective color toner developing devices and the pressure and time of spacing apart of the toner developing device with respect to the photosensitive drum 501 taken into account, the circumferential length Lb of the intermediate transfer belt 508 is properly 442. 96 mm.

Also, the circumferential length Lr of the intermediate transfer belt driving roller 502 is 442.96/5≅88.593 mm, and the diameter D2 of the driving roller is 88.893/$\pi$≅28.2 mm.

The above-described example of the conventional art has suffered from the following problem. That is, the region at which primary transfer is effected must be located at the taut side on the intermediate transfer belt 508, and the position at which secondary transfer is effected must be determined with the conveying path of the transferring material taken into account and further, the aforedescribed dimensional relations must be satisfied and yet the shape in which the intermediate transfer belt 508 is compactly passed over must be devised.

However, the intermediate transfer belt 508 has been of a shape in which it is stretched around three or more rollers such as the driving roller 502, the secondary transfer opposed roller 505 opposed to the secondary transfer roller 509 and forming a nip with the secondary transfer roller 509 to convey the transferring material, and the tension roller 506 for imparting predetermined tension to the intermediate transfer belt 508.

Therefore, the intermediate transfer belt 508 has required a number of rollers of high dimensional accuracy, and the frame itself constituting the intermediate transfer belt unit has required a complicated and highly accurate one, and this has become a factor for the bulkiness and increased cost of the intermediate transfer unit and the main body of the image forming apparatus.

Further, as shown in FIG. 25, among a number of rollers around which the intermediate transfer belt 508 is stretched, a roller smaller in diameter than the driving roller 502, like the tension roller 506, has often been used.

A roller having a smaller diameter further increases the bending loss of the intermediate transfer belt 508 itself compared with a roller having large diameter. Also, the greater the number of rollers, the greater the bending loss of the intermediate transfer belt.

Furthermore, a roller having a smaller diameter results in a greater number of revolutions and therefore, the friction loss on the bearings of the roller increases.

These losses increase the driving torque of the intermediate transfer belt driving roller 502, and thus the driving torque itself is also fluctuated, and the conveying speed of the intermediate transfer belt 508 itself is also fluctuated, and this has led to the problem that the color registration error is affected thereby.

Description will now be made of an embodiment of the present invention which solves the above-noted problem.

The embodiment is basically similar in construction to the above-described image forming apparatus of FIG. 1, and the different portions thereof will be described below.

FIG. 26 is an enlarged main longitudinal cross-sectional view schematically showing the construction of the image forming unit, and more particularly is a cross-sectional view of the unit as it is seen from the left side of the front of the apparatus. FIG. 27 is a longitudinal cross-sectional view of the image forming unit as it is seen from the right side of the front of the apparatus. FIG. 28 is a transverse cross-sectional view of the image forming unit of FIG. 26 in the waste toner carrying path portion as it is seen from above it.

In FIGS. 26 to 28, the image forming unit B has a photosensitive drum unit 21 disposed on the upper plane of the projection of an intermediate transfer belt unit 22, and a waste toner box 20 disposed on the lower plane of the projection of the intermediate transfer belt unit 22. Also, the belt driving roller 26 of the intermediate transfer belt unit 22 is provided with a cleaning charging roller portion 32 for inducing charges opposite to those during transfer in the residual toner on the intermediate transfer belt 5, and they are constructed integrally with each other.

(Photosensitive Drum Unit)

As shown in FIGS. 26 and 27, the photosensitive drum 1 has its opposite ends rotatably held by a right bearing 206 and a left rotary support shaft 202 so that a predetermined rotational driving force may be transmitted from the main body of the apparatus to the photosensitive drum unit 21 through a coupling 58 at the right end portion thereof.

Also, a charging roller 2 is brought into pressure contact with the photosensitive drum 1 with a predetermined force by a compression spring 24 through bearings 23 at the opposite ends thereof, and is adapted to be driven to rotate. At least one of the bearings 23 is constituted by an electrically conductive member, and design is made such that a predetermined charging bias voltage is applied from the compression spring 24 to the charging roller 2 through the bearings 23 to thereby uniformly charge the surface of the photosensitive drum 1.

Further, the end portion of the compression spring 24, as shown in FIG. 29, extends downwardly from the left side of a photosensitive drum frame 37 to provide a compression spring 327, one end of which is forced into the boss portion of the photosensitive drum frame 37 and is fixed.

Furthermore, a cleaning blade 9 is provided on the photosensitive drum 1 at a predetermined location so as to collect onto the photosensitive drum 1 the residual toners on the intermediate transfer belt in which the aforementioned opposite charges have been induced, and scrape them off with the residual toners on the photosensitive drum 1. The waste toners thus scraped off are prevented from falling onto the intermediate transfer belt 5 by a dip sheet 36 (see FIG. 26), and the waste toners collected on the bottom of the photosensitive drum frame 37 are carried rightwardly as viewed from the front of the apparatus, by the rotation of a screw 38 (the direction indicated by the arrow C in FIG. 28).

Thereafter, the waste toners are carried to the right side of the photosensitive drum unit 21 (as viewed from the front side of the apparatus) by the screw 38, and slide down into the waste toner box 20 and are accumulated therein. The photosensitive drum unit 21 is also provided with a drum shutter 25 openable and closable in operative association with the operation of mounting and dismounting the image forming unit to the main body of the image forming apparatus.

(Intermediate Transfer Belt Unit)

The construction of the intermediate transfer belt unit 22 will now be described. The intermediate transfer belt 5 is stretched around a driving roller 26 and a driven roller 27 as two rotary members in a frame 35 including a grip portion 35a.

The driving roller 26 serves to apply a rotational force to the intermediate transfer belt 5, and is rotatably position-fixed to the frame 35. This driving roller 26 is constituted by a metal pipe or the like, and has formed on its surface a layer having a high frictional force such as a rubber layer having electrical conductivity, and is adapted to function as an electrode.

As shown in FIGS. 26 to 28, the driving roller 26 has its opposite ends rotatably held by a right bearing 205 and a left bearing 201, and is designed such that a predetermined rotational driving force is transmitted thereto from the main body of the apparatus through a coupling 59 at the right end portion thereof. Also, the left bearing 201 is constituted by an electrically conductive member and is grounded to the main body of the image forming apparatus.

Compression springs 29 are provided on bearings 28 at the opposite ends of the driven roller 27, and are mounted for movement in a direction to impart predetermined tension to the intermediate transfer belt 5.

A primary transfer roller 6 is provided at a location opposed to the photosensitive drum 1 with the intermediate transfer belt 5 interposed therebetween, and is adapted to be brought into pressure contact with the photosensitive drum with a predetermined force by a compression spring 31 through bearings 30 at the opposite ends thereof, and be driven to rotate.

At least one of the bearings 30 is constituted by an electrically conductive member, and a predetermined charging bias voltage is applied to the primary transfer roller 6, whereby the toner image on the photosensitive drum 1 is primary-transferred onto the intermediate transfer belt 5.

As shown in FIG. 30, a primary transfer roller high voltage contact plate 401 is provided on the left side of the intermediate transfer member frame 35, and one end portion 401a thereof is connected to the compression spring 31, and the other end portion 401b thereof is fixed to the left lower portion of the intermediate transfer member frame 35 by a hook portion 401c.

Also, as shown in FIG. 26, a cleaning charging roller portion 32 for inducing charges opposite to those during transfer in the residual toners on the intermediate transfer belt is provided at a location opposed to the intermediate transfer belt driving roller 26.

The cleaning charging roller 8 is adapted to be brought into pressure contact with the intermediate transfer belt with a predetermined force by a compression spring 34 through bearings 33 at the opposite ends thereof and be driven to rotate. One of the bearings 33 is constituted by an electrically conductive member, and functions as an electrode member. That is, a voltage opposite to that during transfer is applied to the cleaning charging roller 8, to thereby induce charges opposite to those during transfer in the residual toners on the intermediate transfer belt 5, and the residual toners are electrostatically attracted to and collected by the surface of the photosensitive drum 1, and are accumulated in the waste toner box 20 as previously described.

In case of the charging by the charging roller 8, the driving roller 26 opposed thereto with the intermediate transfer belt 5 interposed therebetween functions as the opposed electrode of the charging roller 8. The driving roller 26 functions as a common electrode common to the secondary transfer roller 7 and the charging roller 8, and it is not necessary to individually provide opposed electrodes for the secondary transfer roller 7 and the charging roller 8, respectively, and therefore, the downsizing of the intermediate transfer belt unit 22 becomes possible.

Also, as shown in FIG. 28, the compression spring 34 is connected to one end portion 403a of a cleaning charging roller high voltage contact plate 403 constituting the cleaning means, and the other end portion 403b thereof is fixed to the left lower portion of the intermediate transfer member frame 35 by a hook portion 403c.

Further, as shown in FIGS. 28 and 29, a charging roller high voltage contact plate 402 for supplying a high voltage to the charging roller 2 is provided on the inner side of the left cover 208 of the intermediate transfer member frame 35, and one end portion 402a thereof is fixed to the upper surface of the intermediate transfer member frame 35, and extends downwardly from the left side of the aforedescribed photosensitive drum frame 37 and is connected to a compression spring 327, and the other end portion 402b thereof is fixed to the left lower portion of the intermediate transfer member frame 35 by a hook portion 402c. Thereby, electric power from the main body of the apparatus is supplied to one end portion 402b of a charging roller high voltage contact plate 402, and the other end portion 402a of the contact plate 402 and the compression spring 327 are electrically connected together as electrical contact means and therefore, the electric power is supplied to the charging roller 2 through a compression spring 24 and a bearing 23.

As described above, the supply contact portions for the respective bias voltages from the main body of the image forming apparatus to (1) the charging roller 2, (2) the primary transfer roller 6 and (3) the cleaning means are concentrated in the left (outside the image formable area width) lower portions 402b, 401b and 403b of the intermediate transfer belt unit 22.

(Unit Construction of the Image Forming Unit)

The frame construction of the image forming unit B will now be described in detail. The frame construction is broadly divided into two. A first unit is a photosensitive drum unit 21 (a portion encircled by thick dots-and-dash line in FIG. 28) constructed on a photosensitive drum frame 37 assuming a construction integral with the waste toner box 20 with the photosensitive drum 1, the right bearing 206, the left rotary support shaft 202, the charging roller 2, the cleaning blade 9, the screw 38 and the drum shutter 25 as main parts, as shown in FIGS. 27 and 28. A second unit is an intermediate transfer belt unit 22 having the intermediate transfer belt 5 stretched around the driving roller 26 and the driven roller 27 in the intermediate transfer member frame 35, and the primary transfer roller 6 disposed on the inner side of the intermediate transfer belt opposed to the photosensitive drum 1 and the cleaning charging roller 8 also disposed on the driving roller 26, as shown in FIG. 26.

The above-described two units, as shown in FIGS. 26 and 27, are such that projected portions 71 provided on the right and left ends of the photosensitive drum frame 37 are inserted in a positioning hole 72 formed in the intermediate transfer member frame 35, and on the other hand, the claw 73 of a hook portion of a snap fit type provided at the widthwisely center of the photosensitive drum frame 37 is fitted in and connected to the lock hole 74 of the intermediate transfer member frame 35.

The positioning hole 72 and lock hole 74 formed in the intermediate transfer member frame 35 are larger by a predetermined amount than the projected portions 71 and the claw 73 of the hook portion provided on the photosensitive drum frame 37, and a predetermined amount of relative positional movement is possible between the photosensitive drum unit 21 and the intermediate transfer belt unit 22. Also, the positioning hole 72 is provided with a tapered portion 72a (see FIG. 32) so as to facilitate mounting and dismounting.

In the above-described construction, as shown in FIG. 27, the hook claw 73 of the photosensitive drum unit 21 is pushed in the direction indicated by the arrow D to thereby disengage it from the lock hole 74 of the intermediate transfer belt unit 22, and as shown in FIG. 31, the photosensitive drum unit 21 is rotated in the direction indicated by the arrow H, whereby the frame construction can be divided into the photosensitive drum unit 21 and the intermediate transfer belt unit 22, as shown in FIGS. 32 and 33.

When the separated units 21 and 22 are to be connected together, conversely the projected portions 71 of the photosensitive drum unit 21 are inserted into the positioning hole 72 of the intermediate transfer belt unit 22 and the photosensitive drum unit 21 is rotated in the direction opposite to the direction indicated by the arrow H in FIG. 31, and the hook claw 73 is pushed into the lock hole 74, whereby the two units 21 and 22 are connected together.

At this time, the bias voltage supply path to the charging roller 2 is designed to be connected to and separated from the end portion 402a of a charging roller high voltage contact plate 402 provided on the intermediate transfer belt unit 22 side at the portion of a compression spring 327 provided on the photosensitive drum unit 21 side.

As previously described, the photosensitive drum unit 21 and the intermediate transfer belt unit 22 are separable from each other and therefore, when only the photosensitive drum 1 or only the intermediate transfer belt 5 has reached the end of its life, it becomes possible to interchange only the unit which has reached the end of its life. Further, the lives of the photosensitive drum 1 and the intermediate transfer belt 5 differ from each other, the user's cost load is mitigated.

(Relation Between the Photosensitive Drum and the Intermediate Transfer Belt)

The relation between the photosensitive drum 1 and the intermediate transfer belt will now be described. The intermediate transfer belt 5 stretched around two rollers, i.e., the driving rollers 26 and the driven rollers 27 is moved in the rightward direction indicated by the arrow by the driving roller 26 being rotated in the rightward (clockwise) direction indicated by the arrow as shown in FIG. 26.

Accordingly, the upper side of the intermediate transfer belt 5 with which the photosensitive drum 1 contacts is the so-called slack side (the downstream side with respect to the conveying direction of the intermediate transfer belt as viewed from the driving roller 26) of the belt, and is generally more unstable in such points as the stability of the conveying speed of the belt and the moving property of the belt than the taut side of the belt which is the lower side of the intermediate transfer belt, and as the region for effecting primary transfer, it is regarded as being disadvantageous in the quality of image including a color registration error and banding.

In the present embodiment, however, as previously described, the number of the rollers around which the intermediate transfer belt 5 is stretched is limited to minimum two to thereby minimize the bending loss occurring portions of the intermediate transfer belt itself and also minimize the friction loss occurring portions in the respective roller bearing portions.

Also, design is made such that the diameters of the driving roller 26 and the driven roller 27 around which the intermediate transfer belt 5 is stretched are made substantially equal at a predetermined value between 25 mm to 35 mm and the circumferential length of each roller is substantially one integerth of the circumferential length of the intermediate transfer belt 5, whereby the bending loss of the intermediate transfer belt 5 itself and the friction loss of the bearing portions are made small.

Further, not a photosensitive belt but the photosensitive drum 1 is adopted as the image bearing member to thereby suppress the speed fluctuation of the belt which would otherwise be caused by the contact between belts such as the contact between the photosensitive belt and the intermediate transfer belt, and the circumferential length of the photosensitive drum 1 is substantially one integerth of the circumferential length of the intermediate transfer belt 5 and the gear ratio between the photosensitive drum 1 and the driving roller 26 rotatively driven divisionally by the same drive source is substantially integer times so that the peripheral speed fluctuation of the photosensitive drum 1 and the peripheral speed fluctuation of the intermediate transfer belt 5 may be in phase with each other.

Also, in the present embodiment, as shown in FIG. 26, a region G at which secondary transfer is effected is designed to be located below a region F at which primary transfer is effected. Therefore, when the photosensitive drum, the intermediate transfer belt driving roller, the secondary transfer roller, sheet feeding, and so on are to be driven by the same drive source through the branches of the gear train, the disposition of the gear train can be made compact.

Here, if in FIG. 26, the diameter D1 of the photosensitive drum 1 is 47 mm, let it be assumed that the circumferential length Ld of the photosensitive drum is Ld=47 $\pi$mm, and the circumferential length Ld1 from the exposed position E of the photosensitive drum 1 to the primary transfer position F is about 56 mm.

The circumferential length Lb of the intermediate transfer belt 5 is 47$\pi$×2≅295.3 mm or 47$\pi$×3≅442.96 mm, but if the transferring material is a sheet of A4 size, the length of the A4 sheet 297 mm plus the distance 56 mm by which the exposed position E of the photosensitive drum 1 comes round to the primary transfer position F, i.e., the belt length 353 mm or greater becomes necessary at least.

Further, as the belt length from the primary transfer position F of the intermediate transfer belt 5 to the secondary transfer position G in the belt conveying direction, the length 297 mm of the A4 size sheet or greater is necessary at least, and this length plus the abutting time of the secondary transfer roller, i.e., the order of 330 mm, becomes necessary.

Further, when the changeover of each color toner developing device 4 and the time for the pressure contact and spacing-apart of the toner developing device 4 with and from the photosensitive drum are taken into account and the moderate interval (inter-sheet) at which the sheets are conveyed is estimated from the secondary transfer position G to the primary transfer position F in the belt conveying direction, the full circumferential length Lb of the intermediate transfer belt will properly be 442.96 mm.

Also, the circumferential length Lr of the intermediate transfer belt driving roller 26 is 442.96/5≅88.593 mm, and the diameter D2 of the driving roller is 88.893/$\pi$≅28.2 mm.

(Result of the Experiment)

Here will be shown the data of an experiment in which the stability of movement of the intermediate transfer belt 5 in the construction of FIG. 26 was inspected. The following experimental data are by an endless belt comprising a rubber belt with a resin core extended with tension of about 10 kg.

When in FIG. 26, one revolution period of the belt was measured at three locations on the intermediate transfer belt 5, the result was as shown in FIGS. 34A, 34B and 34C. FIG. 34A shows one revolution period of the intermediate transfer belt 5 on the stack side before the photosensitive drum (between the driving roller 26 and the photosensitive drum 1 in the belt conveying direction), FIG. 34B shows one revolution period of the intermediate transfer belt 5 on the slack side after the photosensitive drum (between the photosensitive drum 1 and the driven roller 27 in the belt conveying direction), and FIG. 34C shows one revolution period of the intermediate transfer belt 5 on the taut side (between the driven roller 27 and the driving roller 26 in the belt conveying direction). The result shown in FIG. 34D was obtained from the result of this experiment. It can be said from this that the revolution period of the intermediate transfer belt 5 is stable on the taut side and slack side of the intermediate transfer belt 5 of the present embodiment and there is little or no difference between the two sides, and the moving property of the belt is stable.

In contrast, as shown in FIG. 35, an experiment was carried out by an intermediate transfer belt 5 stretched around three rollers. In the construction of FIG. 35, one revolution period of the belt was measured at three locations on the intermediate transfer belt 5 with a construction in which the circumferential length of the intermediate transfer belt 5 is about 443 mm, the diameters of the driving roller 26 and a tension roller 80 are equally 28.2 mm and the diameter of the driven roller 27 is 16 mm as a model.

The result was as shown in FIGS. 36A, 36B and 36C. FIG. 36A shows one revolution period of the intermediate transfer belt 5 in the taut portion thereof (between the tension roller 80 and the driving roller 26 in the belt conveying direction), FIG. 36B shows one revolution period of the intermediate transfer belt 5 in the slack portion thereof (between the driving roller 26 and the driven roller 27 in the belt conveying direction), and FIG. 36C shows one revolution period of the intermediate transfer belt 5 in the central portion thereof (between the driven roller 27 and the tension roller 80 in the belt conveying direction).

The result shown in FIG. 36D was obtained from FIGS. 36A–36C. It can be said from this that in contrast with the taut portion, the slack portion and the central portion have about twice as great periodic error of the belt and the moving property of the belt is unstable. Also, in the taut portion, the periodic error is greater than the data shown in FIGS. 34A to 34D.

FIG. 37 is a graph showing the fluctuations of driving torque when the driving roller 26 was rotated by the two-axis construction of FIG. 26 and the three-axis construction of FIG. 35, respectively. As can be seen from this graph, the two-axis construction is smaller in driving torque and its fluctuation. From this, the following conclusions are obtained:

(1) The number of rollers around which the intermediate transfer belt 5 is stretched is limited to minimum two, the bending loss occurring portions of the intermediate transfer belt itself is minimized and the friction loss occurring locations on each roller bearing portion are also minimized, whereby the torque required by the driving roller 26 is made small and the fluctuation of the torque is made small, whereby the stability of the conveying speed and the stability of the moving property of the belt can be obtained.

(2) Also, the diameters of all the rollers around which the intermediate transfer belt 5 is stretched are equally made into a predetermined value between 25 mm to 35 mm, and design is made such that the circumferential length of each roller is substantially one integerth of the circumferential length of the intermediate transfer belt. By not using rollers of small diameters, there are not made locations at which the bending loss of the belt itself and the frictional loss of the bearing portion are great, whereby the torque required by the driving roller is made small and the fluctuation of the torque is made small, whereby the stability of the conveying speed and the stability of the moving property of the belt can be obtained.

If the diameters of the rollers are made smaller than the aforementioned dimensions, the bending loss of the belt itself and the friction loss of the bearing portion will become great, and if the diameters of the rollers are made larger than the aforementioned dimensions, the unit itself will become bulky.

(3) By adopting not a photosensitive belt but a photosensitive drum as the image bearing member, the fluctuation of the speed of the belt which would otherwise caused by the contact between belts such as the contact between the photosensitive belt and the intermediate transfer belt can be suppressed, and the circumferential length of the photosensitive drum 1 is made substantially one integerth of the circumferential length of the intermediate transfer belt 5 and the gear ratio between the photosensitive drum 1 and the driving roller 26 is made substantially integer times, whereby the peripheral speed fluctuation of the photosensitive drum 1 and the peripheral speed fluctuation of the intermediate transfer belt 5 can be brought into phase with each other.

Thereby, a decrease in and the stabilization of the rotational driving torque of the intermediate transfer belt are achieved and further, the fluctuation of the conveying speed and the moving property of the belt on the taut side and slack side of the intermediate transfer belt uniformly become good. Therefore, primary transfer on the slack side becomes possible and images having little color registration error and banding can be obtained.

Incidentally, though the photosensitive drum unit 21 and the intermediate transfer belt unit of the image forming unit B in the aforementioned embodiment are separable from each other, the both units may be made into an inseparate single integral unit.

While the image forming unit B of the aforedescribed embodiment has been shown as an example in which the intermediate transfer belt 5 is supported by two rollers, i.e., the driving roller and the driven roller, the intermediate transfer belt may also be supported by three or more rollers.

Also, while in the present embodiment, there has been illustrated a color image forming apparatus which is loaded with the image forming unit B to thereby form color images, the image forming unit according to the present invention can also be used in an image forming apparatus for forming monochromatic images.

The present embodiment, as previously described can achieve a decrease in and the stabilization of the rotational driving torque of the belt member and further, can reduce the fluctuation of the conveying speed on the taut side and slack side of the belt member to thereby improve the stability of the moving property of the belt.

Also, the bending loss by the belt member itself can be reduced and the friction loss on the bearing portions of the driving roller and tension roller can be reduced.

The number of the parts of the image forming unit can be greatly decreased and the cost thereof can also be greatly decreased and further, an improvement in assembling property and the downsizing of the image forming unit become possible. By using this image forming unit, it becomes possible to obtain stable images by a compact image forming apparatus.

While the embodiments of the present invention have been described above, the present invention is not restricted to the above-described embodiments, but all modifications are possible within the technical idea of the present invention.

What is claimed is:

1. An image forming unit detachably mountable to an image forming apparatus, said image forming unit comprising:

an image bearing member;

an intermediate transfer member to which a toner image on said image bearing member is transferred; and transfer-contact-separation means for moving transfer means for transferring the toner image on said intermediate transfer member to a recording material, wherein the transfer means is movable into and out of contact with said intermediate transfer member.

2. An image forming unit according to claim 1, wherein said intermediate transfer member is belt-shaped, wherein said image forming unit includes rollers around which said intermediate transfer member is stretched, and wherein said transfer-contact-separation means includes cams supported coaxially with said rollers, and cam drive transmitting means for transmitting a driving force to said cams.

3. An image forming unit according to claim 1, wherein when said image forming unit is mounted to a main body of the apparatus, and wherein said intermediate transfer member and the transfer means are maintained spaced apart from each other by said transfer-contact-separation means.

4. An image forming unit according to claim 1, further comprising toner collecting means for collecting and accumulating therein toner remaining on a surface of at least one said image bearing member and said intermediate transfer member.

5. An image forming unit according to claim 1, further comprising driving-force transmitting means for transmitting a driving force from a main body of the apparatus to said transfer-contact-separation means, wherein said driving-force transmitting means includes lock means for enabling a transmission of the driving force only when said image forming unit is mounted to the main body of the apparatus.

6. An image forming apparatus comprising:

a main body; and an image forming unit detachably mountable to said main body, wherein said image forming unit includes an image bearing member, an intermediate transfer member to which a toner image on said image bearing member is transferred, and transfer-contact-separation means for moving transfer means for transferring the toner image on said intermediate transfer member to a recording material, and wherein the transfer means is movable into and out of contact with said intermediate transfer member.

7. An image forming apparatus according to claim 6, wherein said intermediate transfer member is belt-shaped, wherein said image forming unit has rollers around which said intermediate transfer member is stretched, and wherein said transfer-contact-separation means includes a cam supported coaxially with said one of said rollers and cam drive transmitting means for transmitting a driving force to said cam.

8. An image forming apparatus according to claim 7, further comprising urging means for urging the transfer means against said one of said rollers and a bearing for supporting said transfer means and abutting against said cam.

* * * * *

UNITED STATES PATENT AND TRADEMARK OFFICE
CERTIFICATE OF CORRECTION

PATENT NO. : 7,085,517 B2
APPLICATION NO. : 10/392749
DATED : August 1, 2006
INVENTOR(S) : Takao Sameshima It is certified that error appears in the above-identified patent and that said Letters Patent is hereby corrected as shown below:

COLUMN 11
    Line 46, "can" should read --cam--.

COLUMN 17
    Line 43, "in" should read --is--.

COLUMN 19
    Line 43, "being slidden" should read --sliding--.

COLUMN 20
    Line 51, "be-prevented" should read --be prevented--.

COLUMN 21
    Line 48, "it" should be deleted.

COLUMN 22
    Line 35, "442. 96 mm." should read --442.96 mm.--.

COLUMN 23
    Line 11, "is also fluctuated," should read --also fluctuates,--; and
    Line 12, "is also fluctuated," should read --also fluctuates,--.

COLUMN 29
    Line 52, "an inseparate" should read --a--.

UNITED STATES PATENT AND TRADEMARK OFFICE
CERTIFICATE OF CORRECTION

PATENT NO. : 7,085,517 B2
APPLICATION NO. : 10/392749
DATED : August 1, 2006
INVENTOR(S) : Takao Sameshima It is certified that error appears in the above-identified patent and that said Letters Patent is hereby corrected as shown below:

COLUMN 30
      Line 42, "when" should be deleted.

Signed and Sealed this

Sixth Day of February, 2007

JON W. DUDAS
*Director of the United States Patent and Trademark Office*